(12) United States Patent
Jannard

(10) Patent No.: US 10,547,828 B2
(45) Date of Patent: *Jan. 28, 2020

(54) DENSE FIELD IMAGING

(71) Applicant: RED.COM, LLC, Irvine, CA (US)

(72) Inventor: James H. Jannard, Las Vegas, NV (US)

(73) Assignee: RED.COM, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/693,289

(22) Filed: Aug. 31, 2017

(65) Prior Publication Data

US 2018/0139364 A1    May 17, 2018

Related U.S. Application Data

(63) Continuation of application No. 14/181,552, filed on Feb. 14, 2014, now Pat. No. 9,769,365.

(Continued)

(51) Int. Cl.
| | | |
|---|---|---|
| *H04N 13/243* | (2018.01) | |
| *H04N 5/232* | (2006.01) | |

(Continued)

(52) U.S. Cl.
CPC ......... *H04N 13/243* (2018.05); *H04N 5/2254* (2013.01); *H04N 5/23238* (2013.01);

(Continued)

(58) Field of Classification Search
CPC .... H04N 5/247; H04N 5/2624; H04N 3/1593; H04N 5/2251; H04N 5/2259;

(Continued)

(56) References Cited

U.S. PATENT DOCUMENTS 5,694,620 A * 12/1997 Wilk .................... G03B 17/04
                                                      396/333
5,734,929 A *  3/1998 Brogden ............... G03B 17/04
                                                      396/201

(Continued)

FOREIGN PATENT DOCUMENTS

CN      101883291     12/2012
RU       2316908       5/2007

(Continued)

OTHER PUBLICATIONS

"DIGIC," http://en.wikipedia.org/wiki/DIGIC, in 7 pages, retrieved Oct. 1, 2012.

(Continued)

*Primary Examiner* — Chiawei Chen
(74) *Attorney, Agent, or Firm* — Knobbe, Martens, Olson & Bear, LLP

(57) ABSTRACT

Dense field imagers are disclosed which are configured to provide fused and/or stitched light field data for a scene. A dense field imager can include a plurality of imaging elements configured to be joined into image blocks or facets that each provides light field data about a scene. The dense field imager can include a plurality of facets in a fixed or modular fashion such that the dense field imager is configured to fuse and/or stitch light field data from the plurality of facets. The facets can be mounted such that one or more facets are non-coplanar with other facets. The facets can be configured to provide light field data with overlapping fields of view. Accordingly, the dense field imager can provide dense field data over a field of view covered by the plurality of facets.

17 Claims, 48 Drawing Sheets

Related U.S. Application Data

(60) Provisional application No. 61/785,494, filed on Mar. 14, 2013, provisional application No. 61/765,661, filed on Feb. 15, 2013.

(51) Int. Cl.
*H04N 5/247* (2006.01)
*H04N 5/225* (2006.01)
*H04N 13/189* (2018.01)
*H04N 5/369* (2011.01)
*H04N 13/00* (2018.01)

(52) U.S. Cl.
CPC .......... *H04N 13/189* (2018.05); *H04N 5/369* (2013.01); *H04N 2013/0081* (2013.01)

(58) Field of Classification Search
CPC .. H04N 5/3415; H04N 5/3692; H04N 5/2252; H04N 13/243; H04N 13/189; H04N 5/2254; H04N 5/23238; H04N 2013/0081; H04N 5/369; G06F 1/1607; G03B 17/02; G08B 13/1963; G08B 13/19632
See application file for complete search history.

(56) References Cited

U.S. PATENT DOCUMENTS

| | | | |
|---|---|---|---|
| 5,768,429 A | 6/1998 | Jabbi et al. | |
| 5,801,719 A | 9/1998 | Jabbi et al. | |
| 6,002,743 A * | 12/1999 | Telymonde | G06T 1/0007 378/98.8 |
| 6,078,619 A | 6/2000 | Monro et al. | |
| 6,097,394 A | 8/2000 | Levoy et al. | |
| 6,282,461 B1 * | 8/2001 | Gan | B25J 9/1697 382/106 |
| 6,363,366 B1 * | 3/2002 | Henty | G01G 19/4144 382/110 |
| 6,476,856 B1 * | 11/2002 | Zantos | G08B 13/19619 348/143 |
| 6,493,469 B1 * | 12/2002 | Taylor | H04N 1/1903 348/E7.079 |
| 6,501,471 B1 | 12/2002 | Venkataraman et al. | |
| 6,535,226 B1 * | 3/2003 | Sorokin | H04N 5/2627 345/427 |
| 6,738,533 B1 | 5/2004 | Shum et al. | |
| 6,783,900 B2 | 8/2004 | Venkataraman | |
| 6,785,845 B2 | 8/2004 | Venkataraman et al. | |
| 6,876,361 B2 | 4/2005 | Venkataraman | |
| 6,885,392 B1 | 4/2005 | Mancuso et al. | |
| 6,898,322 B2 | 5/2005 | Semasa | |
| 6,933,966 B2 | 8/2005 | Taylor | |
| 6,940,653 B2 | 9/2005 | Favalora et al. | |
| 6,953,151 B2 * | 10/2005 | Tsikos | G02B 26/10 235/462.01 |
| 6,975,352 B2 | 12/2005 | Seeger et al. | |
| 7,099,517 B2 | 8/2006 | Fryer et al. | |
| 7,126,630 B1 * | 10/2006 | Lee | H04N 5/225 348/218.1 |
| 7,129,943 B2 | 10/2006 | Zhang et al. | |
| 7,206,136 B2 * | 4/2007 | Labaziewicz | H04N 5/225 348/207.99 |
| 7,218,789 B2 | 5/2007 | Faber et al. | |
| 7,239,345 B1 * | 7/2007 | Rogina | H04N 5/2251 348/159 |
| 7,245,300 B2 | 7/2007 | Venkataraman | |
| 7,248,744 B2 | 7/2007 | Cockshott | |
| 7,262,771 B2 | 8/2007 | Synder et al. | |
| 7,373,005 B2 | 5/2008 | Venkataraman | |
| 7,382,369 B2 | 6/2008 | Sloan et al. | |
| 7,433,517 B2 | 10/2008 | Kato et al. | |
| 7,436,544 B2 | 10/2008 | Tanaka | |
| 7,450,316 B2 | 11/2008 | Morooka | |
| 7,454,084 B2 | 11/2008 | Faber et al. | |
| 7,463,280 B2 * | 12/2008 | Steuart, III | G03B 35/08 348/36 |
| 7,508,991 B2 | 3/2009 | Faber et al. | |
| 7,529,478 B2 * | 5/2009 | Cutler | F21V 21/30 362/18 |
| 7,545,992 B2 | 6/2009 | Kato et al. | |
| 7,596,271 B2 | 9/2009 | Yaguchi et al. | |
| 7,640,269 B2 | 12/2009 | Yoshida et al. | |
| 7,689,053 B2 | 3/2010 | Kondo et al. | |
| 7,708,686 B2 | 5/2010 | Venkataraman | |
| 7,710,463 B2 * | 5/2010 | Foote | G06T 3/4038 348/218.1 |
| 7,723,662 B2 | 5/2010 | Levoy et al. | |
| 7,751,634 B2 | 7/2010 | Venkataraman | |
| 7,764,438 B2 | 7/2010 | Kamo et al. | |
| 7,795,577 B2 * | 9/2010 | Olsen | H01L 27/14634 250/226 |
| 7,860,266 B2 | 12/2010 | Sekiguchi et al. | |
| 7,916,934 B2 | 3/2011 | Vetro et al. | |
| 7,931,696 B2 | 4/2011 | Eliu et al. | |
| 7,936,392 B2 | 5/2011 | Ng et al. | |
| 7,962,033 B2 | 6/2011 | Georgiev et al. | |
| 7,974,488 B2 | 7/2011 | Monro | |
| 7,995,075 B2 | 8/2011 | Yang et al. | |
| 8,019,174 B2 | 9/2011 | Tsuruoka | |
| 8,044,994 B2 | 10/2011 | Vetro et al. | |
| 8,077,213 B2 | 12/2011 | Gulliksson | |
| 8,098,941 B2 | 1/2012 | Moussavi et al. | |
| 8,119,967 B2 | 2/2012 | O | |
| 8,131,097 B2 | 3/2012 | Lelescu et al. | |
| 8,139,085 B2 | 3/2012 | Yang et al. | |
| 8,160,439 B2 | 4/2012 | Georgiev et al. | |
| 8,174,586 B2 | 5/2012 | Sakaue et al. | |
| 8,184,921 B2 | 5/2012 | Monro | |
| 8,189,065 B2 | 5/2012 | Georgiev et al. | |
| 8,189,089 B1 | 5/2012 | Georgiev et al. | |
| 8,196,049 B2 | 6/2012 | Liu et al. | |
| 8,213,732 B2 | 7/2012 | Axelsson | |
| 8,228,417 B1 | 7/2012 | Georgiev et al. | |
| 8,290,358 B1 | 10/2012 | Georgiev | |
| 8,315,476 B1 | 11/2012 | Georgiev et al. | |
| 8,395,696 B2 | 3/2013 | Ng et al. | |
| 8,497,897 B2 | 7/2013 | Gere | |
| 8,587,661 B2 * | 11/2013 | McCubbrey | G08B 13/19608 348/159 |
| 8,614,764 B2 | 12/2013 | Pitts et al. | |
| 8,724,014 B2 | 5/2014 | Ng et al. | |
| 8,749,620 B1 | 6/2014 | Knight et al. | |
| 8,854,433 B1 | 10/2014 | Rafii | |
| 8,861,089 B2 | 10/2014 | Duparre | |
| 8,866,890 B2 * | 10/2014 | Van Arendonk | H04N 5/2253 348/47 |
| 8,908,058 B2 * | 12/2014 | Akeley | H04N 5/232 348/222.1 |
| 9,036,080 B2 * | 5/2015 | Miyawaki | H04N 5/2254 348/335 |
| 9,123,172 B2 * | 9/2015 | Sebring | G06T 15/205 |
| 9,277,122 B1 * | 3/2016 | Imura | G06T 7/73 |
| 9,479,768 B2 * | 10/2016 | Yukich | H04N 5/247 |
| 9,497,380 B1 * | 11/2016 | Jannard | H04N 5/247 |
| 9,547,160 B2 * | 1/2017 | Laroia | G06T 11/60 |
| 9,561,869 B2 * | 2/2017 | Finn | G01C 11/025 |
| 9,769,365 B1 * | 9/2017 | Jannard | H04N 5/2254 |
| 9,998,638 B2 * | 6/2018 | Laroia | H04N 5/2252 |
| 10,091,447 B2 * | 10/2018 | Laroia | H04N 5/2258 |
| 10,110,794 B2 * | 10/2018 | Laroia | G02B 5/201 |
| 10,277,885 B1 | 4/2019 | Jannard et al. | |
| 2002/0063777 A1 | 5/2002 | Maekawa et al. | |
| 2002/0093564 A1 | 7/2002 | Israel | |
| 2002/0122113 A1 * | 9/2002 | Foote | G06T 3/4038 348/48 |
| 2002/0190991 A1 * | 12/2002 | Efran | H04N 5/2224 345/475 |
| 2003/0132951 A1 * | 7/2003 | Sorokin | G03B 37/04 715/700 |
| 2005/0083248 A1 | 4/2005 | Biocca et al. | |

(56) References Cited

U.S. PATENT DOCUMENTS

| | | | |
|---|---|---|---|
| 2005/0099810 A1* | 5/2005 | Tasson | B60Q 1/2607 362/249.07 |
| 2005/0207487 A1* | 9/2005 | Monroe | G08B 13/19628 375/240.01 |
| 2006/0187312 A1* | 8/2006 | Labaziewicz | H04N 5/225 348/218.1 |
| 2006/0215054 A1* | 9/2006 | Liang | G02B 3/0056 348/337 |
| 2007/0014347 A1* | 1/2007 | Prechtl | H04N 5/232 375/240.01 |
| 2007/0041391 A1 | 2/2007 | Lin et al. | |
| 2007/0097485 A1* | 5/2007 | Yang | G02B 26/0841 359/290 |
| 2007/0188492 A1 | 8/2007 | Venkataraman | |
| 2007/0211951 A1 | 9/2007 | Faber et al. | |
| 2007/0211952 A1 | 9/2007 | Faber et al. | |
| 2008/0080028 A1 | 4/2008 | Bakin et al. | |
| 2008/0131019 A1 | 6/2008 | Ng | |
| 2008/0278571 A1* | 11/2008 | Mora | H04N 13/0242 348/48 |
| 2009/0116210 A1* | 5/2009 | Cutler | G03B 15/02 362/8 |
| 2009/0118600 A1* | 5/2009 | Ortiz | A61B 5/0064 600/306 |
| 2009/0128669 A1 | 5/2009 | Ng et al. | |
| 2009/0316022 A1 | 12/2009 | Hatano | |
| 2010/0026852 A1 | 2/2010 | Ng et al. | |
| 2010/0097444 A1* | 4/2010 | Lablans | G03B 35/00 348/46 |
| 2010/0111489 A1 | 5/2010 | Presler | |
| 2010/0128145 A1 | 5/2010 | Pitts et al. | |
| 2010/0129048 A1 | 5/2010 | Pitts et al. | |
| 2010/0141802 A1 | 6/2010 | Knight et al. | |
| 2010/0194852 A1 | 8/2010 | Tseng et al. | |
| 2010/0253970 A1* | 10/2010 | Nelson | H04N 13/0242 358/1.15 |
| 2010/0265385 A1 | 10/2010 | Knight et al. | |
| 2010/0271467 A1 | 10/2010 | Akeley | |
| 2010/0283833 A1* | 11/2010 | Yeh | G06F 3/04815 348/46 |
| 2010/0289941 A1* | 11/2010 | Ito | G02B 7/365 348/345 |
| 2010/0321511 A1* | 12/2010 | Koskinen | H04N 5/217 348/218.1 |
| 2010/0328471 A1* | 12/2010 | Boland | G02B 13/004 348/207.99 |
| 2011/0054872 A1 | 3/2011 | Chen et al. | |
| 2011/0057948 A1 | 3/2011 | Witt et al. | |
| 2011/0069189 A1 | 3/2011 | Venkataraman et al. | |
| 2011/0080487 A1 | 4/2011 | Venkataraman et al. | |
| 2011/0122233 A1* | 5/2011 | Kasai | H04N 5/23203 348/49 |
| 2011/0122308 A1* | 5/2011 | Duparre | H01L 27/14621 348/340 |
| 2011/0128393 A1* | 6/2011 | Tavi | H04N 5/2257 348/218.1 |
| 2011/0157227 A1 | 6/2011 | Ptucha et al. | |
| 2011/0157387 A1* | 6/2011 | Han | H04N 5/2253 348/218.1 |
| 2011/0193938 A1* | 8/2011 | Oderwald | A61B 1/00045 348/45 |
| 2011/0221599 A1* | 9/2011 | Hogasten | H01L 27/14609 340/632 |
| 2011/0234841 A1 | 9/2011 | Akeley et al. | |
| 2011/0241234 A1 | 10/2011 | Duparre | |
| 2011/0249100 A1* | 10/2011 | Jayaram | H04N 5/2253 348/48 |
| 2011/0279721 A1 | 11/2011 | McMahon | |
| 2011/0300929 A1* | 12/2011 | Tardif | A63F 13/213 463/30 |
| 2012/0001058 A1* | 1/2012 | Luke | G01J 1/4228 250/208.2 |
| 2012/0002256 A1* | 1/2012 | Lacoste | G02B 27/0081 359/9 |
| 2012/0012748 A1 | 1/2012 | Pain et al. | |
| 2012/0019711 A1 | 1/2012 | Ng et al. | |
| 2012/0019712 A1 | 1/2012 | Ng et al. | |
| 2012/0025341 A1 | 2/2012 | Van Arendonk et al. | |
| 2012/0056987 A1 | 3/2012 | Federoff | |
| 2012/0063637 A1* | 3/2012 | Tardif | G06T 11/00 382/103 |
| 2012/0063777 A1 | 3/2012 | Tanaka et al. | |
| 2012/0105574 A1* | 5/2012 | Baker | G03B 35/08 348/36 |
| 2012/0113213 A1 | 5/2012 | Van Arendonk et al. | |
| 2012/0113276 A1 | 5/2012 | Van Arendonk et al. | |
| 2012/0134028 A1 | 5/2012 | Maruyama | |
| 2012/0147205 A1 | 6/2012 | Lelescu et al. | |
| 2012/0154455 A1* | 6/2012 | Steyn | G02B 26/02 345/690 |
| 2012/0169842 A1 | 7/2012 | Chuang et al. | |
| 2012/0177356 A1 | 7/2012 | Georgiev et al. | |
| 2012/0198677 A1 | 8/2012 | Duparre | |
| 2012/0200829 A1 | 8/2012 | Bronstein et al. | |
| 2012/0229679 A1 | 9/2012 | Georgiev et al. | |
| 2012/0230030 A1* | 9/2012 | Miller | F21S 2/005 362/249.01 |
| 2012/0242855 A1 | 9/2012 | Nagasaka et al. | |
| 2012/0268565 A1* | 10/2012 | Guilleminot | H04N 5/247 348/46 |
| 2012/0281072 A1 | 11/2012 | Georgiev et al. | |
| 2012/0287336 A1* | 11/2012 | Jensen | F16M 11/14 348/376 |
| 2012/0287671 A1* | 11/2012 | Parker | F21S 2/005 362/609 |
| 2013/0013185 A1 | 1/2013 | Smitherman et al. | |
| 2013/0033626 A1 | 2/2013 | Ng et al. | |
| 2013/0033636 A1 | 2/2013 | Pitts et al. | |
| 2013/0038696 A1 | 2/2013 | Ding et al. | |
| 2013/0058591 A1* | 3/2013 | Nishiyama | H04N 5/217 382/264 |
| 2013/0076966 A1* | 3/2013 | Border | H04N 5/2254 348/345 |
| 2013/0077880 A1 | 3/2013 | Venkataraman et al. | |
| 2013/0077882 A1 | 3/2013 | Venkataraman et al. | |
| 2013/0128087 A1 | 5/2013 | Georgiev et al. | |
| 2013/0135515 A1* | 5/2013 | Abolfadl | H04N 5/225 348/340 |
| 2013/0147979 A1 | 6/2013 | McMahon et al. | |
| 2013/0169855 A1 | 7/2013 | Ng et al. | |
| 2013/0188068 A1 | 7/2013 | Said | |
| 2013/0222582 A1 | 8/2013 | Mohan et al. | |
| 2013/0223673 A1 | 8/2013 | Davis et al. | |
| 2013/0242051 A1 | 9/2013 | Balogh | |
| 2013/0321581 A1 | 12/2013 | Ei-Ghoroury et al. | |
| 2013/0335598 A1* | 12/2013 | Gustavsson | H04N 5/2351 348/234 |
| 2013/0335600 A1* | 12/2013 | Gustavsson | H04N 5/2621 348/239 |
| 2014/0056028 A1* | 2/2014 | Nichol | G02B 6/0028 362/611 |
| 2014/0104378 A1* | 4/2014 | Kauff | H04N 5/247 348/38 |
| 2014/0111608 A1* | 4/2014 | Pfeil | H04N 5/23238 348/37 |
| 2014/0111650 A1* | 4/2014 | Georgiev | G06T 3/4038 348/159 |
| 2014/0125810 A1 | 5/2014 | D'Amico et al. | |
| 2014/0129988 A1 | 5/2014 | Liang et al. | |
| 2014/0146132 A1* | 5/2014 | Bagnato | G02B 27/2228 348/36 |
| 2014/0152647 A1* | 6/2014 | Tao | G06T 7/0065 345/419 |
| 2014/0168370 A1* | 6/2014 | Heidemann | G01B 11/2513 348/46 |
| 2014/0176663 A1 | 6/2014 | Cutler et al. | |
| 2014/0181630 A1 | 6/2014 | Monney et al. | |
| 2014/0183334 A1 | 7/2014 | Wang et al. | |

(56) References Cited

U.S. PATENT DOCUMENTS

| | | | |
|---|---|---|---|
| 2014/0192144 A1* | 7/2014 | St. Clair | H04N 5/23238 348/36 |
| 2014/0354828 A1* | 12/2014 | Rubinstein | G06T 3/0068 348/187 |
| 2015/0054913 A1 | 2/2015 | Annau et al. | |
| 2015/0098079 A1* | 4/2015 | Montgomery | G01S 17/42 356/138 |
| 2015/0116451 A1 | 4/2015 | Xu et al. | |
| 2015/0146032 A1* | 5/2015 | Rime | H04N 7/01 348/222.1 |
| 2015/0163478 A1* | 6/2015 | Geiss | H04N 13/0242 348/47 |
| 2015/0312556 A1* | 10/2015 | Cho | G01S 17/89 348/43 |
| 2016/0047691 A1* | 2/2016 | Carlson | G01J 5/046 250/338.3 |
| 2016/0073962 A1* | 3/2016 | Yu | A61B 5/721 600/407 |
| 2017/0054968 A1* | 2/2017 | Woodman | G03B 35/00 |
| 2017/0122799 A1* | 5/2017 | Okudo | G01J 1/0403 |

FOREIGN PATENT DOCUMENTS

| | | |
|---|---|---|
| TW | 200825449 A | 6/2008 |
| WO | WO1998/011730 | 3/1998 |
| WO | WO2000/027131 | 5/2000 |
| WO | WO2001/067776 | 9/2001 |
| WO | WO2003/098940 | 11/2003 |
| WO | WO2004/029875 | 6/2004 |
| WO | WO2006/039486 | 4/2006 |
| WO | WO2007/044725 | 4/2007 |
| WO | WO2007/092545 | 8/2007 |
| WO | WO2007/092581 | 8/2007 |
| WO | WO2008/042137 | 6/2008 |
| WO | WO2008/003944 | 7/2008 |
| WO | WO2008/092771 | 8/2008 |
| WO | WO2009/093136 | 11/2009 |
| WO | WO2009/151903 | 3/2010 |
| WO | WO2010/065344 | 6/2010 |
| WO | WO2010/077625 | 7/2010 |
| WO | WO2010/120591 | 10/2010 |
| WO | WO2011/116203 | 4/2011 |
| WO | WO2011/063347 | 10/2011 |
| WO | WO2011/143501 | 11/2011 |
| WO | WO2012/082904 | 6/2012 |
| WO | WO2013/043751 | 3/2013 |

OTHER PUBLICATIONS

"Digital Camera Vector," http://www.freevector.com/digital-camera-vector/, in 2 pages, retrieved Oct. 1, 2012.

"K-x Image Resizing in Camera," http://support.pentaximaging.com/node/932, in 2 pages, retrieved Oct. 1, 2012.

"Princeton Instruments Introduces New 64-bit LightField™ Software Platform for Spectroscopy and Scientific Imaging," Princeton Instruments, in 1 page, Mar. 1, 2010.

"R2V: Vectorize Scanned Maps the Fast and Easy Way," http://www.ablesw.com/r2v/r2v.html, in 4 pages, Sep. 21, 2012.

"Synthetik Software," http://synthetik.com/studio-artist-features-overview/, in 4 pages, retrieved Oct. 1, 2012.

"VectorEye: The easiest way to convert images to line art," http://www.siame.com, in 1 page, retrieved Oct. 1, 2012.

"VextraSoft: Raster to Vector Conversion Software," http://www.vextrasoft.com/, in 4 pages, retrieved Oct. 1, 2012.

Aliaga & Carlbom, "Plenoptic Stitching: A Scalable Method for Reconstructing 3D Interactive Walkthroughs," SIGGRAPH '01 Proceedings of the 28th annual conference on Computer graphics and interactive techniques; pp. 443-450; ACM New York, NY, USA Aug. 1, 2001.

Birklbauer & Bimber, "Panorama Light-Field Imaging," Parallel Computing vol. 38 Iss. 6-7, p. 329-341 (Jun. 2012) (Abstract).

Birklbauer & Bimber, "Panorama Light-Field Imaging," SIGGRAPH '12 ACM SIGGRAPH 2012 Talk, ACM New York, NY, USA Aug. 5, 2012.

Camahort, Emilio, Apostolos Lerios, and Donald S. Fussell. "Uniformly Sampled Light Fields." Rendering Techniques 98 (1998): 117-130.

Chen et al., "Light Field Mapping: Efficient Representation and Hardware Rendering of Surface Light Fields," Proceedings of ACM SIGGRAPH 2002 (Jul. 2002).

Chen, "Novel Methods for Manipulating and Combining Light Fields," Dissertation, Sep. 2006.

Dodgson & Patterson, "'What's up Prof?:' current challenges in post-production and visual effects," in 11 pages, Mar. 12, 2010, available at https://www.cl.cam.ac.uk/~nad10/pubs/Whats-up-Prof-report-v3_2.pdf.

Easterbrook et al., "A system for distributed multi-camera capture and processing," 2010 Conference on Visual Media Production, IEEE, Nov. 17-18, 2010, in 7 pages.

Goldstein, "Pentax K-x Review," PhotographyBLOG http://www.photographyblog.com/reviews/pentax_kx_review/, in 6 pages, retrieved Oct. 1, 2012.

Guevara, "The ARCA of Iris: A new modular and scalable ditigal aerial imaging sensor architecture," ASPRS 2009 Annual Conference, Baltimore, MD, Mar. 9-13, 2009, in 8 pages.

Ingold, "Making Lytro panoramas?" forum post on Feb. 20, 2012, retrieved Jan. 23, 2013, in 2 pages.

Kelby, "Resizing Digital Camera Images for Print," http://www.peachpit.com/articles/article.aspx?p=1350900, in 2 pages, retrieved Oct. 10, 2012.

Levoy & Hanrahan, "Light Field Rendering," Proceedings of ACM SIGGRAPH '96 (1996).

Levoy, "Light Fields and Computational Imaging," Computer, vol. 39, No. 8, pp. 46-55, Aug. 2006.

Mikael, "How to Stretch an Image Into Vector in Digital Image Processing," eHow (retrieved Oct. 1, 2012), in 2 pages.

Nomura et al., "Scene collages and flexible camera arrays," EGSR'07 Proceedings of the 18th Eurographics Conference on Rendering Techniques, pp. 127-138, Jun. 25, 2007.

Papadakis et al., "Virtual camera synthesis for soccer game replays," 2010 Conference on Visual Media Production, IEEE, Nov. 17-18, 2010, in 10 pages.

Sebe et al., "Multi-view Geometry Estimation for Light Field Compression," VMV 2002, Erlangen, Germany, Nov. 20-22, 2002, in 8 pages.

Swaminathan & Nayar, "Polycameras: Camera clusters for wide angle imaging," Columbia University Academic Commons, Columbia University Computer Science Technical Reports, available at http://hdl.handle.net/10022/AC:P:29311, 1999.

Taguchi et al., "View-dependent scalable coding of light fields using ROI-based techniques," Proc. SPIE 6392, Three-Dimensional TV, Video, and Display V, 63920C (Oct. 17, 2006) (Abstract).

Wilburn et al., "High Performance Imaging Using Large Camera Arrays," Proceedings of ACM SIGGRAPH '05 (Jul. 2005).

Wilburn, "High performance imaging using arrays of inexpensive cameras," Thesis, Dec. 2004, in 128 pages.

Xiao et al., "Adaptive Interpolation Algorithm for Real-time Image Resizing," Proceeding of the First International Conference on Innovative Computing, Information and Control vol. 2, pp. 221-224, IEEE Aug. 30, 2006.

Zhang et al., "A Self-Reconfigurable Camera Array," EGSR'04 Proceedings of the Fifteenth Eurographics conference on Rendering Techniques, pp. 243-254, Eurographics Association, Jun. 21, 2004.

Office Action in U.S. Appl. No. 14/181,547 (assigned to Applicant), dated May 21, 2015 in 14 pages.

Office Action Response in U.Sl. App. No. 14/181,547 (assigned to Applicant), filed Oct. 21, 2015 in 12 pages.

Final Office Action in U.S. Appl. No. 14/181,547 (assigned to Applicant), dated Dec. 8, 2015 in 14 pages.

Office Action Response in U.S. Appl. No. 14/181,547 (assigned to Applicant), filed Jun. 8, 2016 in 12 pages.

Notice of Allowance in U.S. Appl. No. 14/181,547 (assigned to Applicant), dated Jun. 30, 2016 in 7 pages.

(56) References Cited

OTHER PUBLICATIONS

Office Action in U.S. Appl. No. 15/283,731 (assigned to Applicant), dated Mar. 15, 2017 in 13 pages.
Office Action Response in U.S. Appl. No. 15/283,731 (assigned to Applicant), filed Jul. 14, 2017 in 13 pages.
Restriction Requirement in U.S. Appl. No. 14/151,552 (assigned to Applicant), dated Jun. 9, 2015 in 6 pages.
Response to Restriction Requirement in U.S. Appl. No. 14/151,552 (assigned to Applicant), filed Jul. 24, 2015 in 6 pages.
Office Action in U.S. Appl. No. 14/151,552 (assigned to Applicant), dated Aug. 20, 2015 in 14 pages.
Office Action Response in U.S. Appl. No. 14/151,552 (assigned to Applicant), filed Nov. 20, 2015 in 7 pages.
Final Office Action in U.S. Appl. No. 14/151,552 (assigned to Applicant), dated Jan. 15, 2016 in 12 pages.
Office Action Response in U.S. Appl. No. 14/151,552 (assigned to Applicant), filed Jul. 14, 2016 in 12 pages.
Office Action in U.S. Appl. No. 14/151,552 (assigned to Applicant), dated Aug. 18, 2016 in 12 pages.
Final Office Action in U.S. Appl. No. 14/151,552 (assigned to Applicant), dated Dec. 29, 2016 in 12 pages.
Office Action Response in U.S. Appl. No. 14/151,552 (assigned to Applicant), filed Apr. 25, 2017 in 14 pages.
Notice of Allowance in U.S. Appl. No. 14/181,552 (assigned to Applicant), dated May 16, 2017 in 18 pages.
Final Office Action in U.S. Appl. No. 15/283,731 (assigned to Applicant), dated Nov. 3, 2017 in 7 pages.
Office Action in U.S. Appl. No. 15/283,731 (assigned to Applicant), dated Mar. 15, 2017 in 26 pages.
Notice of Allowance in U.S. Appl. No. 15/283,731 (assigned to Applicant), dated Apr. 13, 2018 in 8 pages.
Notice of Allowance in U.S. Appl. No. 15/283,731 (assigned to Applicant), dated Aug. 9, 2018 in 8 pages.
Notice of Allowance in U.S. Appl. No. 15/283,731 (assigned to Applicant), dated Dec. 26, 2018 in 9 pages.
Ryan Derousseau, "The next digital image revolution", in 7 pages, date listed is May 8, 2012.
Tessera, "OptiML WLC Technology—The Future of Cameras for Mobile Phones and Electronics", in 2 pages, Copyright date listed is 2007.
Fife et al., "A 3D Multi-Aperture Image Sensor Architecture", in 4 pages, Copyright date listed is 2006.

* cited by examiner

DENSE FIELD IMAGING

CROSS-REFERENCE TO RELATED APPLICATIONS

This application is a continuation of U.S. patent application Ser. No. 14/181,552, filed Feb. 14, 2014, and titled "DENSE FIELD IMAGING," which application claims the benefit of priority to U.S. Provisional Patent Application No. 61/765,661, entitled "DENSE FIELD IMAGING," filed Feb. 15, 2013, and to U.S. Provisional Patent Application No. 61/785,494, entitled "IMAGING SYSTEM WITH MULTIPLE IMAGING DEVICES HAVING OVERLAPPING FIELDS OF VIEW," filed Mar. 14, 2013. Each application referenced in this paragraph is incorporated by reference herein in its entirety so as to form part of this specification.

BACKGROUND

The present disclosure generally relates to acquiring and processing image data from a plurality of imaging devices, and particularly to acquiring and combining light field representations to form a dense field data set, and generating images from the dense field data set.

SUMMARY

The systems, methods and devices of the disclosure each have innovative aspects, no single one of which is indispensable or solely responsible for the desirable attributes disclosed herein. Without limiting the scope of the claims, some of the advantageous features will now be summarized.

Dense field imagers are disclosed which are configured to provide a plurality of light field representations of a scene. Dense field imagers can be configured to combine the plurality of light field representations to generate a dense field data set. A dense field imager can include a plurality of imaging elements configured to be joined into image blocks or facets, the imaging blocks providing data that can be used to generate light field representations for a scene. The dense field imager can include a plurality of image blocks or facets in a fixed or modular fashion such that the dense field imager is configured to combine light field representations from the plurality of facets. The facets can be mounted such that one or more facets are non-coplanar with other facets. The facets can include processing modules that are configured to generate light field representations from acquired pixel data. The generated light field representations can have overlapping fields of view. Accordingly, the dense field imager can provide dense field data over a field of view covered by the plurality of facets.

Image processing systems are also disclosed which are configured to receive light field representations from a plurality of sources and to combine the light field representations to generate a unitary, dense field data set. The generated dense field data set can be used to dynamically generate viewpoints or images having a variety of desired properties. For example, a depth of focus can be changed dynamically, stereoscopic images can be provided where an inter-ocular distance can be changed dynamically, images from a variety of virtual viewpoints can be generated, and the like. These image processing systems can allow dynamic editing and cinematography such that the importance of the configuration of the cameras acquiring the data is reduced as many of the creative decisions can be made during post-processing. For example, using the image processing systems described herein a director or video editor could re-light a scene virtually, perform depth-based editing or coloring, shift a focus of the image, zoom in or out of a scene, change a viewpoint of the scene, and the like.

In some embodiments, the image processing system can allow for users to personalize videos or movies. For example, a movie can be made using data acquired with the dense field imager described herein. The dense field image data can then be provided to allow a person not associated with the original creation of the movie to change characteristics of the movie by changing focus, viewpoint, lighting, zoom, etc.

In some embodiments, the dense field imager and/or image processing systems described herein can allow for a reduction or elimination of the involvement of camera operators in a venue. For example, one or more dense field imagers can be provided in a stadium at an athletic event and a director can dynamically change a focus of output images to focus on an object or region of interest. In some embodiments, a dense field imager can be configured to dynamically track or focus on one or more objects or persons of interest. It can be possible, for example, then to refocus on different objects according to focus criteria.

Some embodiments described herein provide for a dense field imaging block and array. The imaging block can include a support and at least a first imaging element and a second imaging element carried by the support, each imaging element comprising a sensor and a lens. The imaging block can include a mechanical connector for mechanically connecting the imaging block into an array of imaging blocks. The imaging block can include an electrical connector for electrically connecting the imaging block into an array of imaging blocks.

In some implementations, the first imaging element of the imaging block comprises a monochromatic filter, wherein the sensor of the first imaging element detects substantially monochromatic light passing through the monochromatic filter. In some implementations, the support comprises a wafer substrate and the wafer substrate can sometimes be made of a semiconductor material. In some implementations, the sensors are formed on the substrate. In some implementations, the lenses are wafer-level lenses.

Some embodiments provide for an imaging array that includes an array support and at least two imaging blocks carried by the array support. The at least two imaging blocks can include a first imaging block and a second imaging block. At least one of the sensors in the first imaging block can be non-coplanar with at least one of the sensors in the second imaging block. In some implementations, each of the sensors in the first imaging block are coplanar, each of the sensors in the second imaging block are coplanar, and each of the sensors in the first imaging block are non-coplanar with each of the sensors in the second imaging block. In some implementations, each imaging element has a primary optical axis, and the primary optical axis of at least one of the imaging elements in the first imaging block is substantially non parallel with the primary optical axis of at least one of the imaging elements in the second imaging block. In some implementations, each imaging element has a primary optical axis, the primary optical axes of the imaging elements in the first imaging block are substantially parallel, the primary optical axes of the imaging elements in the second imaging block are substantially parallel, and the primary optical axes of the imaging elements in the first imaging block are substantially non-parallel with the primary optical axes of the imaging elements in the second imaging block. In some implementations, a primary optical axis of at least one imaging element of the first imaging block is angularly adjustable with respect to a primary optical axis of at least one imaging element of the second imaging block. In some implementations, the imaging array comprises a user-actuatable control for achieving the angular adjustment.

The imaging array can also include, in some implementations, an image processing system configured to use image data captured by the first imaging block to generate a first image data set representative of a first portion of a light field. It can also be configured to use image data captured by the second imaging block to generate a second image data set representative of a second portion of the light field. It can also be configured to derive a third image data set from the first and second image data sets. In some implementations, the image processing system is carried by the array support. In some implementations, the image processing system is physically separate from the array support and receives the first and second image data sets wirelessly. In some implementations, the image processing system derives the third image data set at least partly by creating a spatial relationship tensor that includes spatial relationship information between elements of the first and second image data sets and using the spatial relationship tensor to derive the third image data set. In some implementations, the image processing system derives the third image data set at least partly by using the spatial relationship tensor to combine together the first and second portions of the light field.

In some implementations, the imaging block to include one or more processors carried by the support and configured to generate a light field representation based on pixel data acquired from the sensors. In some implementations, one or more of the lenses are removably replaceable with lenses having different optical characteristics. In some implementations, each imaging element has a primary optical axis, and most of the primary optical axes are substantially parallel. In some implementations, each imaging element has a primary optical axis, and at least two of the primary optical axes diverge in a direction leading away from the sensor. In some implementations, each imaging element has a primary optical axis, and at least two of the primary optical axes converge in a direction leading away from the sensor. In some implementations, each imaging element has a primary optical axis, and at least a first primary optical axis is angularly adjustable with respect to at least a second primary optical axis. In some implementations, the imaging block includes at least 8 imaging elements. In some implementations, the imaging elements are arranged in two rows of 4. In some implementations, the imaging block includes at least 16 imaging elements. In some implementations, the imaging elements are arranged in a 4×4 grid. In some implementations, at least one sensor is no larger than about 5 mm×5 mm. In some implementations, the imaging block also includes an FPGA chip carried by the support. In some implementations, at least some of the sensors have one or more of different sizes, different resolutions, or different sensitivities.

Some embodiments provide for an imaging array comprising an array support, and at least two imaging blocks according to any of the above descriptions, the imaging blocks being carried by the array support.

Some embodiments provide for a method of compiling an image data set. The method can include obtaining a first image data set representative of a first portion of a light field. The method can include obtaining a second image data set representative of a second portion of the light field. The method can include deriving, with one or more processors, a third image data set that is based on at least the first image data set, the second image data set, and information relating to a spatial relationship between the first and second portions of the light field. The method can include storing the third image data set in one or more memory devices.

In some implementations, the first image data set is derived from pixel data acquired by a first group of at least two imaging elements and the second image data set is derived from pixel data acquired by a second group of at least two imaging elements, each imaging element comprising a sensor and a lens. In some implementations, the method also includes processing the first image data set and the second image data set to determine the spatial relationship between the first portion of the light field and the second portion of the light field. In some implementations, deriving includes accessing a spatial relationship tensor representing the spatial relationship information to perform a geometric transform on the first image data set and second image data set. In some implementations, the at least two imaging elements in the first group are coplanar, the at least two imaging elements in the second group are coplanar, and the at least two imaging elements in the first group are non-coplanar with respect to the at least two imaging elements in the second group. In some implementations, the first and second image data sets additionally represent the first portion and the second portion of the light field as a function of time. In some implementations, the third image data set comprises light field information represented as a function of time. In some implementations, the first portion of the light field and the second portion of the light field comprise regions of the light field which at least partially overlap, and wherein the third data set comprises light field information derived from data in both of the first and second data sets that corresponds to the region of the light field lying within the overlap. In some implementations, the first portion of the light field and the second portion of the light field comprise regions of the light field which only partially overlap. The third data set can include light field information derived from data in the first image data set that corresponds to a first portion of a scene, and data in the second image data set that corresponds to a second portion of the scene that does not overlap with the first portion.

In some implementations, the third image data set comprises at least 4D light field information. In some implementations, deriving the third image data set comprises deriving the third image data set while maintaining the dimensionality of functions that represent the first and second portions of the light field. In some implementations, the first and second image data sets respectively represent the first and second portions of the light field as functions having at least four input parameters. In some implementations, the first and second image data sets respectively represent the first and second portions of the light field as functions having at least five input parameters. In some implementations, the first and second image data sets respectively represent the first and second portions of the light field as functions that represent luminance as a function of a position in space and a pointing direction.

In some implementations, viewable images are extractable from the third image data set. In some implementations, the viewable images comprise 2D images and/or 3D images. In some implementations, viewable motion video is extractable from the third image data set.

In some implementations, the method can also include accessing a fourth image data set representative of a third portion of the light field, wherein said deriving comprises deriving the third image data set based on at least the first image data set, the second image data set, the fourth image data set, and spatial relationships between the first, second, and third portions of the light field.

Some embodiments provide for a stored image data set on a memory device wherein the memory device includes a dense field image data set. The memory device can include a storage medium a dense field image data set stored in the storage medium and derived by relating a first image data set representative of a first portion of a light field to a second image data set representative of a second portion of the light field, using information relating to a spatial relationship between the first and second light fields.

Some embodiments provide for a computer-readable memory device, wherein the image data set comprises light field information represented as a function of time. In some implementations, the computer-readable memory device includes the image data set and the image data set includes at least 4D light field information. In some implementations, the first image data set was derived from pixel data acquired by a first imaging block comprising a support and at least two imaging elements carried by the support, and the second image data set was derived from pixel data acquired by a second imaging block comprising a support and at least two imaging elements carried by the support, each imaging element comprising a sensor and a lens.

Some embodiments provide for a machine comprising the computer-readable memory device above and one or more processors configured to derive the dense field image data set. In some implementations, the one or more processors configured to extract viewable images from the dense field image data set.

Some embodiments provide for a computer-readable memory device having viewable images that are 2D images, 3D images, and/or motion video.

Some embodiments provide for a method of creating a dense field image set. The method can include acquiring pixel data from a plurality of imaging elements, each imaging element comprising a sensor and a lens. The method can include generating a plurality of light field representations, each of the light field representations generated using pixel data from at least two of the imaging elements. The method can include creating a spatial relationship tensor representative of spatial relationships among the light field representations. The method can include utilizing the spatial relationship tensor, combining the light field representations to create a dense field image set.

In some implementations, combining the light field representations comprises stitching together light field representations having at least partially non overlapping fields of view to create a dense field image set having a significantly wider field of view than the individual light field representations. In some implementations, the lateral field of view of the dense field image set is greater than or equal to about 145 degrees. In some implementations, the imaging elements are arranged on a common support. In some implementations, at least some of the imaging elements are not coplanar. In some implementations, each light field representation is generated using pixel data from an imaging block comprising at least two imaging elements. In some implementations, at least some of the imaging blocks are not coplanar. In some implementations, at least one of the imaging elements comprises a monochromatic filter, and wherein light passing through the monochromatic filter is detected by the sensor of the at least one imaging element. In some implementations, at least half of the imaging elements comprise monochromatic filters. In some implementations, substantially all of the imaging elements comprise monochromatic filters.

Some embodiments provide for an imaging system configured to generate a light field representation for each of a plurality of imaging blocks. The plurality of imaging blocks each can include at least two imaging elements, and each of the imaging elements can include an image sensor and a lens. The imaging system can include a dense field image processor module configured to, for each imaging block of at least two of the plurality of imaging blocks, generate pixel correspondence information for the imaging block, the pixel correspondence information representative of spatial relationships between pixels in each imaging element of the imaging block and corresponding pixels in other imaging elements of the imaging block. The module can be configured to utilize the correspondence information to generate a light field representation using pixel data acquired by the respective imaging block.

In some implementations, the dense field image processor module is further configured to create a spatial relationship tensor representative of spatial relationships among the light field representations, and, utilizing the spatial relationship tensor, combine the light field representations to create a dense field image set.

In some implementations, the imaging blocks are arranged on a common support. In some implementations, the imaging blocks are formed in a wafer. In some implementations, the imaging elements of each imaging block are coplanar with respect to one another. In some implementations, at least some of the imaging blocks are not coplanar with respect to other ones of the imaging blocks. In some implementations, at least some of the imaging blocks are arranged on physically separate supports.

Some embodiments provide for a dense field imaging system that includes a plurality of imaging blocks, each of the imaging blocks comprising at least two sensor/lens pairs, wherein at least some of the imaging blocks are substantially non-coplanar with each other and have at least partially non-overlapping fields of view. The dense field imaging system can include a dense field image processor module configured to, for each imaging block, generate a light field representation using pixel data acquired by the sensor/lens pairs. The module can be configured to generate a spatial relationship tensor representative of spatial relationships between the light field representations. The module can be configured to use the spatial relationship tensor to combine the light field representations to create a dense field imaging set having a substantially wider field of view than the individual light field representations. In some implementations, each of the imaging blocks comprises a wafer substrate on which the sensors are formed. In some implementations, the dense field imager also includes a control configured to adjust the angular relationship between sensor/lens pairs.

Some embodiments provide for a dense field imaging system that includes a plurality of imaging blocks arranged on a support, each of the imaging blocks comprising at least two imaging elements, each of the imaging elements comprising a sensor and lens, wherein at least some of the imaging elements comprise monochromatic filters. The dense field imaging system can include a dense field image processor module configured to, for each imaging block, generate a light field representation using pixel data acquired by the imaging elements of the imaging block. The module can also be configured to combine the light field representations to create a dense field image set.

In some implementations, most of the sensors are monochromatic. In some implementations, each of the sensors is monochromatic. In some implementations, each of the imaging blocks includes a support comprising a wafer substrate, and wherein the sensors are formed on the wafer substrate. In some implementations, the lenses comprise wafer level lenses.

BRIEF DESCRIPTION OF THE DRAWINGS

The drawings are provided to illustrate example embodiments described herein and are not intended to limit the scope of the disclosure. Throughout the drawings, reference numbers may be re-used to indicate general correspondence between referenced elements.

DETAILED DESCRIPTION

Figure 1:
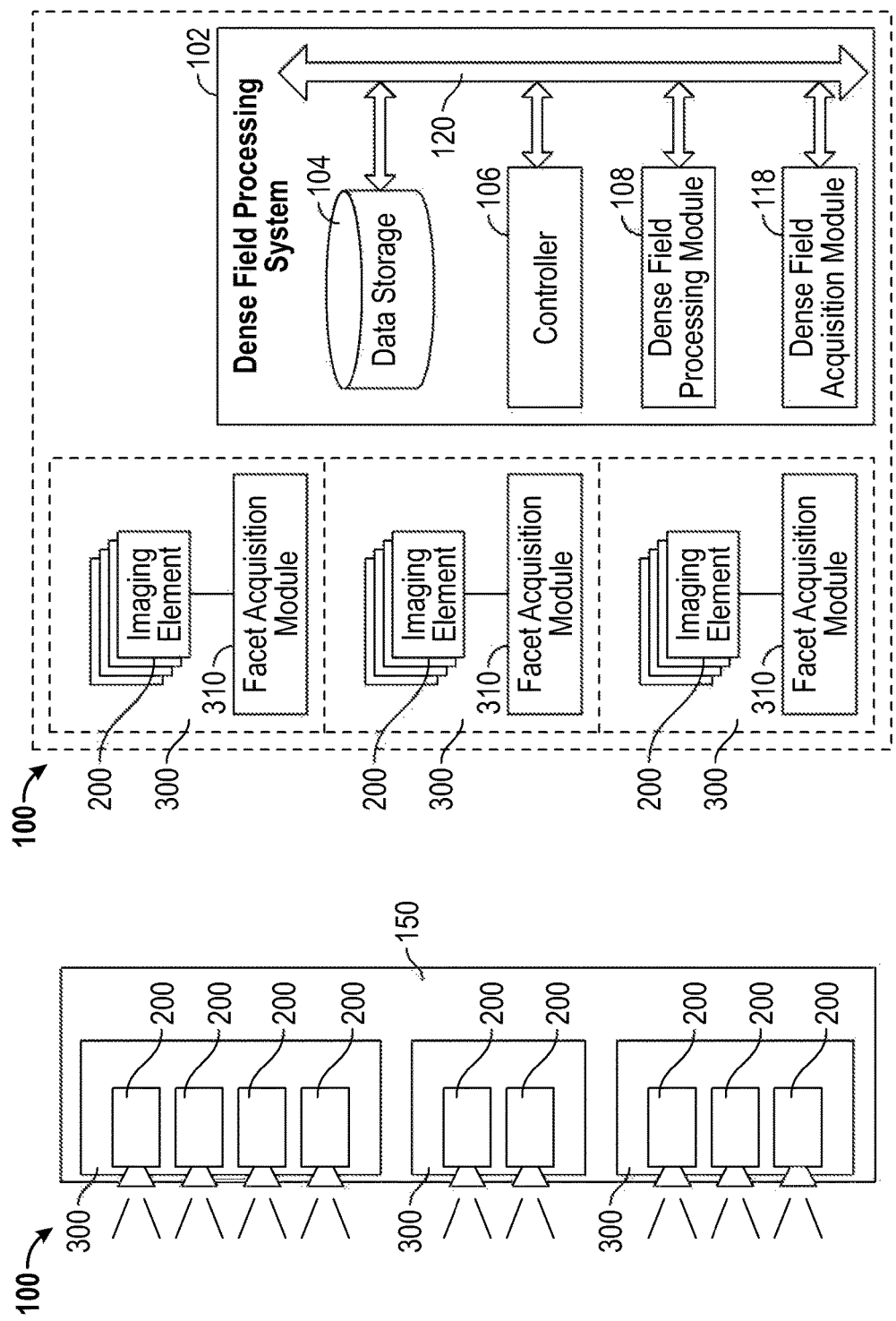
FIG. 1A illustrates a structural block diagram of an embodiment of an imaging system having a plurality of imaging blocks or facets, each facet having a plurality of imaging elements.
FIG. 1B illustrates a functional block diagram of an embodiment of an imaging system, such as a dense field imager, coupled to a dense field processing system.

In the following description, reference is made to the accompanying drawings. It is to be understood that other structures and/or embodiments may be utilized. Various aspects of the disclosure will be described with regard to certain examples and embodiments, which are intended to illustrate but not to limit the disclosure. Nothing in this disclosure is intended to imply that any particular feature or characteristic of the disclosed embodiments is essential.

Generally, image sensors that capture digital images are made up of multiple picture elements, or pixels. Each pixel receives light that is directed to it by an optical system. The light received by the pixel creates an electrical charge, and the cumulative charge caused by light received by the pixel is converted into a digital value. By combining information from multiple image sensors, multiple capabilities can be provided that, for example, improve image quality and/or provide information that generally is not obtained using a single image sensor. For example, dynamic range can be increased, noise can be reduced, directional and/or depth information can be extracted, focus can be adjusted, resolution can be enhanced, and the like.

A plurality of imaging elements having their own optics and image sensors can be combined to provide advantages outlined above and described in greater detail herein. A plurality of imaging elements can be combined into an image block where each imaging element provides image data from their sensors. The image data from the plurality of imaging elements in the image block can be combined to produce a light field representation over a field of view. Multiple image blocks can be combined or grouped to form an imaging system, such as a dense field imager, which is configured to combine light field representations from a plurality of image blocks.

Image processing systems can also be configured to receive image data from a plurality of imaging elements to produce light field representations. These or other image processing systems can also be configured to receive light field representations covering multiple fields of view and combine the light field representations to enhance or increase information contained in the combined light field representation and/or increase a field of view of the combined light field representation.

As will be described in further detail, imaging systems described herein can capture pixel data that can be used to generate one or more light field representations, and in some embodiments provide similar advantages to light-field and plenoptic cameras, in addition to providing other advantages. Such advantages can include the capability to adjust focus and/or depth of field in post-processing. For instance, some of the multi-imaging device cameras described herein can capture light field information about the image scene, which can be used by the by post-processing software (or by the camera system) to provide adjustment of focus, depth of field, and other characteristics. Such adjustments can be made after recording, such as during playback or editing.

As used herein, the terms light field data, light field representation, and the like can be used to mean, for example and without limitation, a representation of luminance or radiance as a function of space, direction, wavelength, and/or time. A light field can be used to mean the radiance or luminance of light within a scene, independent of any device used to capture light-related information. In some embodiments, a light field can be represented using a function with at least five dimensions as input wherein the dimensions can include three spatial dimensions and two directional dimensions. For example, the spatial dimensions can be coordinates in a Cartesian coordinate system (e.g., x, y, and z) and the directional coordinates can be angles in a spherical coordinate system (e.g., θ and φ, or azimuth and elevation). In some embodiments, a light field can be represented using a function with at least four dimensions as input where the spatial and directional dimensions are represented using a parameterization such as a light slab, light spheres, points on a plane with an angle, or the like, reducing the number of dimensions used to represent position and direction from five to four. A light field representation can include a wavelength as input, thereby representing luminance or radiance as a function of wavelength in addition to position and direction. A light field representation can include time as input, thereby representing luminance or radiance as a function of time in addition to position and direction. A light field representation can include both time and wavelength as input in addition to position and direction. In some embodiments, a separate light field representation can be used for different wavelength bands (e.g., a blue light field representation, a green light field representation, a red light field representation, a broadband light field representation, etc.). The light field representations or light field data, then, can be used to approximate or represent a portion of the light field, e.g., the portion of the light field within a scene or region imaged by one or more imaging devices.

As used herein, the terms dense field, dense field image data, dense field image set, dense field representations, and the like can be used to mean, for example and without limitation, a unitary data set resulting from combining a plurality of input light field representations wherein the unitary data set can be used to generate multiple viewpoints and/or images. The unitary data set can include information about relationships between input light field representations, relationships between pixels in imaging elements used to acquire the input light field data, alignment information, geometric transformations, and the like.

It is to be understood that data such as light field data and/or dense field image data can include metadata that can be used to provide information related to the light field data and/or dense field image data. Metadata can be used, for example and without limitation, to describe a resolution of one or more imaging elements, color depth, image sensor properties, focal length of imaging elements, zoom of imaging elements, acquisition date and time, aperture settings, dense field imager information, calibration information, and other such data. The metadata can also include information that is associated with a camera operator, a setting in which the data is acquired, a position or orientation of an imaging element or dense field imager, and the like. Metadata can be used to store information that can be used to generate viewpoints, to combine image data, to process acquired data, and the like.

Dense Field Imager

FIG. 1A illustrates a structural block diagram of an embodiment of an imaging system 100, such as a dense field imager, having a plurality of imaging blocks or facets 300, each facet 300 having an array of imaging elements 200. The dense field imager 100 includes an array support 150 configured to position and orient the plurality of facets 300. As described herein, the dense field imager 100 can have a variety of configurations and can include a plurality of facets 300 that are coplanar, non-coplanar, or a combination of coplanar and non-coplanar facets 300. The imaging elements 200 can be grouped into facets 300 where the imaging elements 200 are mounted on or attached to a facet support. The imaging elements 200 on a given facet 300 can be substantially coplanar with the other imaging elements 200 on the same facet or the imaging elements 200 can be non-coplanar such that the facet support is generally concave, convex, or has some other non-planar shape. In some embodiments, the imaging elements 200 on a particular facet 300 have optical axes that are substantially parallel. In some embodiments, the optical axes of the facets 300 (e.g., a geometric average of the optical axes of the imaging elements 200) can be substantially parallel, can generally diverge, can generally converge, or any combination of these. In some embodiments, the dense field imager 100 includes facets 300 that are not coupled to a common support 150, but are loosely physically coupled or physically separate and logically connected through a common wired or wireless connection to one or more acquisition or processing systems. In some embodiments, the plurality of facets 300 can be grouped into an imaging system.

FIG. 1B illustrates a functional block diagram of an embodiment of an imaging system 100, such as a dense field imager, coupled to a dense field processing system 102. The dense field imager 100 includes a plurality of imaging elements 200, wherein the imaging elements 200 are grouped into image blocks or facets 300. The dense field imager 100 can comprise a plurality of facets 300 which are electrically coupled and which can share at least a portion of image acquisition electronics.

Each of the plurality of imaging elements 200, as described in greater detail herein, can include optics and an image sensor such that the imaging element 200 can provide image data of a scene. For example, the imaging element 200 can be a conventional camera configured to provide raw, processed, and/or compressed image data corresponding to light collected from a scene. The plurality of imaging elements 200 can be identical or they can differ from one another in a variety of ways. For example, imaging elements 200 can have different focal lengths, dynamic ranges, frame rates, photosensitivity, color gamut, fields of view, and the like. The imaging elements 200 can be configured to provide video in addition to images, and it should be understood that throughout this disclosure where images or image data is discussed video or video data is included. Thus, in some implementations, the imaging system 100 is configured to acquire motion and still images at the same time.

Two or more imaging elements 200 can be combined to form an image block or facet 300. The plurality of imaging elements 200 in a facet 300 are configured to provide image data of a scene to facet acquisition modules 304, which can be configured to combine the image data for processing. For example, the facet acquisition module 304 can be configured to combine image data from the imaging elements 200 to provide light field data, dense field data, stitched image data, combined image data, or any combination of these. In addition, facets 300 can be combined in a modular fashion to dynamically change a size of the imaging system 100.

The facet acquisition modules 304 can be configured to send the output of the module to a dense field acquisition module 118 of the dense field processing system 102. The dense field processing system 102 can be configured to generate light field data from pixel data received from the facet acquisition modules 304. In some embodiments, the dense field processing system 102 is configured to join light field data received from the facet acquisition modules 304 to generate dense field data. In some embodiments, the dense field processing system 102 can be configured to perform image processing functions as described herein, such as, for example and without limitation, calibration, registration, filtering, alignment, stitching, fusion, and the like. In some embodiments, the facet acquisition modules 304 perform some or all of these functions in addition to or instead of the dense field processing system 102 performing them.

The dense field processing system 102 can receive the output of the facet acquisition modules 304 and further process the image data. The dense field processing system 102 can include data storage 104 for storing image data, calibration data, metadata, camera data, and the like. The dense field processing system 102 can include a controller 106 configured to control operation of the components of the system 102. The controller 106 can include one or more computer processors, FPGAs, ASICs, DSPs, or the like. The dense field processing system 102 can include a dense field processing module 108 configured to perform analysis and processing functions. The processing module 108 can include hardware, firmware, and/or software components. For example, the processing module 108 can be configured to perform executable instructions stored on a computer readable medium. The processing module 108 can include hardware components programmed to perform defined functions, such as a FPGA configured to fuse or stitch image data.

The dense field processing system 102 can be configured to provide a variety of processing capabilities through the dense field processing module 108. For example, the dense field processing system 102 can be configured to fuse image data which can include, without limitation, joining image data at common or coinciding locations to increase information available at those locations. The system 102 can also be configured to stitch image data by, for example, identifying corresponding features, pixels, or light rays in regions of overlapping image data and joining image data from two or more imaging elements or facets based at least in part on the image data in the overlapping region. The dense field processing system 102 can be configured to enhance a resolution of an output image by, for example, combining a plurality of input images of a scene and performing sub-pixel sharpening. The dense field processing system 102 can be configured to provide substantially clear imagery of a scene that is partially occluded by combining image data from a variety of viewpoints to piece together a complete image substantially free of the occlusion. The dense field processing system 102 can be configured to provide 3D imagery with a configurable inter-ocular distance by providing imagery from two, adjustable viewpoints. The dense field processing system 102 can be configured to provide imagery from a variety of viewpoints and/or viewing angles wherein the viewpoints can correspond to locations with imaging elements or the viewpoints can be virtual viewpoints which do not correspond to locations with at least one imaging element. The dense field processing system 102 can be configured to change a depth of field and/or a focus depth of an output image. The dense field processing system 102 can be configured to provide output imagery having a higher dynamic range than any individual camera or imaging element 200 used to acquire the image data. The dense field processing system 102 can be configured to receive image data and/or light field data and output dense field image data.

The imaging system 100 can be configured to acquire image data in a variety of combinations. Image data from the imaging elements 200 can be combined to provide light field data, to enhance resolution of an imaged scene, to provide image data having a relatively high dynamic range, to produce video with a high frame rate, and the like. Image data acquired by the imaging elements 200 can be provided to the dense field processing system 102 in a raw and/or compressed format, thus allowing the dense field processing system 102 to manipulate and process the image data in a variety of manners. For example, the imaging system 100 can be configured to record any combination of high resolution images, light field data, dense field data, and/or smaller compressed images or video (e.g., jpeg, mpeg, TIFF, etc.). Accordingly, image data from the imaging system 100 can be provided for relatively quick editing or distribution, and/or it can be combined and stored to create a larger data set for post-processing and analysis.

In some embodiments, the imaging system 100 can be an array-based imaging system that includes an array of image blocks or facets 300. Each of the facets 300 can include at least two imaging elements 200 comprising at least a sensor and lens pair. The dense field acquisition module 118 can be configured to generate a light field representation for each facet 300 using pixel data acquired by the imaging elements 200 of the facet 300. The dense field acquisition module 118 can be configured to utilize alignment information that specifies geometric relationships between the imaging elements 200 to join light field representations by additively combining at least overlapping portions of the light field representations to create a dense field image set. The dense field image set, in some embodiments, can be configured to enable generated viewpoints having improved resolution, improved correspondence with the scene, improved perceived quality, and the like as compared to the individual light field representations.

In some embodiments, the dense field acquisition module 118 is configured to create a spatial relationship tensor that includes spatial relationships among the light field representations. The dense field acquisition module 118 can use the spatial relationship tensor to stitch together non-overlapping portions of the light field representations. The output of this process can provide a dense field image set that has a substantially wider field of view than the individual light field representations. In some embodiments, the dense field acquisition module 118 is configured to obtain the alignment information by processing calibration images acquired by the imaging elements 200.

Imaging Elements

Figure 2:
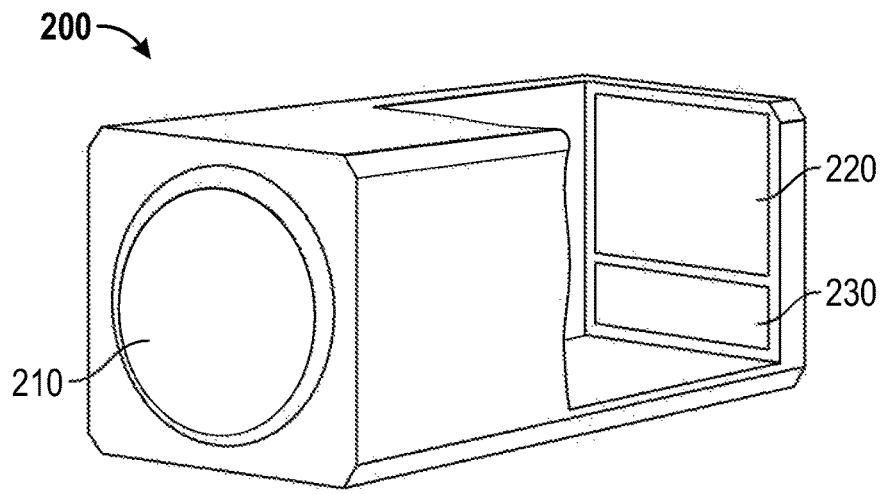
FIG. 2 illustrates an example imaging element that includes a lens, an image sensor, and image acquisition electronics.

FIG. 2 illustrates an example imaging element 200 that includes a lens 210, image sensor 220, and image acquisition electronics 230. When used in the imaging system 100, e.g., a dense field imager, the output of the image acquisition electronics 230 can be sent to a facet acquisition module 304 configured to join image data from a plurality of imaging elements 200. The example imaging element 200 can be a conventional camera configured to produce a color or monochromatic image or video of a scene.

In some embodiments, a dense field imager includes a plurality of imaging elements 200. The imaging elements 200 can be arranged, for example, in an array, attached to one or more supports. The supports can position the imaging elements 200 such that the imaging elements are all substantially coplanar or non-coplanar, or some fraction of the imaging elements 200 can be coplanar and another fraction can be non-coplanar, or any combination of coplanar and non-coplanar. The supports can position the imaging elements 200 such that the optical axes of the imaging elements 200 are all substantially parallel, only a portion are substantially parallel, or none are substantially parallel. The imaging elements 200 can be mounted in such a way that, in a direction moving away from the imaging sensor 220, their optical axes converge, diverge, converge along one axis and diverge along another axis, converge along one axis and are substantially parallel along an orthogonal axis, or diverge along one axis and are substantially parallel along an orthogonal axis.

Each imaging element 200 includes a sensor 220 and an optical system 210, which can include one or more lens elements. The field of view of the imaging elements 200 used in the imaging system 100 can be different from one another or substantially identical. By combining images captured from one or more of the imaging elements 200, the overall resolution of output images can be increased. Further, the portions of the captured images that correspond to the overlapping regions may be stacked to reduce noise. For instance, the noise from overlapping regions can be averaged together in some cases to provide noise reduction.

If the imaging elements 200 capture images that are aligned along pixel boundaries, the overlapping regions may be stacked directly. However, it is likely that the overlapping portions will not align exactly along pixel boundaries. That is, the portion of the image captured by a particular pixel in an imaging element 200 will likely not match exactly with the portion of the image captured by a pixel in an adjacent imaging element 200. Rather, the portion of the image captured by a particular pixel in an imaging device 200 will likely partially correspond to two or more pixels in adjacent imaging devices 200.

Imaging elements 200 can include an optical low-pass filter to avoid aliasing effects that could occur by sampling an image at the resolution of the sensor. Assuming the optical low-pass filter blocks optical frequencies above the Nyquist frequency for a given sensor resolution, the captured image can be up-sampled to increase the number of sample points, which allows for more accurate alignment of sample points between the images. In some cases, a low-pass filter is not used. For instance, the low pass filter in some cases can be moved out of the optical path or can be removed.

Stacking of images can be accomplished in substantially real time by the imaging system 100 having a plurality of imaging elements 200, particularly if information about the alignment of the plurality of imaging elements 200 is known in advance and/or up-sampling is not needed. Alternatively, stacking of images can be accomplished, for example, as part of a post-processing workflow, where more precise alignment of the images could be achieved using more computationally intensive algorithms.

Similarly, stitching of images can be accomplished in substantially real time from image data from the plurality of imaging elements 200, particularly if information about the alignment of the plurality of imaging elements 200 is known in advance and/or up-sampling is not needed. Alternatively, stitching of images can be accomplished, for example, as part of a post-processing workflow, where more precise alignment of the images could be achieved using more computationally intensive algorithms.

The imaging element 200 can include one or more lens components 210 that focuses light passing through an aperture onto an array of pixels 220. The lens components 210 can comprise a variety of lens types, and can be made of a variety of materials including glass and plastic, for example. In some configurations, the lens components 210 are fixed-focal length lenses having a relatively wide depth-of-field. The lenses may have a fixed zoom ratio as well. In some embodiments, one or more of the lens components 210 includes a liquid lens cell. In some embodiments, the lens components 210 can have a dynamic focus and zoom ratio. In some embodiments, the lens components 210 provide a relatively narrow depth-of-field. In some embodiments, the lens components 210 include dyes or filters such that substantially monochromatic light or light within a defined portion of the spectrum reaches the sensor 220. The lens components 210 can be removable, such that different characteristics or properties can be provided to the imaging element 200 by changing the lens components 210.

In some embodiments, the imaging elements 200 are configured to have a relatively small size. Keeping the size of the imaging elements 200 small can have a number of advantages. For instance, maintaining a smaller form factor can increase the number of imaging elements 200 included in the system, providing improved resolution among other advantages. Smaller sensors 220 also have reduced noise, improved depth of field, and are less prone to manufacturing defects rates. Also, the number of picture elements, or "pixels," in a sensor typically determines the resolution. A large sensor may use more pixels than a small sensor. Alternatively, a large sensor may use larger pixels to decrease noise in the image. However, an increase in sensor size means there will also be an increase in the likelihood that the sensor will contain defects. Further, a larger sensor will require a larger lens, with additional expense and weight.

It can be desirable to maintain or improve the larger sensor advantages, such as greater resolution and decreased noise, while minimizing the larger sensor disadvantages, such as increased overall system physical size and cost.

While the size and shape of the sensors 220 and lens components 210 can vary between imaging elements 200, in some embodiments the sensors 220 have a substantially square form factor that is about 5 mm by 5 mm, and the lenses are about 15 mm in diameter. In some embodiments, the sensors 220 have a square form factor that is smaller than about 10 mm by 10 mm. In other embodiments, the sensors 220 have a rectangular form factor with a surface area that is less than about 400 square millimeters, less than about 225 square millimeters, less than about 100 square millimeters, less than about 50 square millimeters, or less than about 25 square millimeters. In various embodiments, the diameter or width of the lens components 210 is less than about 50 mm, less than about 40 mm, less than about 30 mm, less than about 20 mm, less than about 15 mm, less than about 10 mm, or less than about 5 mm.

The imaging elements 200 can also optionally include a neutral density filter for exposure control, black shading, noise correction and the like. In another embodiment, a common neutral density filter is used for all of the imaging elements 200.

Sensors 220 may include, for example, an array of charge-coupled devices (CCD) or Complementary Metal-Oxide-Semiconductor (CMOS) image sensor cells, such as active-pixel sensor cells. Such image sensors are typically built on silicon chips and may contain thousands or millions of image sensor cells.

The sensor 220 further includes output circuitry 230 configured to process and output image information for one or more pixels. For example, the output circuitry 230 is configured to process and digitize the analog pixel values received from the pixel array. The output circuitry 230 of sensor 220 in one configuration includes sets of programmable-gain amplifiers (PGAs) and analog-to-digital converters (ADCs), although a variety components may be used in various implementations. The output circuitry 230 presents the digitized, processed values of the currently selected set of pixels (e.g., a selected row or subset of rows) for storage and/or further processing. For example, the sensor 220 may transmit the values to a memory, image processing module, or other component of the imaging system 100 for storage and/or processing. In some instances, the sensor 220 buffers the values for one or more rows before transmission. Depending on the embodiment, the output circuitry 230 can be configured to process and output a single row of pixels or a subset of two or more rows of pixels at a given time. In one embodiment, the sensor 220 outputs two rows at a time and can include two instances of similar output circuitry 230.

In some embodiments, one or more imaging elements 200 can include an optical sensor 220 and lens configuration 210 with additional lens elements near the sensor, such as a micro-lens array. Configured in this manner, the imaging element 200 can be used to capture image data that can be used to produce a light field representation for a portion of the imaged scene, which can be used by the imaging system 100, the image processing system 102, and/or a post-processing system to adjust focus, depth of field, or provide other effects.

The imaging elements 200 can be heterogeneous. In one embodiment, the imaging elements 200 use different color filters. For example, one or more imaging elements 200 may capture light in the green range, one or more other imaging elements 200 may capture light in the red range, and yet one or more other imaging elements 200 may capture light in the blue range. In another embodiment, the imaging elements 200 use different monochromatic sensors sensitive to a portion of the visible, infrared, or ultraviolet spectrum. The result being similar to the use of different color filters.

In one embodiment, the imaging system 100 includes a first set of imaging elements 200 of fixed optical power, and a second set of imaging elements 200 having a variable optical power (e.g., liquid lens cells). In one embodiment, the imaging system 100 includes a first set of imaging elements 200 including liquid lenses, and a second set of imaging elements 200 including non-liquid lenses (e.g., solid glass or plastic).

In one embodiment, the imaging elements 200 use different pixel sizes. For example, one or more imaging elements 200 may capture light in the green range using normal sized pixels, one or more other imaging elements 200 may capture light in the green range using larger pixels, one or more other imaging elements 200 may capture light in the red range using normal sized pixels, and yet one or more other imaging elements 200 may capture light in the blue range using normal sized pixels. In another embodiment, one or more imaging elements 200 may capture light using a Bayer pattern with the sensor having normal sized pixels, while one or more other imaging elements 200 may capture light using a Bayer pattern or light in the green range using larger pixels. The larger pixels tend to have less noise and may provide greater dynamic range, while the smaller pixels provide greater resolution. These descriptions are intended to be exemplary only, and other variations of color patterns and pixel sizes are within the scope of the invention.

In one embodiment, the imaging elements 200 use different sensor sizes. In one embodiment, imaging elements 200 use sensors having different aspect ratios.

The imaging elements 200 can further have differently sized apertures and/or focal lengths. For instance, a first group of one or more imaging elements 200 can have a first aperture size and/or focal length, and a second group of one or more imaging elements 200 can have a second aperture size and/or focal length. In one embodiment, imaging elements 200 in the first group have relatively wide apertures and capture images within a relatively short depth of field, while imaging elements 200 in the second group have relatively narrow apertures, and capture images within a relatively large depth of field. Depending on the desired photographic effect, image data from the first group, the second group, or a combination thereof can be utilized as appropriate. Similarly, the imaging elements 200 having different focal lengths can be used to provide focus control. The use of a depth map to utilize imaging elements 200 having different apertures and/or focal lengths is described in greater detail herein.

In yet other embodiments, a first group of one or more imaging elements 200 can include a lens element(s) 210 made of a first material (e.g., glass), and a second group of one or more imaging elements 200 can include a lens element(s) 210 made of a second material (e.g., plastic). Or a first group of imaging elements 200 may include a lens element(s) 210 having a first type of coating (e.g., a first type of anti-reflective coating) applied thereon, while a second group of imaging elements 200 may include a lens element(s) 210 having a second type of coating (e.g., a second type of anti-reflective coating) applied thereon.

In addition, the imaging elements 200 can be configured to capture image data having different ranges of wavelength and frequency. For instance, particular groups of imaging elements 200 can be configured to image data in one or more of the visible, infrared, ultraviolet, x-ray and/or ultraviolet spectrums.

In certain cases, the imaging system 100 can exploit the multi-imaging element configuration by calibrating the imaging elements 200 in the imaging system 100 using the other imaging elements 200. For instance, one or more test images can be captured, and the results can be normalized or otherwise processed to diagnose the individual imaging elements 200. Based on the processing, the imaging system 100 can calibrate the individual imaging elements 200 in the array to adjust color, white balance, camera response curves, and the like. In some cases, instead of, or in addition to, calibrating the individual imaging elements 200, the calibration results are used in post-processing to adjust the captured image data.

In some embodiments, the imaging system 100 includes a control configured to adjust an angular relationship between imaging elements 200. The control can be configured to adjust a direction of the optical axis, focal length, aperture, zoom ratio, or the like for individual imaging elements 200.

Imaging Blocks or Facets

Figure 3:
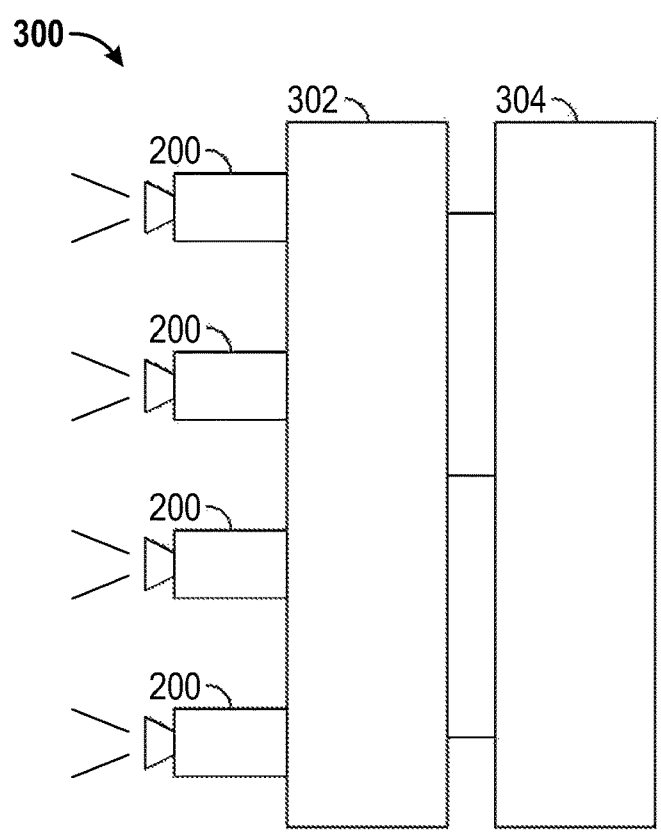
FIG. 3 illustrates an example of a single facet of a dense field imager, the single facet comprising a plurality of imaging elements with overlapping fields of view.

FIG. 3 illustrates an example of an imaging block or facet 300 of an imaging system 100, such as a dense field imager. The facet 300 comprises a plurality of imaging elements 200 with overlapping fields of view. The facet 300 includes an element support 302 configured to substantially secure the imaging elements 200 in a particular position and/or orientation. The facet 300 includes facet acquisition module 304 configured to receive data from the imaging elements 200. In some embodiments, the facet acquisition module 304 receives raw pixel data from the imaging elements 200. In some embodiments, the facet acquisition module 304 receives processed image data from the imaging elements 200, such as compressed image data.

The facet acquisition module 304 can be a common acquisition board for all imaging elements 200 on the facet 300. For example, the facet acquisition module 304 can include a FPGA configured to receive image data from the imaging elements 200 and output processed image data for the dense field acquisition module 118 of the dense field imager 100.

The imaging elements 200 can be mounted on an element support 302 where the element support 302 can be substantially rigid or it can be flexible. For example, the element support 302 can change shape to affect an overlapping of the fields of view of the imaging elements 200, such as becoming convex to decrease the overlap between fields of view of adjacent imaging elements or becoming concave to increase overlap. The element support 302 can have a variety of shapes such as planar, concave, convex, or some other regular or irregular configuration. The element support 302 can be configured to emphasize a desirable output, such as increasing an overlap of the fields of view of imaging elements 200 where it is desirable to fuse image data to increase resolution, decrease noise, increase position accuracy, and the like. The element support 302 can be configured to decrease an overlap of the fields of view of adjacent imaging elements 200 to increase a composite field of view of the facet 300. The element support 302 can be flat, arched, or some other geometric or non-geometric shape.

The imaging elements 200 can be arranged in any particular fashion on the element support 302. For example, the imaging elements 200 can be in rows, columns, staggered, in a circular pattern, in a random configuration, an irregular configuration, in a circular or hexagonal configuration, or the like.

In some embodiments, the imaging elements 200 can have heterogeneous properties configured to enhance particular aspects of the dense field imager 100. For example, the imaging elements 200 can be configured to be smaller to increase a density of imaging elements 200 on the facet, to decrease a size of the dense field imager 100, to increase sharpness of an image, and the like. As another example, the aspect ratios of the imaging elements 200 can be configured to provide a desired composite field of view. The image sensors can be rectangular and can be oriented such that the longer dimension is substantially vertical rather than horizontal, which is a typical orientation for an image sensor when acquiring video, for example. The image sensors can be a mix of square, circular, and/or rectangular shapes. The imaging elements 200 can be oriented pointing in different directions. The imaging elements 200 can be configured to have different focal lengths, resolutions, sensitivities, etc. Differences in imaging elements 200 can be accounted for in image processing at the facet acquisition module 304, the dense field acquisition module 118, or the dense field processing module 108.

Figure 4:
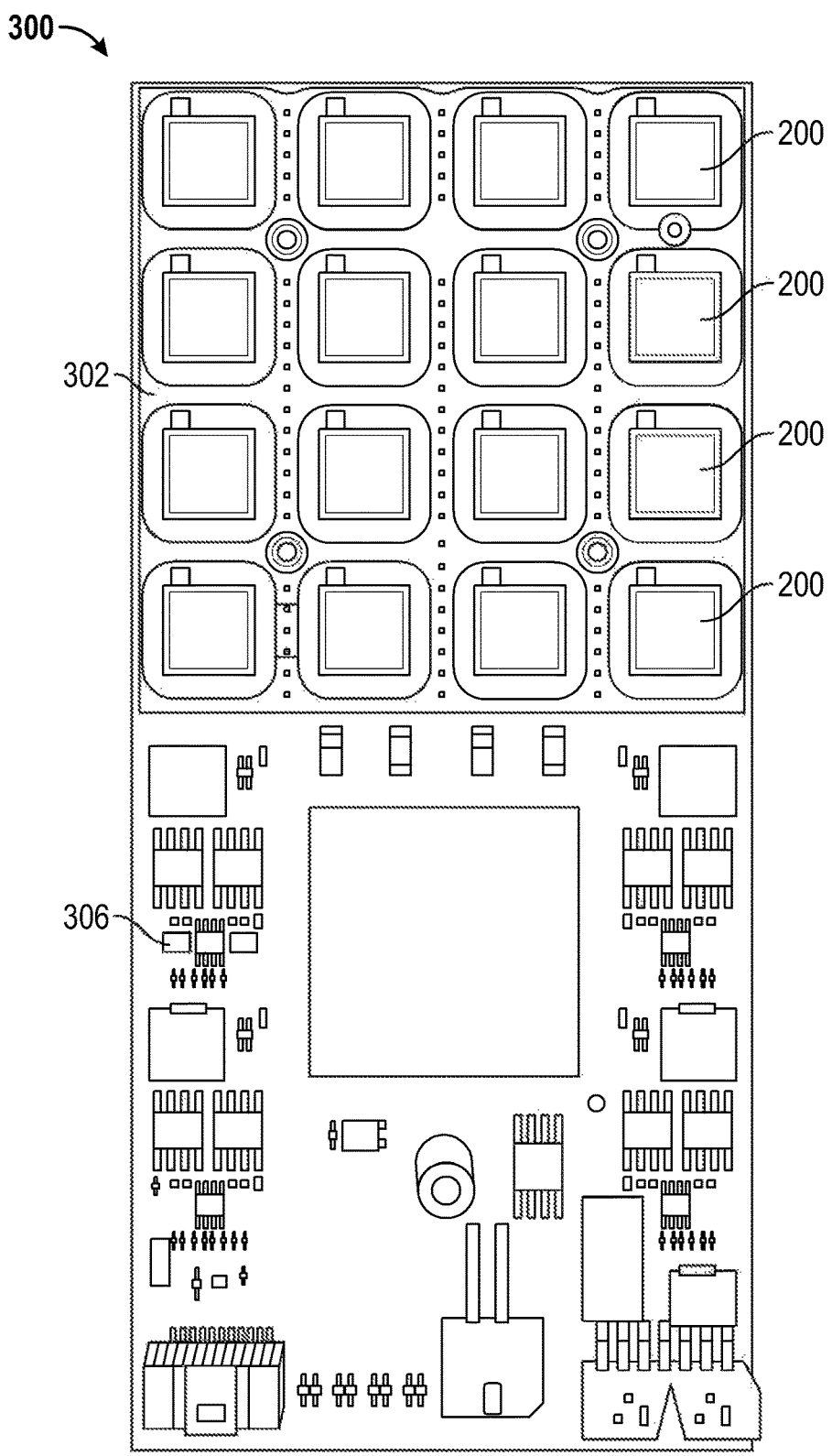
FIG. 4 illustrates an example of a facet having a plurality of imaging elements coupled together on a common support, the common support including facet processing electronics.

FIG. 4 illustrates an example embodiment of a facet 300 comprising a plurality of imaging elements 200 coupled together on a facet support 302. The example facet 300 comprises 16 imaging elements 200 arranged in a 4×4 grid. Different numbers and configurations of imaging elements 200 are possible, and in some configurations the number of imaging elements 200 per facet 300 is different. The facet 300 is electrically coupled to a facet acquisition board 306, wherein the facet acquisition board 306 is configured to receive image data from the image sensors 200 and/or data from facet acquisition modules as described above with reference to FIG. 3. In some embodiments, the facet acquisition board 306 is configured to receive data from individual imaging elements 200 and combine the data into a combined output. In some embodiments, the facet acquisition board 306 is configured to receive data from each imaging element 200 and combine the data into a light field representation. Combining image data can include any of the image processing functions described herein, including without limitation, fusing, stitching, enhancing resolution, producing light field data, and the like. As configured in the illustrated example of FIG. 4, facets 300 can be configured to be joined together in a modular fashion, such that a modular imaging system can be built using multiple facets grouped together, e.g., to form a modular dense field imager 100.

Data acquired and processed on the facet acquisition board 306 can be stored on the board 306 and/or it can send the data to another location. The facet acquisition board 306 can be configured to send the data over a wired connection or over a wireless connection. Wired connections can include any cabled connection including, without limitation, USB cables, FireWire, Ethernet, serial cables, coaxial cables, twisted pairs, custom cabling, or the like. Wireless data transmission can be accomplished using radio frequency techniques including 802.11 standards (e.g., WiFi and/or WiGig), Bluetooth®, CDMA, GSM, NFC, or the like. The face acquisition board 306 can include one or more antennas and one or more transceivers configured to send and receive data. In some embodiments, the wired and/or wireless transfer rates can exceed 20 Gbps, 10 Gbps, 5 Gbps, 1 Gbps, or 500 Mbps. Using parallel wireless transmission techniques with multiple frequency bands and high speed protocols can enable the facet 300 and/or groups of facets to send all acquired data at an acquisition frame rate to processing and/or storage systems that are remote from the facet acquisition board 306. In some embodiments, the acquisition frame rate can be at least about 240 fps, at least about 5 fps and/or less than or equal to about 240 fps, at least about 10 fps and/or less than or equal to about 120 fps, at least about 24 fps and/or less than or equal to about 60 fps, at least about 30 fps and/or less than or equal to about 40 fps, or less than or equal to about 5 fps.

The facet acquisition board 306 can include one or more computer processors, FPGAs, ASICs, DSPs, or the like configured to process image data. The components of the facet acquisition board 306 can be configured to receive image data from a plurality of imaging elements 200 and output light field data. The components of the facet acquisition board 306 can be configured to receive pixel data from imaging elements 200 and output light field data. In some embodiments, the facet acquisition board 306 provides some preliminary image processing functionality and sends the output of its processing to a processing station for editing, coloring, re-focusing, etc.

In some embodiments, each image facet 300 includes acquisition electronics (e.g., computer processors, ADCs, ASICs, FPGAs, DSPs, etc.) configured to collect image data from the imaging elements 200 associated with the facet 300. The acquisition electronics can be configured to pass the image data to the facet acquisition board 306, to another image facet acquisition electronics (e.g., chaining together data collection for image facets), to a remote system (e.g., a system that is not physically coupled to the dense field imager but that may be wired or wirelessly connected to the dense field imager for data transfers), or the like. In some embodiments, the facet acquisition board 306 includes electronic elements configured to receive and/or consolidate output from one or more imaging elements 200. For example, the facet acquisition board 306 can be configured to receive a first image data set representative of a first portion of a light field, to receive a second image data set representative of a second portion of a light field, and to combine the first and second image data sets to form a third image data set wherein the third image data set can include light field data, combined image data, dense field data, a dense field image data set, a spatial relationship tensor, a 5 dimensional tensor representative of a light field, a tensor having five or more dimensions representing a combined light field representation and information for generating viewpoints from the combined light field representation, and/or one or more images.

Figure 5A:
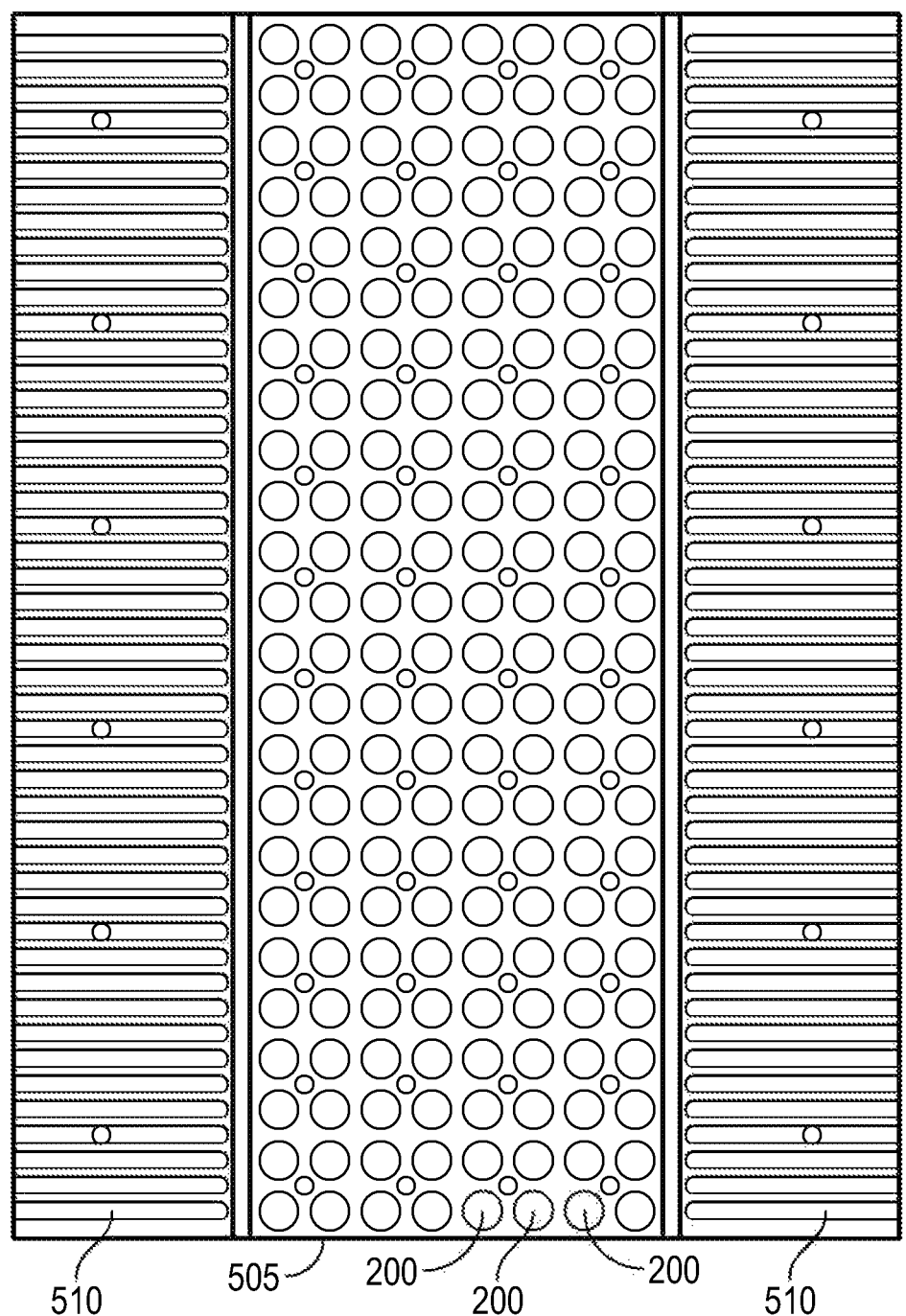
FIGS. 5A and 5B illustrate schematic drawings showing a dense field imager with an array of imaging elements coupled to a common support and acquisition electronics.
Figure 5B:
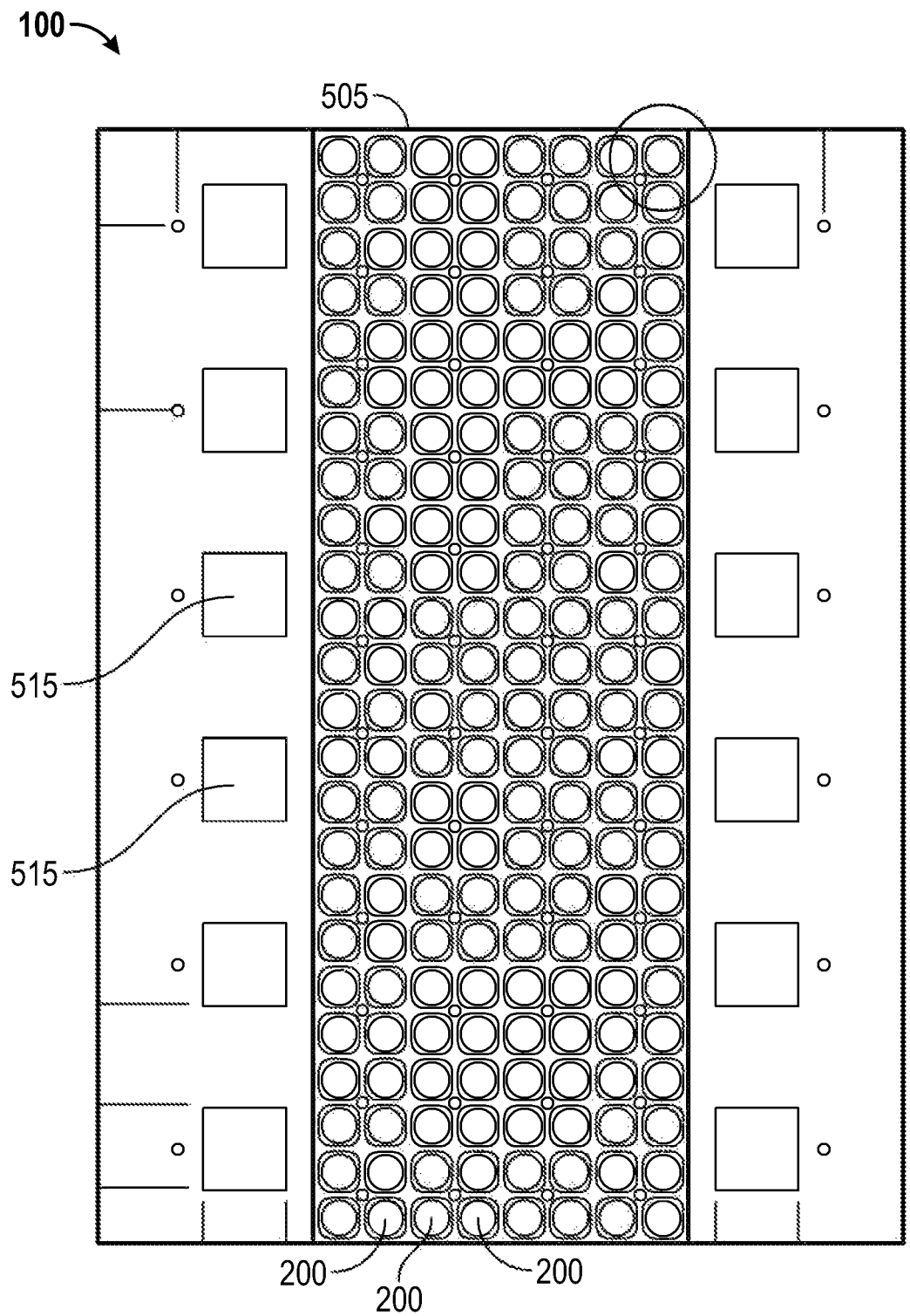

FIGS. 5A and 5B illustrate schematic drawings showing a dense field imager 100 with an array of imaging elements 200 coupled to a common support and acquisition board 505. As illustrated, the dense field imager 100 includes an array of 192 imaging elements 200, the array having 8 rows and 24 columns. Other configurations are possible including different numbers of imaging elements 200 (e.g., less than 10, more than 10, more than 20, more than 50, more than 100, more than 200, more than 500, less than 500, etc.) and different arrangements of imaging elements 200 (e.g., a regular array, a staggered array, circular, hexagonal, irregular or random distribution, etc.). The example embodiment illustrated in the schematic of FIG. 5A includes passive cooling elements 510 configured to provide cooling to the processing and acquisition electronics included on the common support and acquisition board 505. The example embodiment illustrated in the schematic of FIG. 5B includes data acquisition and processing elements 515 at various locations on the common support and acquisition board 505. As described herein, the data acquisition and processing elements 515 can be configured to acquire image data and/or to generate light field data and to output combined image data, light field data, combined light field data, and/or dense field data.

In some embodiments, the array of imaging elements 200 on the common support and acquisition board 505 can be logically and/or physically divided into facets. The facets can include 2 or more imaging elements 200. The multiple facets on the common support and acquisition board 505 can be part of a modular dense field imager 100, where multiple arrays of imaging elements 200 can be joined to form a larger dense field imager 100. For example, a dense field imager 100 can include two or more arrays of imaging elements 200 mounted to different common support and acquisition boards 505. The common supports 505 can be physically joined together or they can be physically separate but configured to send their data to a common processing system. In some embodiments, an image processing system can receive data from a plurality of modular dense field imagers 100 and combine the data to produce dense field image data.

The common acquisition board 505 can be configured to combine image data in a staged fashion. For example, the common acquisition board 505 can receive image data from imaging elements 200 in a facet and combine the image data to form a light field representation. Adjacent light field representations can then be combined to form dense field image data. This process can proceed until image data from substantially all imaging elements 200 has been combined into a dense field representation.

In some embodiments, a subset of the imaging elements 200 on the common support and acquisition board 505 are dedicated to monitoring the dense field imager 100. In some embodiments, the rest of the imaging elements 200 are used to generate light field data or dense field data. In some embodiments, the imaging elements 200 that are used to monitor the system can change according to monitor criteria. The monitor criteria can include criteria regarding a quantity of image data to be produced for use in creating light field data, a quality factor for image data, and the like.

Field of View of a Dense Field Imager

The field of view of a dense field imager 100 is a result of the fields of view of the component facets 300, and the fields of view of the component facets 300 are a result of the fields of view of the imaging elements 200 on a facet 300. Fields of view of imaging elements 200 and fields of view of facets 300 can be configured to substantially overlap and/or to overlap primarily along neighboring or adjacent edges. For example, imaging elements 200 in a facet 300 can be configured to have substantially overlapping fields of view to facilitate the generation of light field data, and facets 300 in a dense field imager 100 can be configured to have fields of view that primarily overlap along the edges to increase a resulting field of view of a dense field representation. Other configurations are possible as well, such as having imaging elements 200 whose fields of view overlap primarily along the edges and facets 300 whose fields of view substantially overlap. It may be advantageous, in some embodiments, to have imaging elements 200 and facets 300 whose respective fields of view substantially overlap with one another to produce relatively high quality dense field data. It may be advantageous, in some embodiments, to have imaging elements 200 and facets 300 whose respective fields of view overlap with one another primarily along adjacent edges to produce dense field data having a relatively large field of view.

Figure 6A:
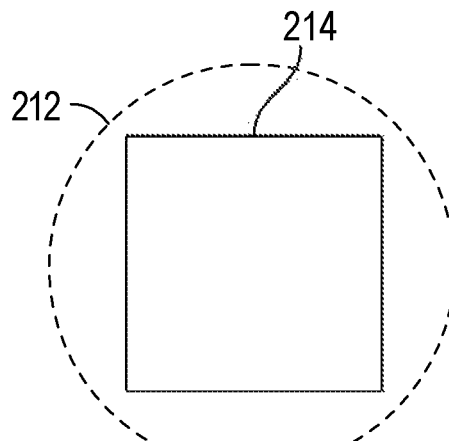
FIG. 6A illustrates a field of view for an individual imaging element, such as an imaging element in a dense field imager.

FIG. 6A illustrates a field of view for an individual imaging element 200, such as an imaging element 200 in a dense field imager 100. The lens field of view 212 is larger than the sensor field of view 214 that is actually captured by the sensor 220. Only the field of views are depicted in FIG. 6A. Physical components such as a physical sensor 220 or lens 210 are not shown in FIG. 6A.

Figure 6B:
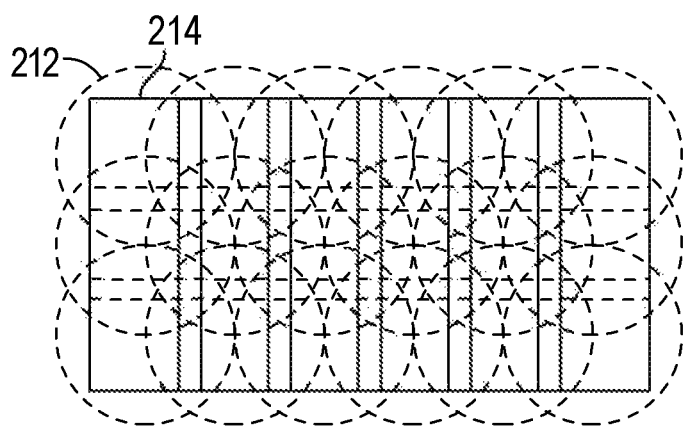
FIGS. 6B and 6C illustrate overlapping fields of view for example arrays of imaging elements that are arranged in rectangular and hexagonal grids, respectively.
Figure 6C:
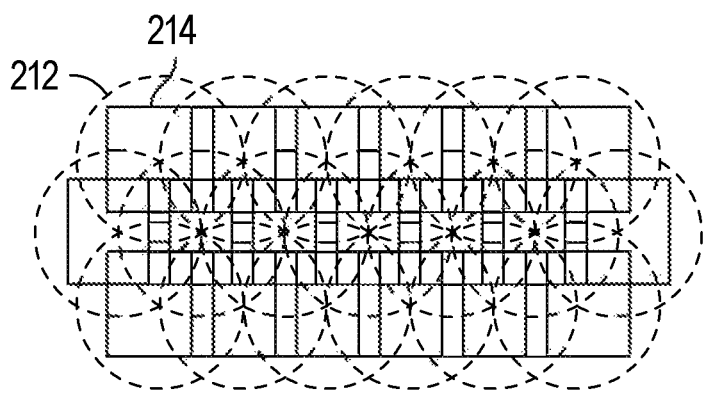

FIGS. 6B and 6C illustrate overlapping fields of view for example arrays of imaging elements 200 that are arranged in rectangular and hexagonal grids, respectively. The imaging elements 200 can be configured in any number of ways including, for example, in rectangular and hexagonal grids (as shown), along concentric circles, staggered, random distributions, grouped in facets with the facets arranged in any of the preceding configurations, etc. As shown, the fields of view 212 for the lenses and the fields of view 214 for the sensors overlap with one another, providing some commonality in image scene content captured by neighboring imaging elements 200. Again, physical components such as a physical sensor 220 or lens 210 are not shown in FIG. 6B or 6C. The imaging elements 200 themselves may be physically spaced from one another, although the fields of view overlap. For example, the imaging elements 200 can be part of a dense field imager 100. The imaging elements 200 can be substantially coplanar with substantially parallel optical axes, non-coplanar with substantially parallel optical axes, substantially coplanar with non-parallel optical axes, and/or non-coplanar with non-parallel optical axes. The overlapping fields of view represented in FIGS. 6B and 6C can represent the overlap at a given distance from the imaging elements 200. In some embodiments, imaging elements 200 that form a facet 300 can be co-planar with parallel optical axes and facets 300 that form a dense field imager 100 can be non-coplanar and/or have non-parallel optical axes. In some embodiments, the imaging elements 200 can have fields of view that differ from one another. For example, a first imaging element 200 can have a relatively wide field of view and an adjacent imaging element 200 can have a relatively narrow field of view. Imaging elements 200 on a facet 300 can have similar fields of view or they can cover a range of fields of view to provide different coverage of the image scene. Facets 300 can have differing fields of view as well such that a dense field imager 100 can have facets with non-uniform fields of view. This can increase the modular capabilities of the dense field imager 100 as it can utilize a number of different types of imaging elements 200 and/or facets 300, allowing for a number of different configurations that can be tailored for a desired or particular purpose.

As shown, the overlap can occur primarily in edge regions of the sensor. In other embodiments, the overlap can also occur in the center regions of the sensor. Limiting the overlap to primarily in the edge regions of the sensor provides for a larger effective field of view and/or more resolution given a particular set of sensors, while overlapping towards the center regions of the sensor provides for improved fusion, stitching, and/or noise reduction of images. In some embodiments, the overlapping image content can be used to reduce the effects of vignetting or lens distortions, which can typically be more pronounced in edge regions of the sensor.

In some embodiments, a facet 300 can be configured to have imaging elements 200 whose fields of view substantially overlap. This can be useful when combining the image data from the imaging elements 200 to form a light field representation. The resulting field of view of the light field representation can be the total area covered by two or more imaging elements 200, the total area covered by substantially all or all of the imaging elements 200 of the facet 300, or an area substantially limited to where two or more imaging elements 200 have overlapping fields of view.

In some embodiments, image data from facets 300 of a dense field imager 100 can be used to generate light field representations whose fields of view substantially overlap. With substantially overlapping fields of view, the dense field imager 100 and/or image processing systems can use the overlapping light field representations to produce dense field data whose resulting field of view can be an area covered by all or substantially all of the facets 300 in the dense field imager 100. The quality of the resulting dense field data can be increased based at least in part on the quantity of information available over the combined field of view. An increase in the quality of the dense field data can correspond to a reduction in noise, an increase in resolution, a decrease in uncertainties related to luminance or radiance values, improved spatial relationship tensors which can be used to generate higher quality viewpoints or images, and the like.

In some embodiments, image data from facets 300 of a dense field imager 100 can be used to generate light field representations whose fields of view overlap primarily along the edges of their respective fields of view. In these embodiments, the field of view of a resulting dense field representation can be increased or maximized, covering a relatively large area. This can be advantageous where it is desirable to acquire, with a relatively small number of imaging elements 200 or facets 300, dense field data having a wide field of view.

FIGS. 7A to 7F illustrate a plurality of imaging elements 200a, 200b, 200c that are spaced on a variety of surfaces and that have a variety of fields of view. In some embodiments, the imaging elements 200a, 200b, 200c are part of a facet 300 on a dense field imager 100. Although the description that follows discusses the effects of these configurations with respect to imaging elements 200, the same discussion can be applied to the fields of view of facets 300 of a dense field imager 100. For example, rather than illustrating imaging elements 200a, 200b, 200c, FIGS. 7A to 7F could illustrate a plurality of facets 300a, 300b, 300c that are spaced on a variety of surfaces and that have a variety of fields of view. The orientation and fields of view of the imaging elements 200a, 200b, 200c can be configured to enhance or optimize generation of light field data. Similarly, the orientation and fields of view of facets 300 in a dense field imager 100 can be configured to enhance or optimize generation of dense field data.

Figure 7A:
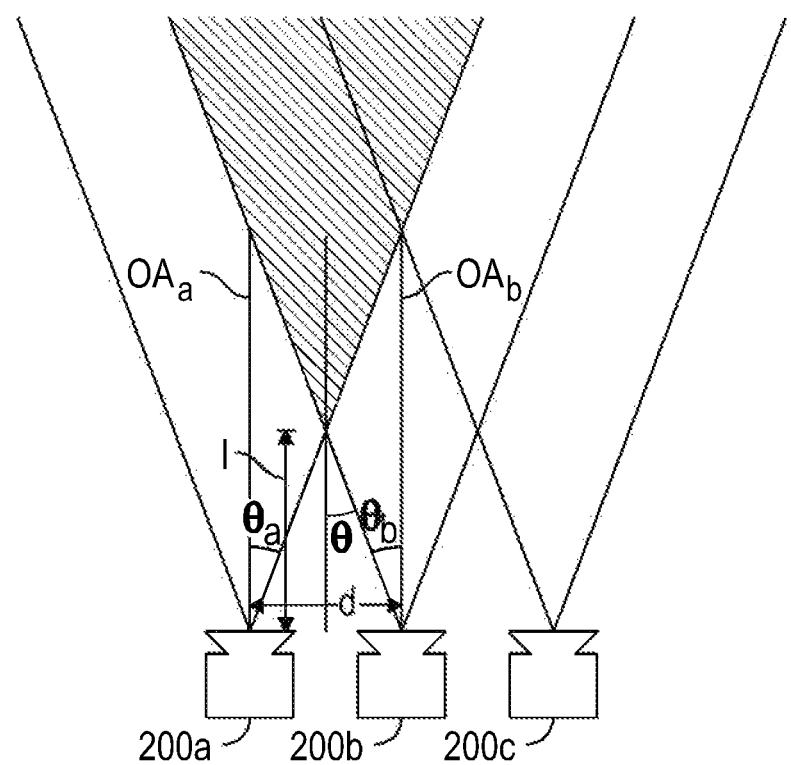
FIG. 7A illustrates imaging elements with partially overlapping fields of view.

FIG. 7A illustrates a plurality of imaging elements 200a, 200b, 200c that are spaced on a planar surface. The cross-hatched region is the region of overlap for imaging elements 200a and 200b. To determine and/or control where the overlap region occurs, the distance between imaging elements, d, and opening angles, θ, can be used. For example, for imaging elements 200a and 200b with substantially the same opening angle, θ (which is half of the field of view and is measured from the optical axis OA to the outer edge of the field of view), the distance to the overlap region, l, is equal to $d/(2*\tan(\theta))$. The area of overlap at a distance l+x from the imaging elements 200a, 200b is calculated based on the similarity of the triangles (with the first triangle being defined as the triangle with d as the base and l as the height and the second triangle the overlapping region). At the distance l+x from the imaging elements, the cross-sectional area of overlap is equal to $0.5*d*(x/l)$.

Figure 7B:
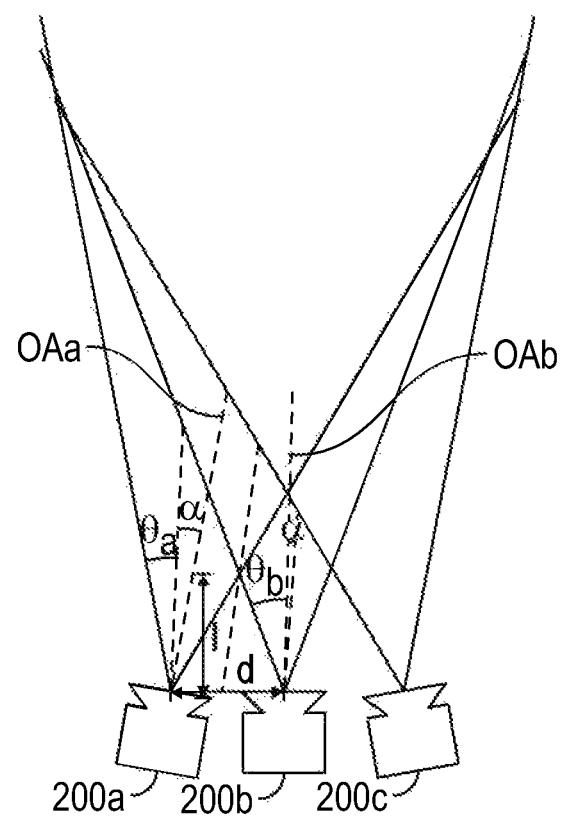
FIG. 7B illustrates imaging elements with substantially overlapping fields of view.

FIG. 7B illustrates a plurality of imaging elements 200a, 200b, 200c that are spaced on a concave surface. The field of view of the imaging elements 200a, 200b, 200c substantially overlap. A geometrical calculation that is similar to that described with reference to FIG. 7A is shown in this figure for the overlapping region. Here, because the imaging elements are mounted on a concave surface, an additional parameter is used. The angle α is used to represent an offset angle of the optical axis compared to an axis that bisects the distance between the imaging elements and intersects with the optical axes $OA_a$ and $OA_b$ where they intersect. Another way to understand this axis is that it represents a combined or average optical axis for imaging elements 200a and 200b. The distance, l, to the intersection of the fields of view is then $d/(2*\tan(\theta+\alpha))$. The area of overlap at a distance l+x along the combined optical axis is $0.5*d*(x/l)$, if the respective outer fields of view diverge or are parallel (e.g., $\theta \geq \alpha$). If the respective outer fields of view converge (e.g., $\theta < \alpha$), the area is a bounded quadrilateral.

Figure 7C:
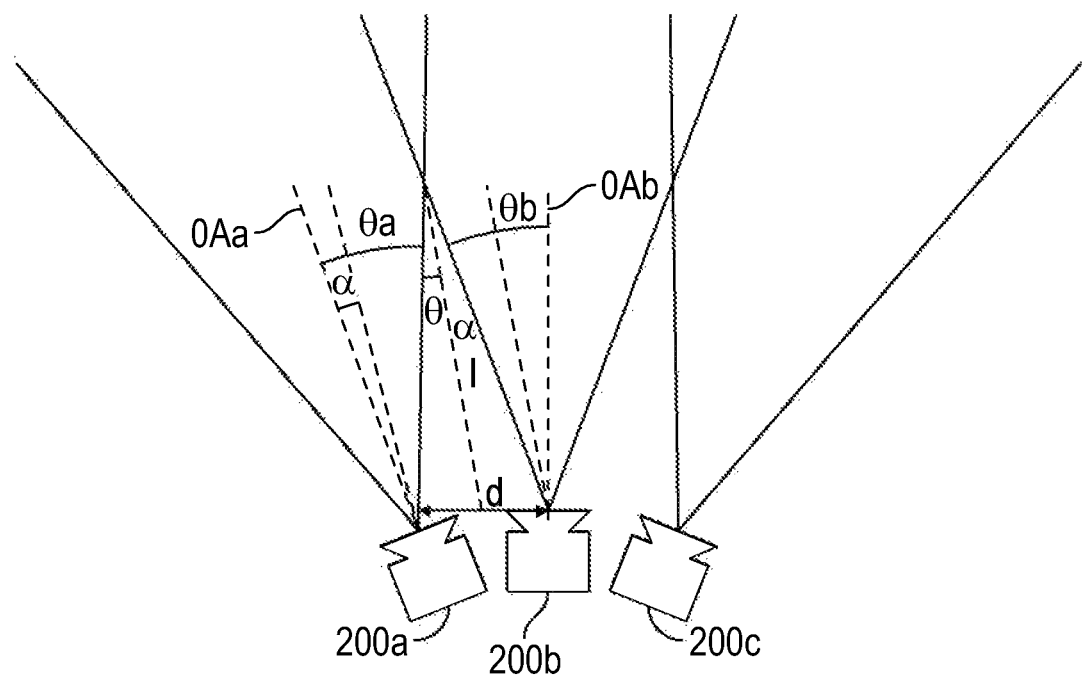
FIG. 7C illustrates imaging elements with substantially adjacent fields of view.

FIG. 7C illustrates a plurality of imaging elements 200a, 200b, 200c that are spaced on a convex surface. The field of view of the imaging elements 200a, 200b, 200c are substantially adjacent. The calculation of the overlapping region here proceeds as with that shown in FIG. 7B, with the distance, l, being $d/(2*\tan(\theta-\alpha))$. The area of overlap at a distance l+x along the combined optical axis is $0.5*d*(x/l)$. The condition that is satisfied to provide an overlapping region is $\theta > \alpha$.

Figure 7D:
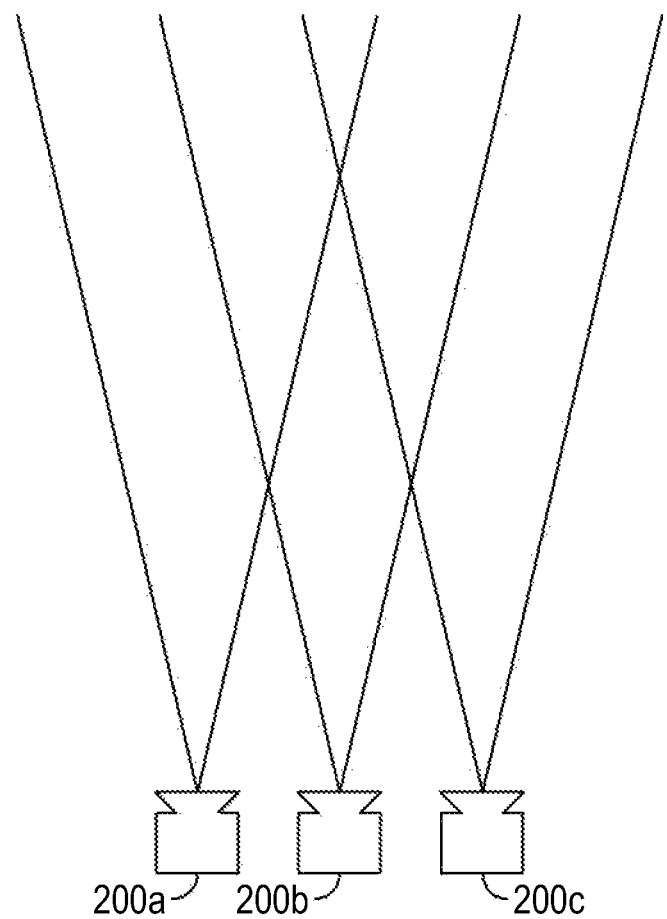
FIG. 7D illustrates imaging elements with partially overlapping fields of view, where the angle of view is decreased.

FIG. 7D illustrates a plurality of imaging elements 200a, 200b, 200c that are spaced on a planar surface, with a decrease in the angular view.

Figure 7E:
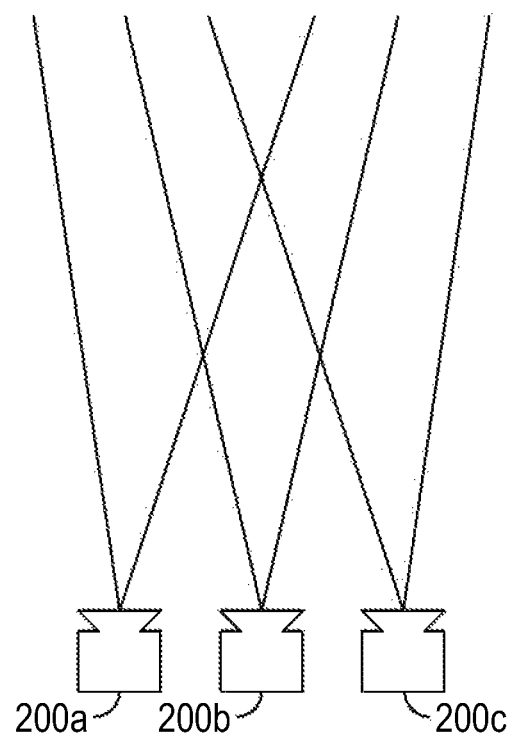
FIG. 7E illustrates imaging elements with substantially overlapping fields of view, where the angle of view is decreased.

FIG. 7E illustrates a plurality of imaging elements 200a, 200b, 200c that are spaced on a concave surface, with a decrease in the angular view. The field of view of the imaging elements 200a, 200b, 200c substantially overlap. Because of the decrease in angular view, the radius of the concave surface increases as compared to the concave surface of FIG. 7B.

Figure 7F:
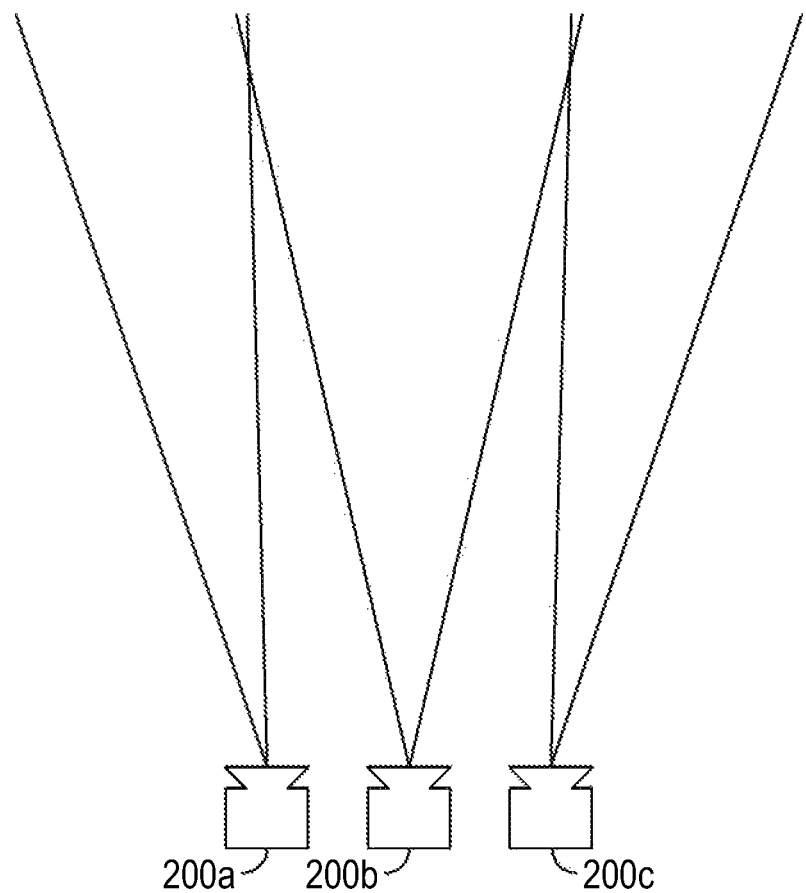
FIG. 7F illustrates imaging elements with substantially adjacent fields of view, where the angle of view is decreased.

FIG. 7F illustrates a plurality of imaging elements 200a, 200b, 200c that are spaced on a convex surface, with a decrease in the angular view. The field of view of the imaging elements 200a, 200b, 200c are substantially adjacent. Because of the decrease in angular view, the radius of the convex surface increases as compared to the convex surface of FIG. 7C.

FIGS. 7C and 7F illustrate that varying the alignment of a plurality of imaging elements in a convex fashion can provide increased resolution, even if the field of view changes.

FIGS. 7A and 7D illustrate that even when the alignment of a plurality of imaging elements does not change, using the plurality of imaging elements provides for increased resolution and reduced noise, even if the field of view changes.

The imaging elements 200 may be mounted, for example, on a flexible surface or membrane. The surface may adjust with adjustments to the zoom settings of the imaging elements 200. For example, the flexible surface may adjust to provide substantial overlap in the field of view between imaging elements 200. As another example, the flexible surface may adjust to keep the field of view between imaging elements 200 substantially adjacent, allowing for some overlap to stitch the images together. The configurations illustrated in FIGS. 7A to 7F can each be accomplished in separate devices, or in a single, adjustable device, if the sensors are mounted to a support such as a membrane which is capable of a tympanic displacement. The sensors can be positioned on a membrane radially symmetrically about a displacement axis which is coincident or parallel to the primary viewing axis of the array. Slight displacement of the membrane along the displacement axis, away from the field of view while restraining the periphery of the membrane, will deflect the membrane into a concave configuration as seen in FIG. 7B. Displacement of a point on the membrane along the displacement axis in the direction of the field of view will produce a convex configuration as seen in FIG. 7C. Displacement can be controllably accomplished in any of a variety of ways, such as by magnetic displacement, acoustical displacement or a variety of mechanical or electromechanical systems for providing small mechanical displacement in response to a control signal.

In some cases, the distance between sensors can vary. For example, an array of 4×4, 2×2, 6×6, 10×10, 18×9, 6×3, or 10×5 (horizontal×vertical) imaging elements 200 may be arranged so that the spacing between sensors is approximately ¼ inch between sensor centers, approximately ½ inch between sensor centers, approximately one inch between sensor centers, approximately two inches between sensor centers, or approximately four inches between sensor centers.

The imaging elements 200 may also be mounted on a framework that provides for variable distance between sensors. For example, an array of 4×4, 2×2, 6×6, 10×10, 18×9, 6×3, or 10×5 (horizontal×vertical) imaging elements 200 may be arranged so that the spacing between sensors adjusts from approximately one inch between sensor centers to approximately four inches between sensor centers. In other cases, the spacing can be adjusted from approximately ¼ inch between sensor centers to approximately ½ inch, approximately 1 inch, or approximately 4 inches between sensor centers. In yet further embodiments, the spacing can be adjusted from approximately ½ inch between sensor centers to approximately 1 inch, or approximately 4 inches between sensor centers.

While FIGS. 7B, 7C, 7E, and 7F illustrate arranging the imaging elements 200a, 200b, 200c in a concave or convex fashion, other optical adjustments could be used to obtain the desired alignment. For example, U.S. Patent Publication 2009/0141352 titled "Liquid Optics Image Stabilization," the entirety of which is incorporated by reference herein and is included in the attached Appendix, describes the use of liquid lens cells to stabilize an image along one or more axis. The image stabilization described in that publication could be adapted to provide image alignment of the plurality of imaging elements as illustrated in FIG. 7A, thus avoiding the need for physically aligning the imaging devices in a concave or convex manner as illustrated in FIGS. 7B, 7C, 7E, and 7F.

FIGS. 7B and 7E illustrate that varying the alignment of a plurality of imaging elements in a concave fashion can provide for multiple images to be substantially aligned, even if the field of view changes. The convex and concave configurations shown in FIGS. 7B and 7C can also be used to counteract the effect of parallax that may result from the spacing between the imaging elements. Additionally, in some cases, images can be captured in sequence from adjacent imaging elements to reduce parallax issues for video.

Further, imaging elements 200a, 200b, 200c could use liquid lens cells to provide zoom and/or focus, as described in U.S. Pat. No. 7,855,838, titled "Liquid Optics Zoom Lens and Imaging Apparatus," the entirety of which is incorporated by reference herein, and is included in the attached Appendix.

FIGS. 7A to 7F illustrate imaging elements 200a, 200b, 200c for ease of illustration. However, it is to be understood that multiple imaging elements could be used and not limited in number to three. The imaging elements 200 could be arranged in a variety of patterns, including, for example, along a linear axis, along a square grid, along a diagonal grid, along a triangular grid, or in a hexagonal pattern. The arrangement could be planar, or, for example, concave or convex, or irregular.

Figure 8:
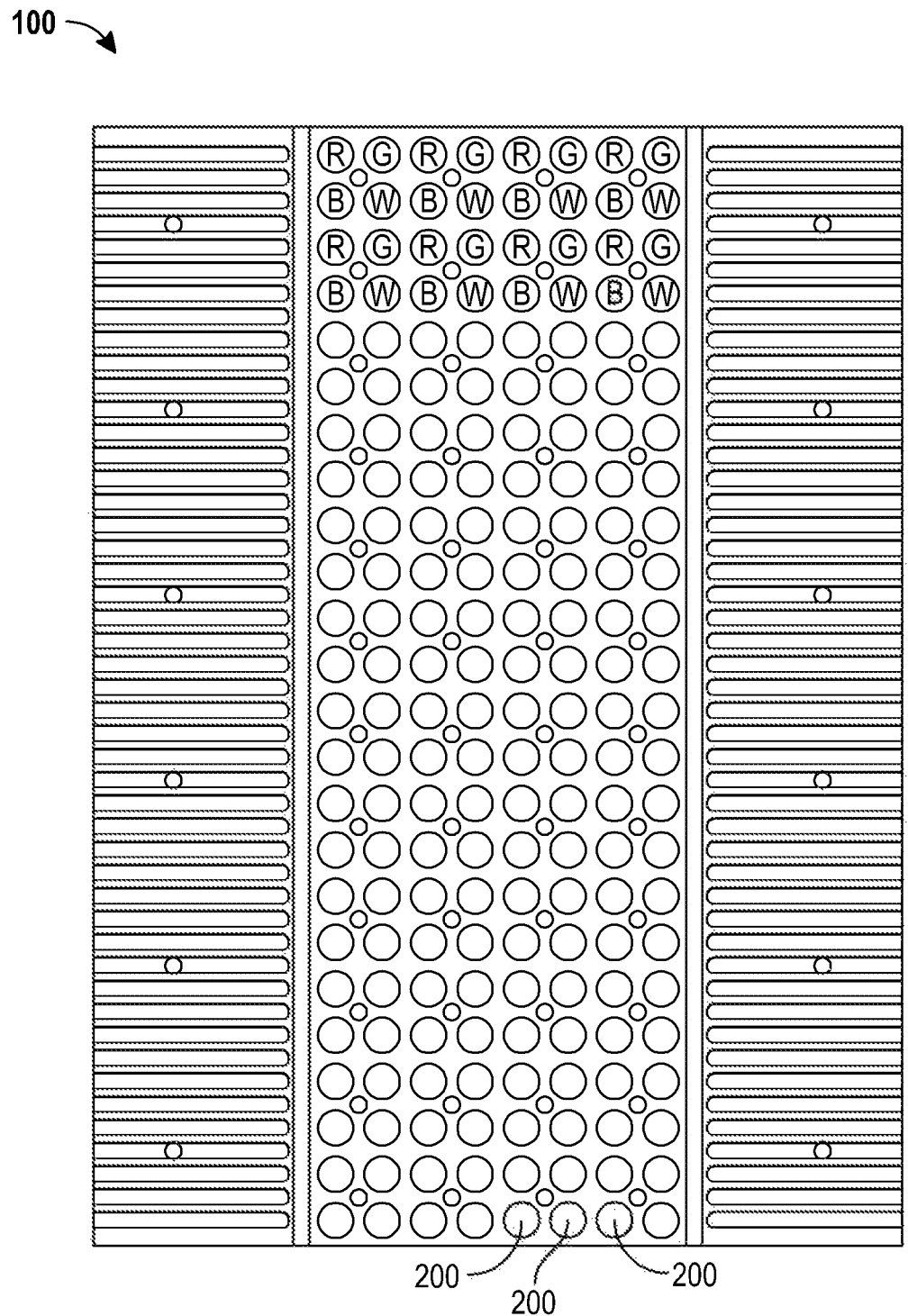
FIG. 8 illustrates an example dense field imager having an array of imaging elements wherein each imaging element includes a monochromatic sensor.

FIG. 8 illustrates an example dense field imager 100 having an array of imaging elements 200 wherein each imaging element 200 includes a monochromatic sensor. The monochromatic sensors can be manufactured using techniques described herein. A monochromatic sensor can be configured to be sensitive to light falling within a region of the electromagnetic spectrum, which can span multiple "color" bands. For example, a monochromatic sensor can be sensitive to red light, to green light, to blue light, to white or broadband light (e.g., light that covers all or substantially all of the visible spectrum or light that covers from red to blue light), to infrared light, to ultraviolet light, and the like. When used in combination with other monochromatic sensors, the dense field imager 100 can provide dense field data capable of reproducing a wide variety of colors and light intensities. Using an array of monochromatic sensors can reduce or eliminate crosstalk between color channels as compared to multi-chromatic image sensors (e.g., a Bayer sensor). By reducing or eliminating crosstalk between color channels, the sensors can be reduced in size. Reducing the size of the image sensor can result in improved depth of field and/or increased perceived sharpness of resolution. The increased sharpness can be based at least in part on a reduction in interpolation as compared to images produced using traditional multi-chromatic sensors. The manufacture of monochromatic sensors is described in greater detail herein.

The monochromatic imaging elements 200 can be configured to have overlapping fields of view, as described herein, and overlap regions can be used to produce color information in an image. For example, in a region where a red, a blue, and a green imaging element acquire image data, an output image can be produced with an appropriate color at each output pixel or position. In some embodiments, a fourth imaging element can be included that has a white or broadband sensor (e.g., a panchromatic sensor). The white sensor can provide an ability to control neutral density and/or dynamic range of a resulting image.

Using monochromatic sensors, color crosstalk can be reduced or eliminated. Color crosstalk can occur where a photon of one color produces an electrical output in a pixel of another color (e.g., photon conversion crosstalk), which can occur when a photon strikes a boundary between pixels or when a pixel becomes saturated and the signal from the saturated pixel affects neighboring pixels (e.g., bloom crosstalk). The bloom crosstalk can be particularly prevalent for white pixels which can saturate faster than pixels of other colors. In a monochromatic sensor, photon conversion crosstalk is reduced or eliminated, or the effect of crosstalk is reduced because pixels are all of the same color. Bloom crosstalk is reduced or eliminated as well because when one pixel saturates it is likely that the neighboring pixels of the same color will be saturated or nearly saturated as well, reducing the effect of bloom crosstalk.

Images produced using imaging elements with monochromatic sensors can be improved by individually controlling sensors. Different color sensors can be treated differently based on a variety of conditions. Imaging elements can be controlled to have different shutter speeds, apertures, exposures, and the like based at least in part on the color of the sensor. For example, white sensors can be configured to have quicker exposure times to reduce saturation. Color sensors can have longer exposure times to increase photon collection in low-light situations. A particular color can have a longer or shorter exposure time for scenes where one or more colors may be more prevalent. This feature can be used to create a dense field imager that does not utilize a traditional Bayer configuration, where there are two green pixels for every red and blue pixel. The green imaging element can be configured to have a higher dynamic range, a longer exposure, a wider aperture, or any combination of these or the like to enhance green photon collection as compared to red and blue imaging elements. In some embodiments, the dense field imager 100 includes electronics that control imaging elements individually. In some embodiments, the control electronics can be configured to treat imaging elements with similar monochromatic sensors in a similar or uniform fashion.

Example Planar Dense Field Imager

Figure 9A:
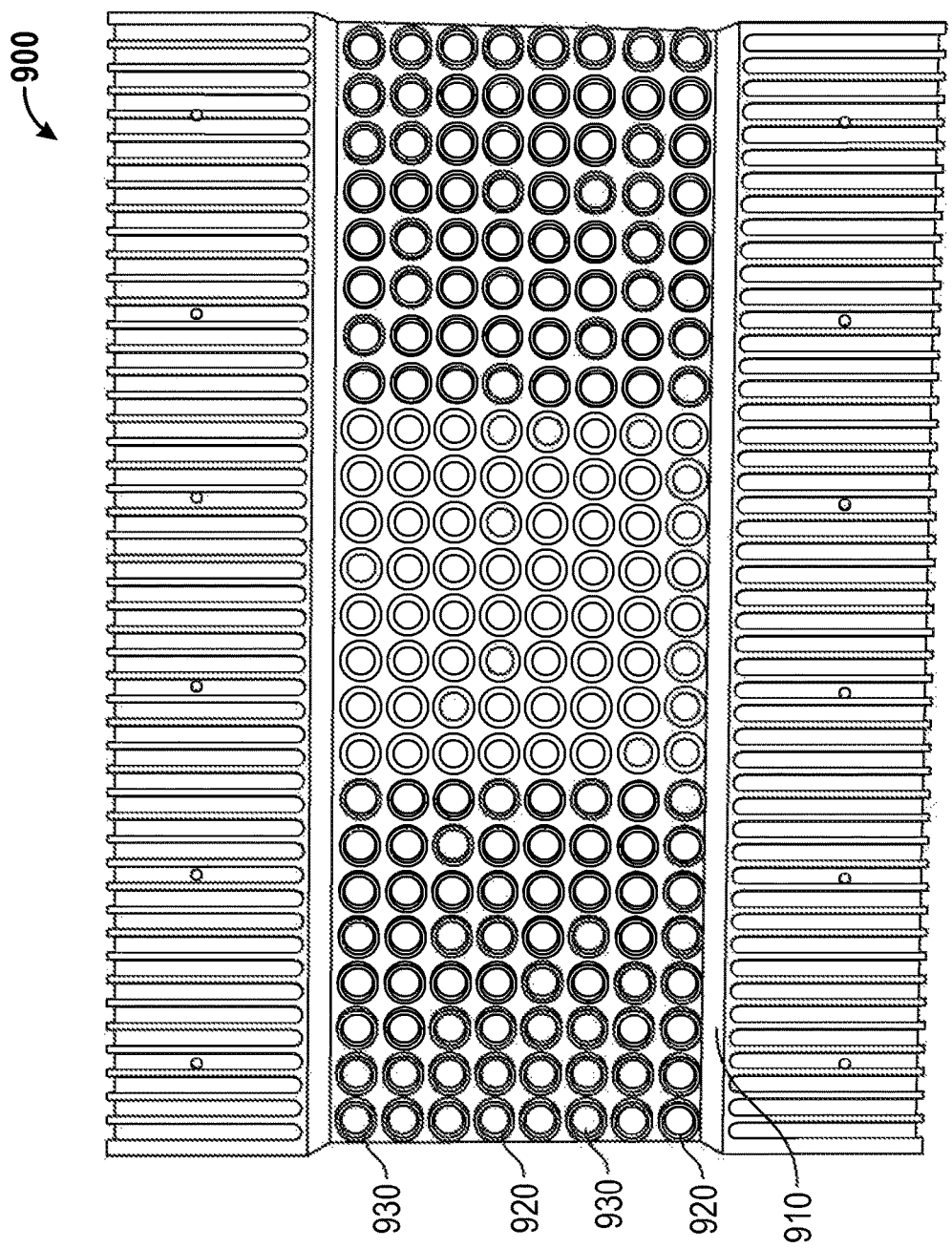
FIGS. 9A-C illustrate an example embodiment of a planar dense field imager having integrated cooling elements and integrated acquisition and processing electronics.
Figure 9B:
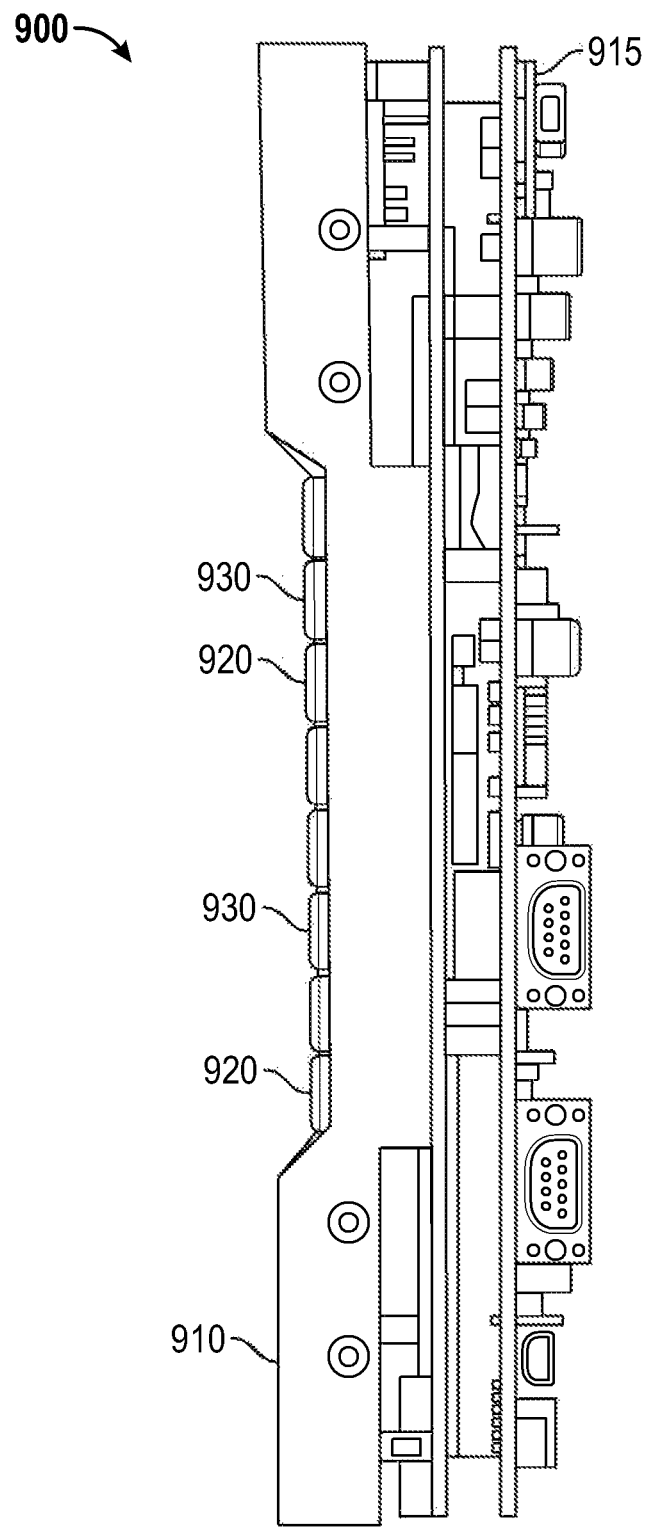
Figure 9C:
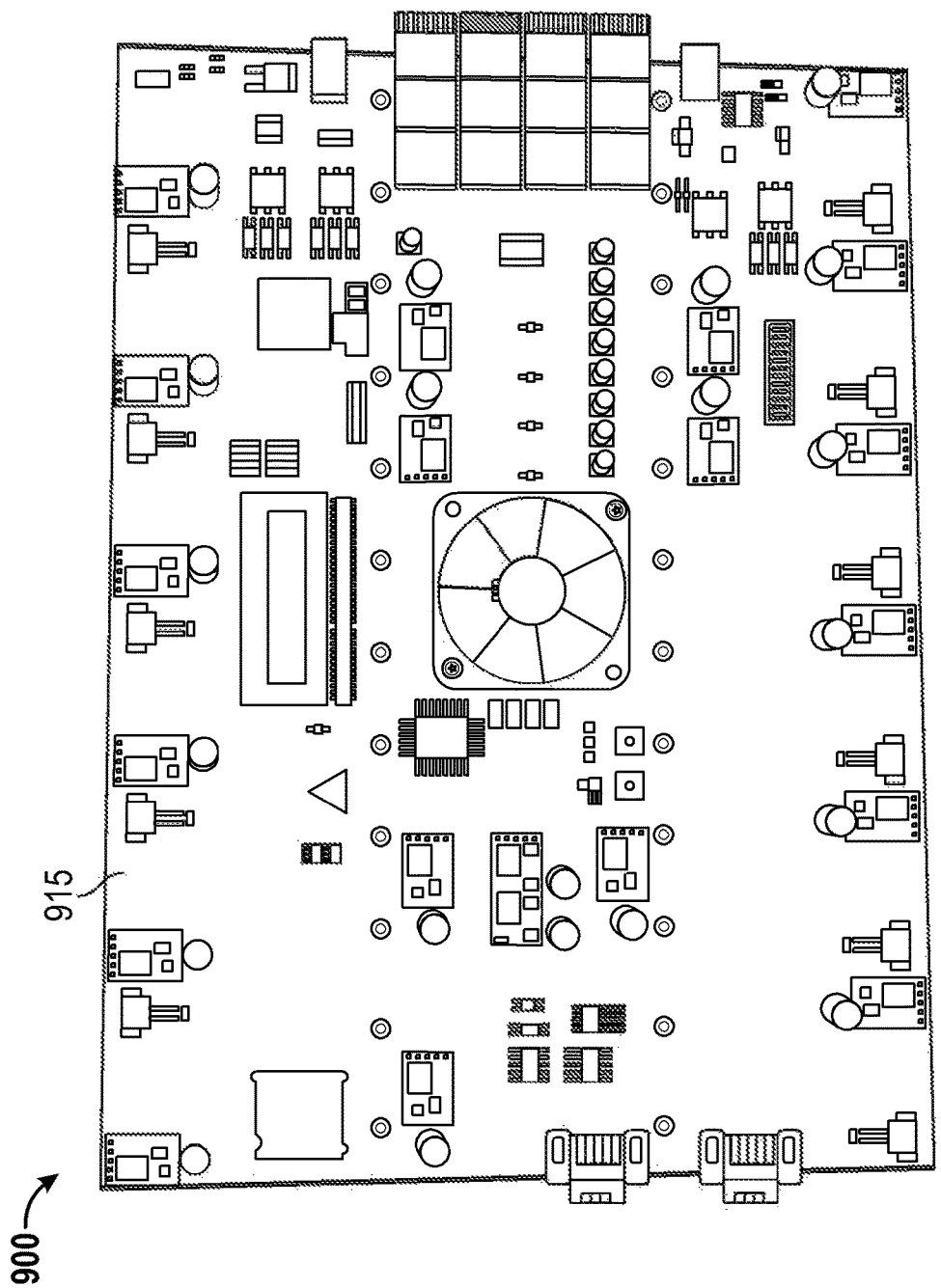

FIGS. 9A to 9C show an example embodiment of a planar dense field imager 900 having integrated cooling elements 910 and integrated acquisition and processing electronics 915. In the illustrated example embodiment, the facets 930 are mounted on a common support and are coplanar, but, in some embodiments, the dense field imager 900 can include facets 930 mounted on physically disparate supports and/or supports that are non-coplanar. In some embodiments, the facets 930 can be mounted on supports that are non-coplanar and that form planes that are not parallel to one another. As described herein, this can be used to create desirable overlap in image acquisition and/or increase a field of view of a resultant dense field representation. The illustrated example planar dense field imager 900 is configured to be a unitary structure, but, in some embodiments, the dense field imager 900 can be configured to be modular where facets can be added and/or taken away to create a variety of configurations.

The planar dense field imager 900 includes facets 930 where each facet 930 includes 16 imaging elements 920, arranged in a 4×4 grid. Other configurations are possible as well, including varying the number and arrangement of the imaging elements 920. For example, the imaging elements 920 can be arranged in a rectangular or hexagonal grid, along concentric circles, in an irregular or random distribution, or any combination of these. The number of imaging elements 920 on a facet 930 can be can be at least 2 and/or less than or equal to 400, at least 3 and/or less than or equal to 200, at least 4 and/or less than or equal to 100, or any number between 2 and 400 (e.g., 2, 3, 4, 5, 6, 7, 8, etc.). The number of imaging elements 920 per facet 930 can vary from facet to facet as well.

The planar dense field imager 900 includes a grid of 12 facets 930, arranged in a 6×2 grid. As illustrated in this example, the facets 930 can be configured to be arranged in a regular rectangular grid, but other configurations are possible as well. For example, the facets 930 can be staggered, they can be configured as hexagonals and arranged on a hexagonal grid, the facets 930 can be distributed according to any regular pattern, the facets 930 can be arranged randomly or irregularly, or any combination of these. In some embodiments, the facets 930 are arranged to form a square or a rectangle whose width is shorter than the height.

The example planar dense field imager 900 is approximately 36 cm wide by 26 cm high by 6 cm deep, including the cooling elements 910 and the integrated electronics 915. The dense field imager 900 can have different sizes and can be larger or smaller than the illustrated example. For example, the width and/or height of the dense field imager 900 can be at least about 6 cm and/or less than or equal to about 100 cm, at least about 9 cm and/or less than or equal to about 50 cm, or at least about 15 cm and/or less than or equal to about 40 cm. In some embodiments, the dense field imager 900 is modular wherein each module can have a particular size. The combination of the dense field imager modules can have any size and/or configuration, based at least upon the desired application. For example, in some embodiments, a modular dense field imager 900 can be configured to cover a horizontal field of view of about 360 degrees and/or a vertical field of view of about 180 degrees.

Each facet 930 has an imaging area (e.g., the portion of the facet 930 with the imaging elements 920) that is approximately 6 cm by 6 cm and an electronics area (e.g., the portion of the facet 930 with the facet acquisition electronics) that is approximately 6 cm by 8 cm. The imaging area of the facet 930 can be at least about 1 $cm^2$ and/or less than or equal to about 600 $cm^2$, at least about 3 $cm^2$ and/or less than or equal to about 400 $cm^2$, at least about 10 $cm^2$ and/or less than or equal to about 100 $cm^2$. In some embodiments, facets 930 can be implemented on a wafer and can have appropriate wafer-scale dimensions, as described herein. The electronics area of the facet 930 can have a variety of sizes and, in some embodiments, the facet electronics can be integrated into the dense field imager 900 apart from the facet 930.

In some embodiments, the imaging elements 920 and/or the facets 930 can be configured to be movable relative to one another. The dense field imager 900 can include actuators configured to change a position and/or orientation of individual facets 930 and/or individual imaging elements 920. The imaging elements 920 and/or facets 930 can be moved to increase or decrease an overlap in their fields of view. The movement of the imaging elements 920 and/or the facets 930 can be controlled by an operator or it can be automatically controlled by the dense field imager 900. Movement can be based at least in part on a target field of view, a targeted amount of overlapping image information, a viewing angle, or any combination of these.

Example Non-Planar Dense Field Imagers

Figure 10A:
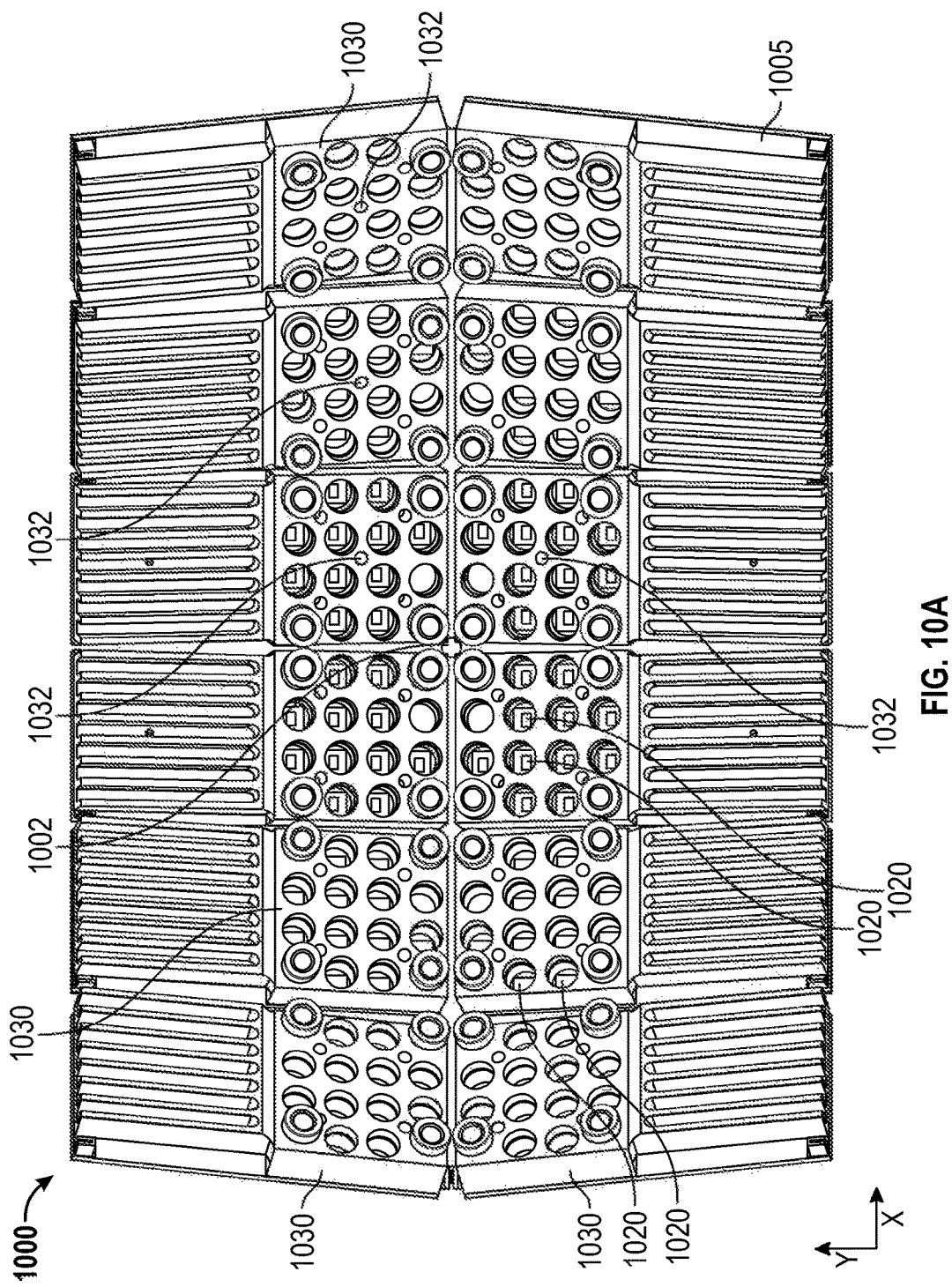
FIGS. 10A-C illustrate an example embodiment of a dense field imager having facets that are mounted in a concave fashion.
Figure 10B:
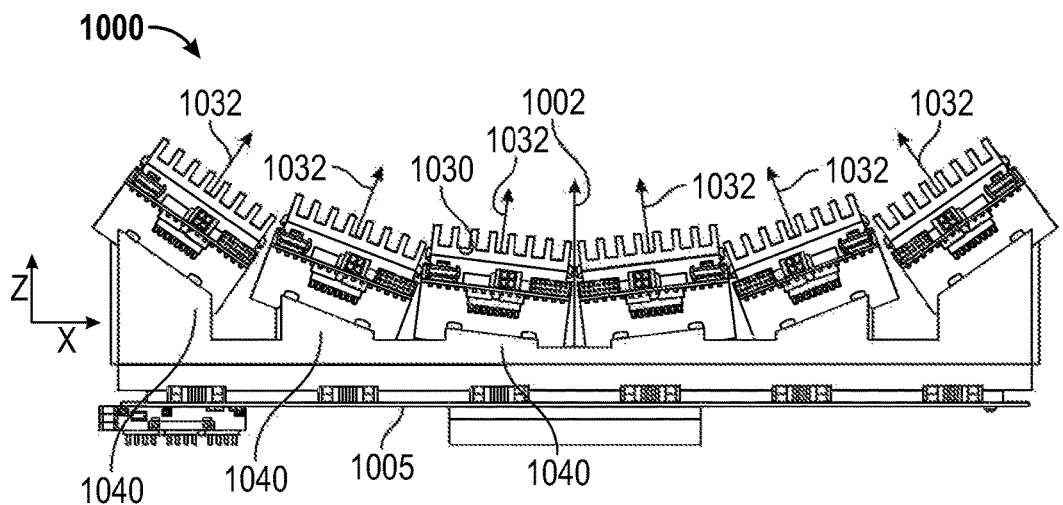
Figure 10C:
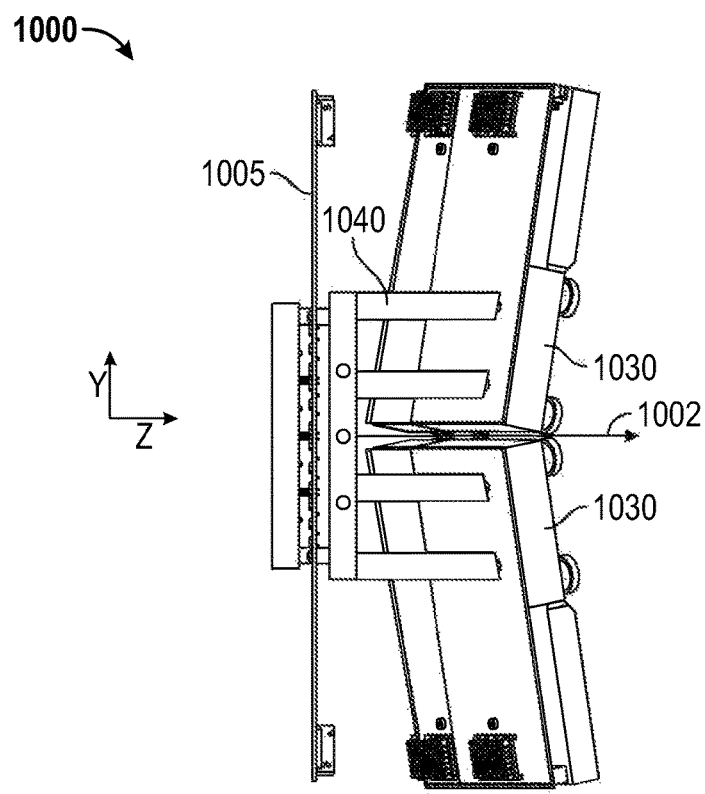

FIGS. 10A to 10C illustrate an example embodiment of a dense field imager 1000 having a plurality of facets 1030 that are mounted in a concave fashion. The dense field imager 1000 can include a common support 1005 that lies within an x-y plane (e.g., the plane of the paper in FIG. 10A). The plurality of facets 1030 can be attached or secured to the common support 1005 through mounting elements 1040.

The orientation of the plurality of facets 1030 will now be described relative to a coordinate system having an x-axis and y-axis oriented as shown in FIG. 10A, where the z-axis would extend outward from the page. The top and side views respectively illustrated in FIGS. 10B and 10C show the relative configurations of the x-, y-, and z-axes such that FIG. 10A lies in the x-y plane, FIG. 10B lies in the x-z plane, and FIG. 10C lies in the y-z plane. Within this coordinate system, a primary optical axis 1002 of the dense field imager 1000 can be defined as a line that is parallel to the z-axis and that intersects the x-y plane in the geometric center of the plurality of facets 1030, as illustrated by the circle with a dot. Additionally, a facet plane can be defined as a plane that contains the imaging elements 1020 of that facet 1030. Each facet has a facet optical axis 1032 that can be defined as a line perpendicular to the facet plane that intersects the facet plane in the geometric center of the facet's imaging elements 1020.

The mounting elements 1040 can be configured to orient one or more facets 1030 such that the facet optical axes 1032 are not parallel to the primary optical axis 1002. In the example embodiment illustrated in FIGS. 10A to 10C, the mounting elements 1040 secure the facets 1030 in such a way that the facet optical axes 1032 generally converge towards the primary optical axis 1002 in both the x- and y-directions. Other configurations are possible as well. For example, the mounting elements 1040 can be configured to orient one or more facets 1030 such that the facet optical axes 1032 remain parallel to the primary optical axis 1002 in either the x- or y-direction while converging in the other direction (e.g., parallel in the x-direction and converging in the y-direction). The mounting elements 1040 can be configured to orient one or more facets 1030 such that the facet optical axes 1032 diverge from the primary optical axis 1002 in either the x- or y-directions while converging in the other direction (e.g., diverging in the x-direction and converging in the y-direction). The mounting elements 1040 can be configured to orient one or more facets 1030 such that some of the facet optical axes 1032 remain parallel to the primary optical in a first direction while converging in a second, orthogonal direction, other facet optical axes 1032 remain parallel in the second direction and converge in the first direction, other facet optical axes 1032 diverge in a first or second direction and converge in the other direction, or any combination of these.

In some embodiments, the mounting elements 1040 generally orient the plurality of facets 1030 along an interior surface of a sphere, an ellipsoid, a cylinder, a cylindrical ellipsoid, a paraboloid, a hyperboloid, a polyhedron, or some other regular or irregular surface. In some embodiments, the mounting elements 1040 can be configured to be movable through mechanical adjustments and/or through actuators configured to change an orientation of one or more facet planes. The mounting elements 1040 can be manually and/or automatically adjustable. The facets 1030 can be mounted to the common support 1005 to provide desired or targeted overlapping fields of view. The overlapping fields of view can be configured to provide image data from a majority of imaging elements 1020 and/or facets 1030 in a targeted region where on object or region of interest is located.

Figure 10D:
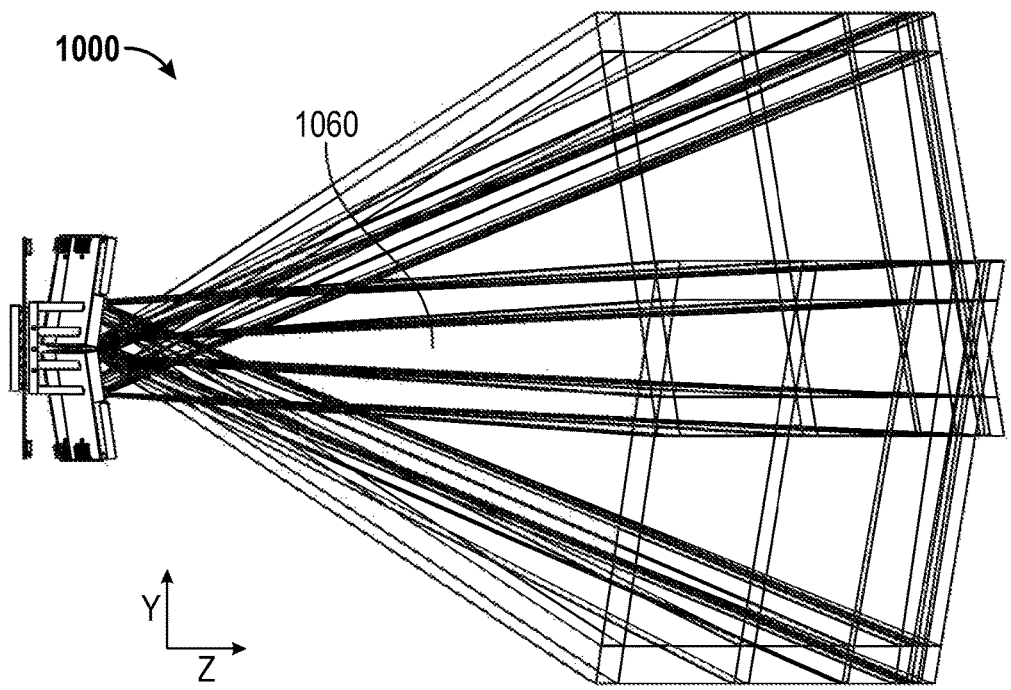
FIGS. 10D-F illustrate fields of view of some of the facets on the dense field imager illustrated in FIGS. 10A-C.
Figure 10E:
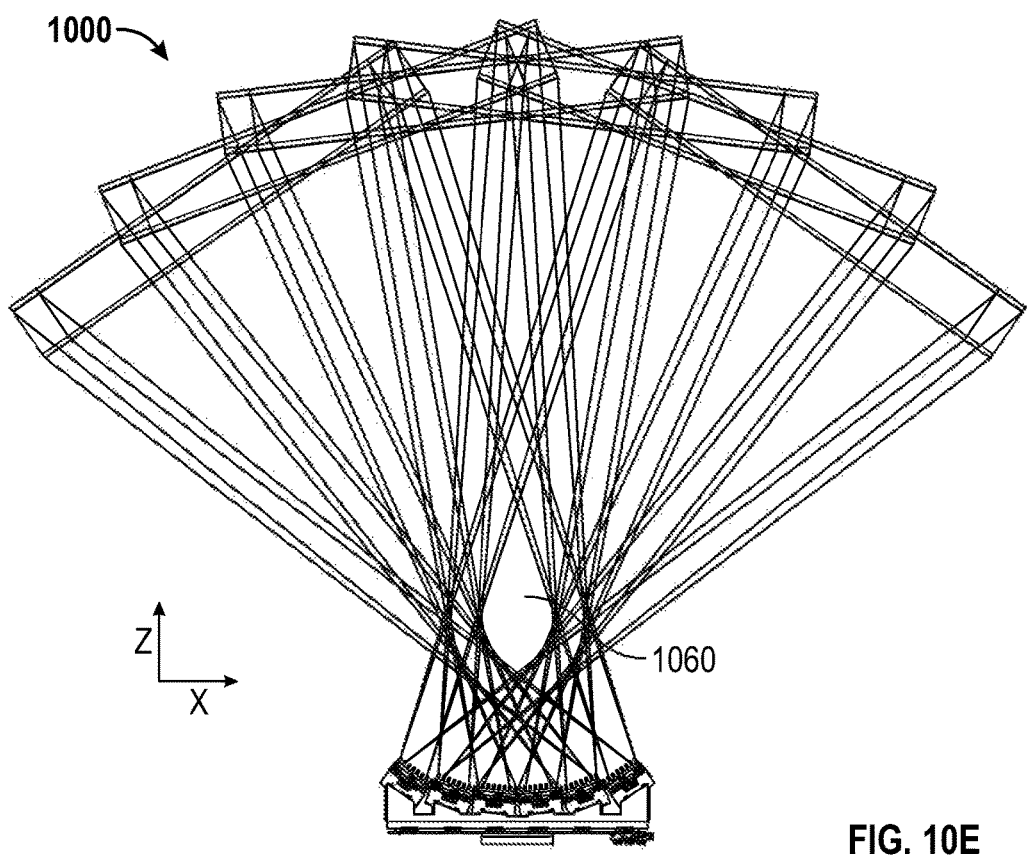
Figure 10F:
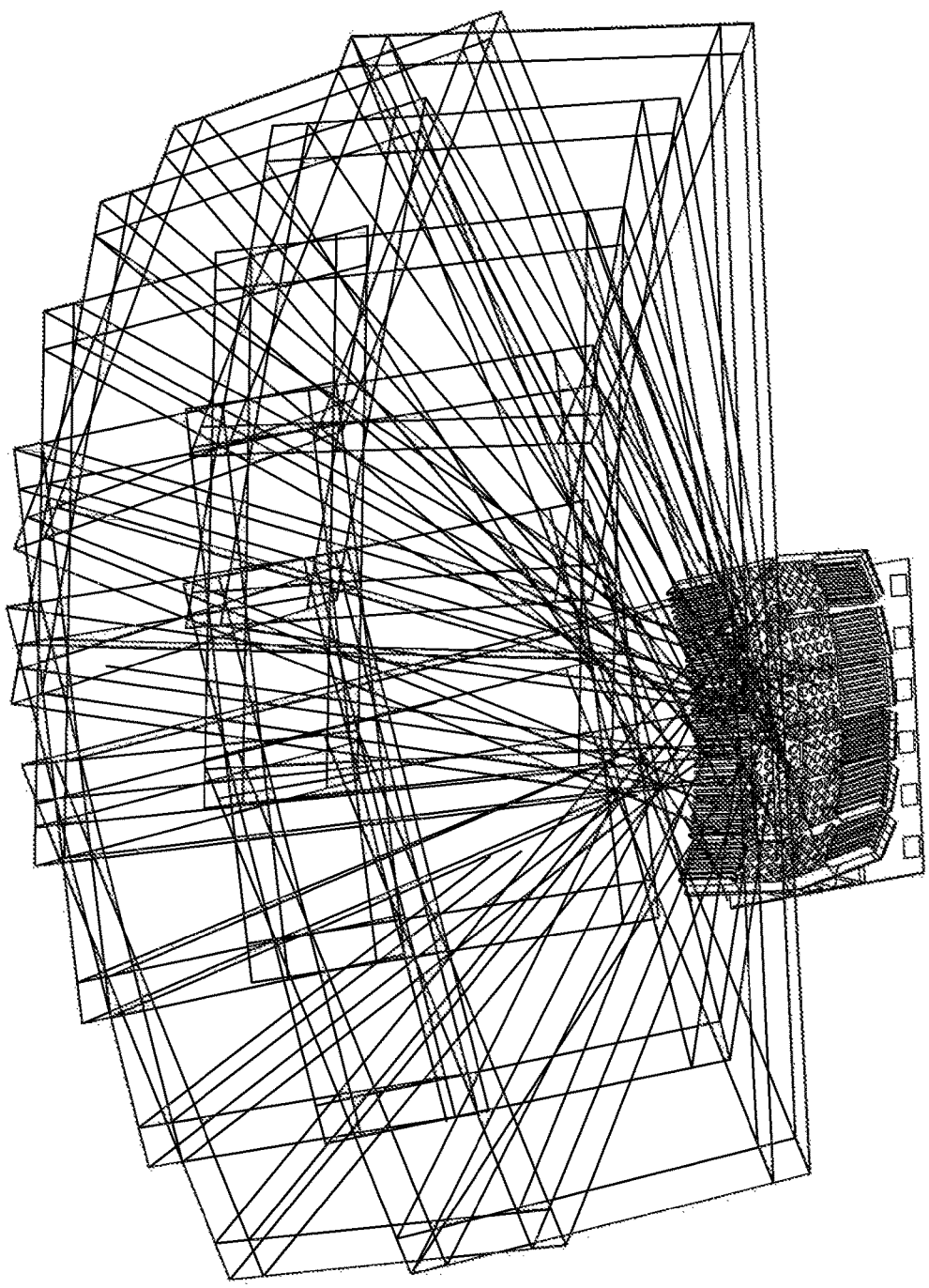

FIGS. 10D to 10F illustrate fields of view of some of the facets 1030 on the dense field imager 1000 illustrated in FIGS. 10A to 10C. FIG. 10D illustrates the overlapping fields of view of the facets 1030 as viewed in the y-z plane to show the vertical overlapped regions. FIG. 10E illustrates the overlapping fields of view of the facets 1030 as viewed in the x-z plane to show the horizontal overlapped regions. FIG. 10F illustrates the overlapping fields of view as viewed in a plane that is nearly parallel to the x-y plane to illustrate the horizontal and vertical overlapped regions. The example dense field imager 1000 provides a region of relatively high coverage 1060 where a majority of facets 1030 have overlapping fields of view, as can most easily be seen in FIGS. 10D and 10E.

Figure 11A:
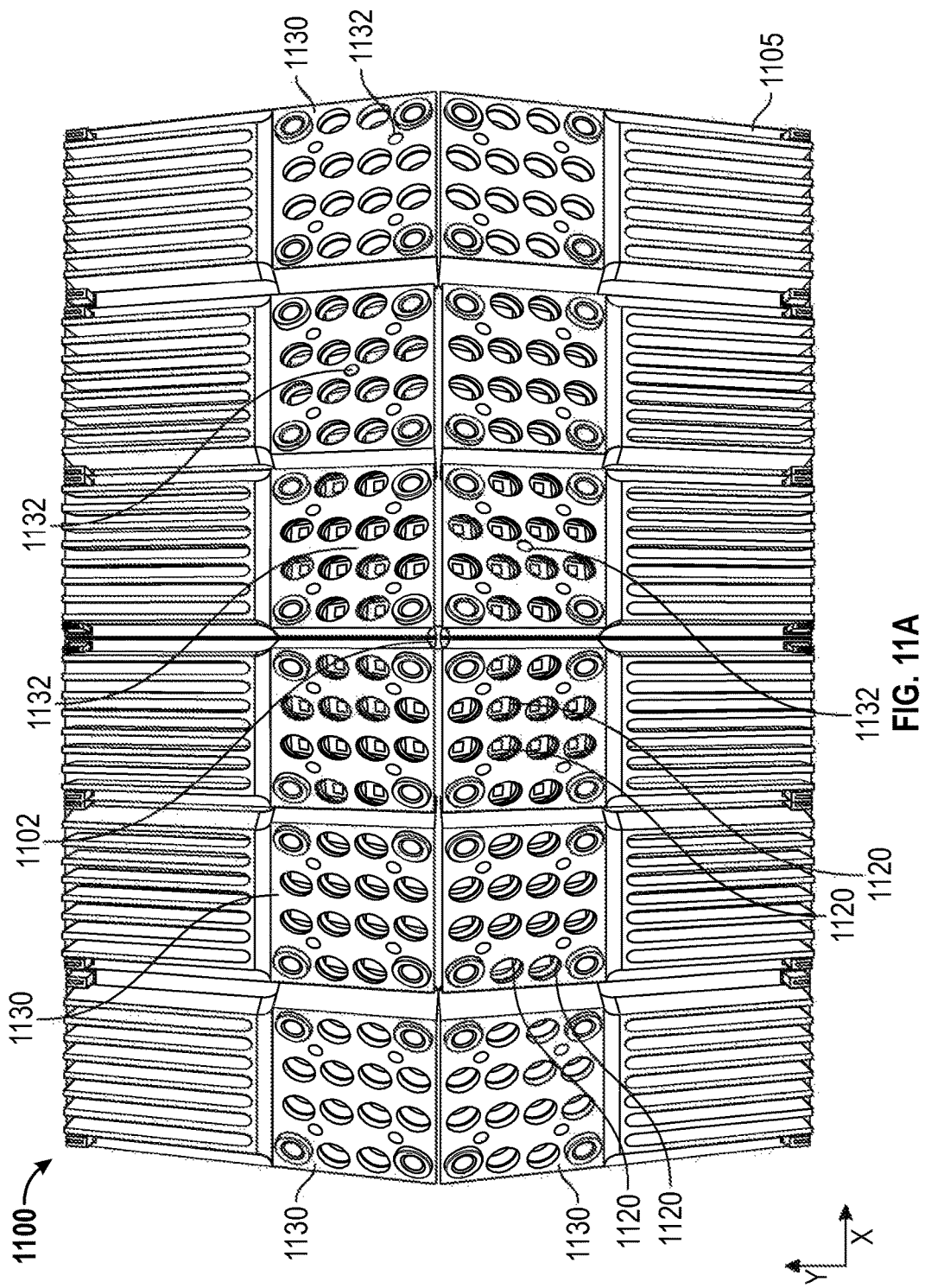
FIGS. 11A-C illustrate an example embodiment of a dense field imager having facets that are mounted in a convex fashion.
Figure 11B:
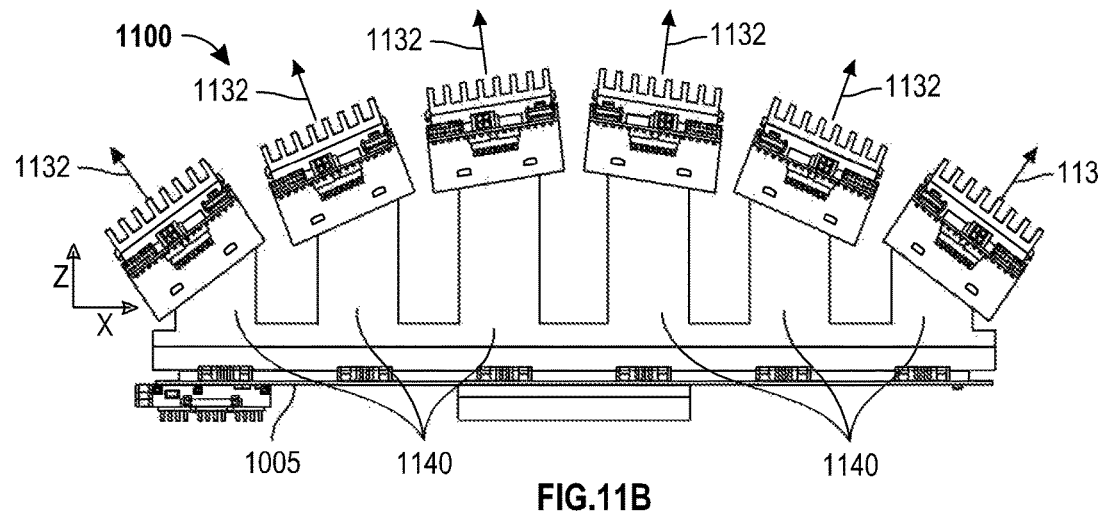
Figure 11C:
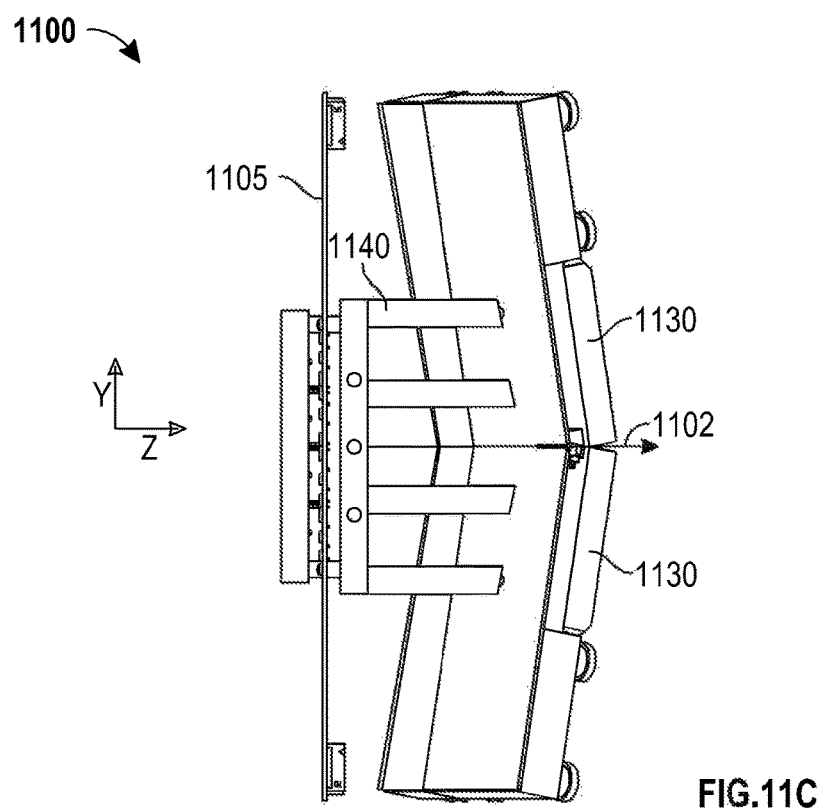

FIGS. 11A to 11C illustrate an example embodiment of a dense field imager 1100 having facets 1130 that are mounted in a convex fashion. The dense field imager 1100 can include a common support 1105 that lies within an x-y plane (e.g., the plane of the paper in FIG. 11A). The plurality of facets 1130 can be attached or secured to the common support 1105 through mounting elements 1140.

Following the coordinate system convention described with reference to FIGS. 10A to 10C, the mounting elements 1140 can be configured to orient one or more facets 1130 such that the facet optical axes 1132 are not parallel to the primary optical axis 1102. In the example embodiment illustrated in FIGS. 11A to 11C, the mounting elements 1140 secure the facets 1130 in such a way that the facet optical axes 1132 generally diverge from the primary optical axis 1102 in both the x- and y-directions. Other configurations are possible as well. For example, the mounting elements 1140 can be configured to orient one or more facets 1130 such that the facet optical axes 1132 remain parallel to the primary optical axis 1102 in either the x- or y-direction while diverging in the other direction (e.g., parallel in the x-direction and diverging in the y-direction). The mounting elements 1140 can be configured to orient one or more facets 1130 such that the facet optical axes 1132 converge towards the primary optical axis 1102 in either the x- or y-directions while diverging in the other direction (e.g., converging in the x-direction and diverging in the y-direction). The mounting elements 1140 can be configured to orient one or more facets 1130 such that some of the facet optical axes 1132 remain parallel to the primary optical in a first direction while diverging in a second, orthogonal direction, some facet optical axes 1132 remain parallel in the second direction and diverge in the first direction, some facet optical axes 1132 converge in either the first or second direction and diverge in the other direction, or any combination of these.

In some embodiments, the mounting elements 1140 generally orient the plurality of facets 1030 along an exterior surface of a sphere, an ellipsoid, a cylinder, a cylindrical ellipsoid, a paraboloid, a hyperboloid, a polyhedron, or some other regular or irregular surface. In some embodiments, the mounting elements 1140 can be configured to be movable through mechanical adjustments and/or through actuators configured to change an orientation of one or more facet planes. The mounting elements 1140 can be manually and/or automatically adjustable. The facets 1130 can be mounted to the common support 1105 to provide a desired or targeted combined field of view. The combined field of view can be configured to provide coverage for a relatively wide area to provide image information over the area using a single imaging device (e.g., the dense field imager 1100) rather than a multitude of individual imaging devices.

Figure 11D:
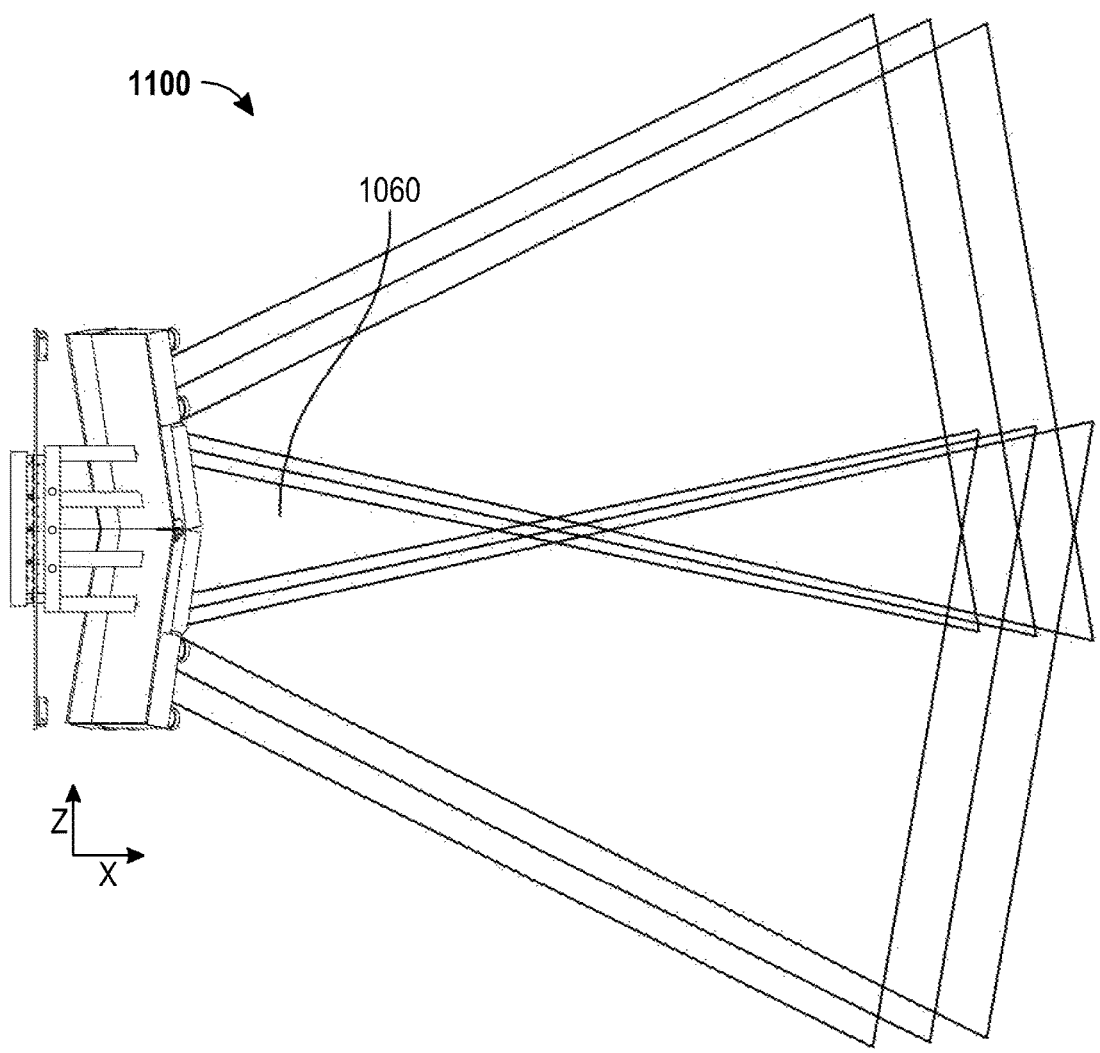
FIGS. 11D-F illustrate fields of view of some facets on the dense field imager illustrated in FIGS. 11A-C.
Figure 11E:
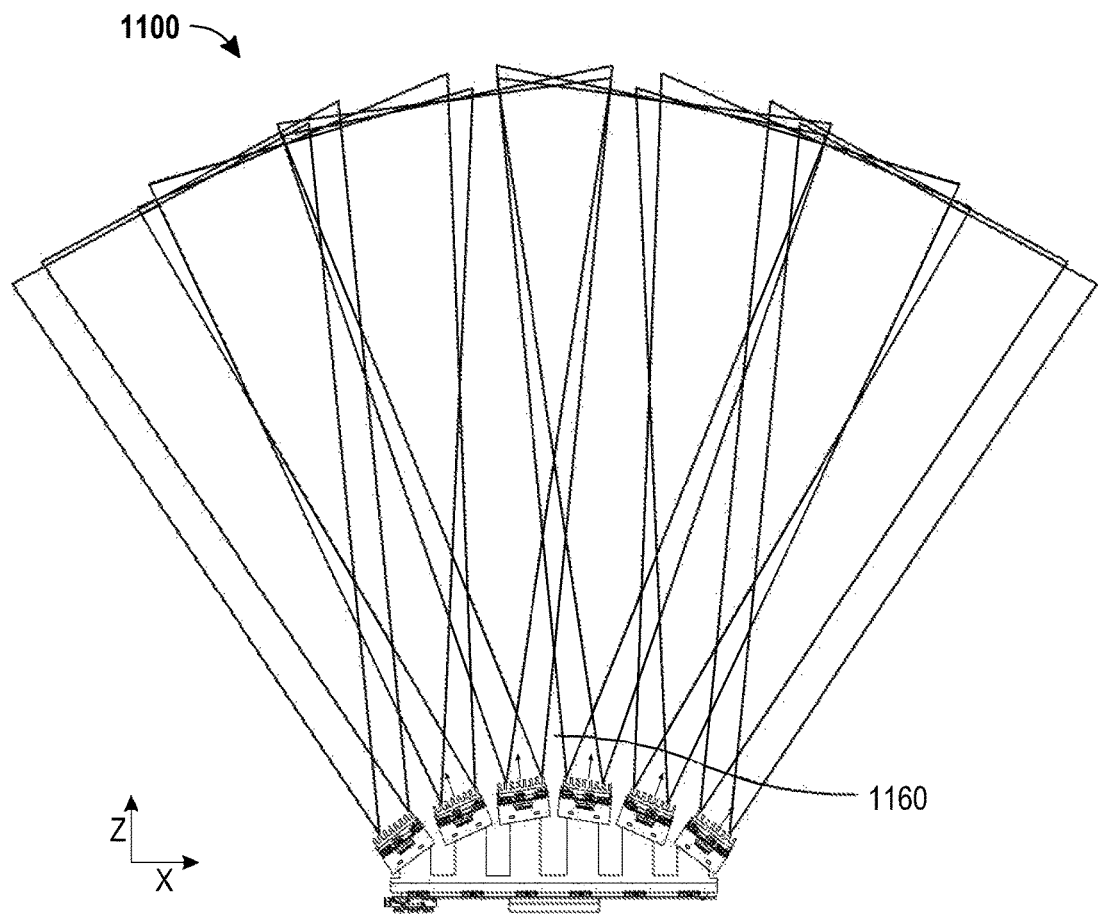
Figure 11F:
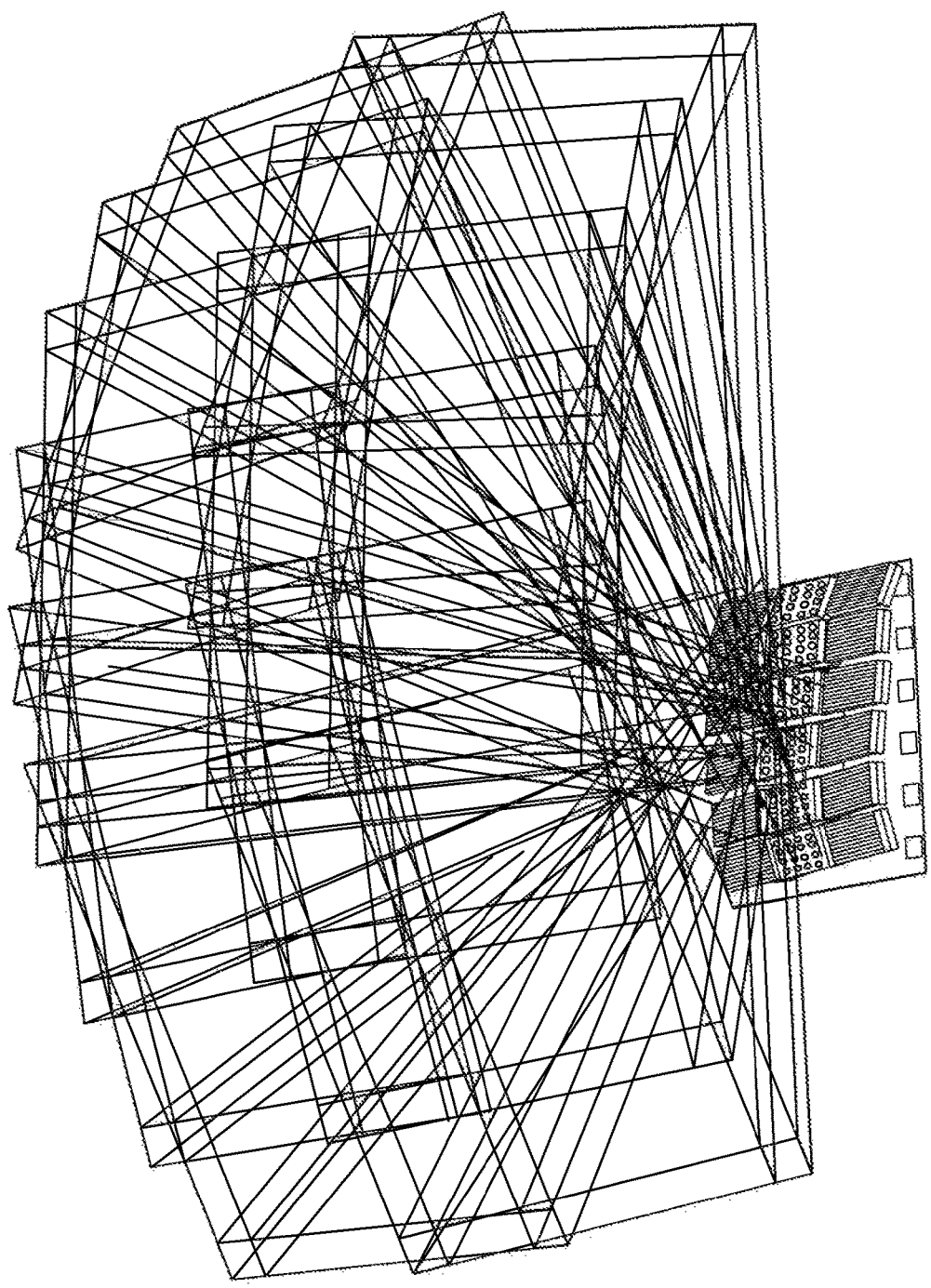

FIGS. 11D to 11F illustrate fields of view of some of the facets 1130 on the dense field imager 1100 illustrated in FIGS. 11A to 11C. FIG. 11D illustrates the substantially adjacent fields of view of the facets 1130 as viewed in the y-z plane to show the vertical overlapped regions. FIG. 11E illustrates the substantially adjacent fields of view of the facets 1130 as viewed in the x-z plane to show the horizontal overlapped regions. FIG. 11F illustrates the fields of view of the facets 1130 as viewed in a plane that is nearly parallel to the x-y plane to illustrate a size of the combined field of view of the dense field imager 1100. The example dense field imager 1100 can be configured to provide dense field data over a relatively wide field of view.

Example Dense Field Imager with Display

Figure 12A:
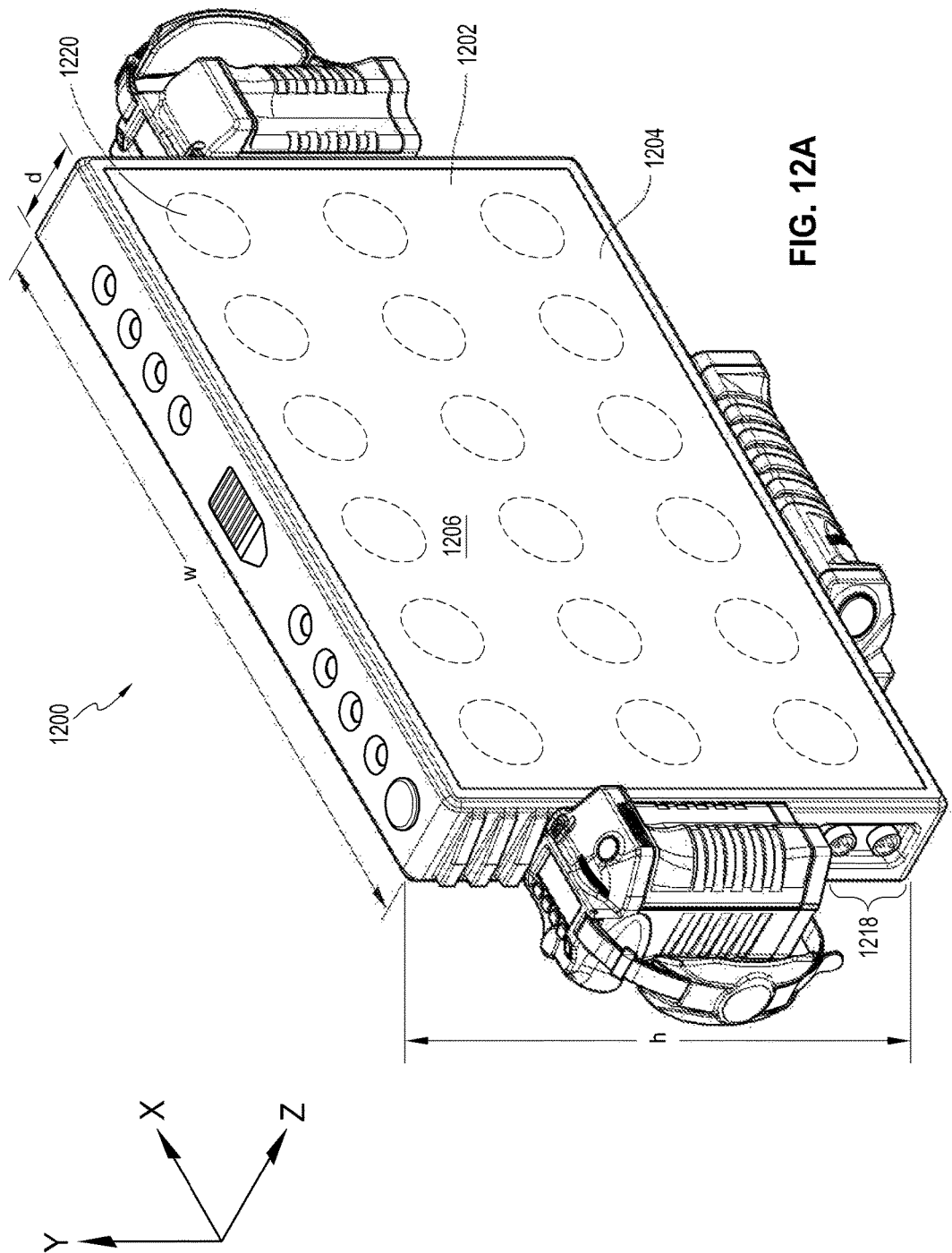
FIGS. 12A and 12B illustrate perspective views of an example dense field imager including a plurality of imaging elements arranged in an array.
Figure 12B:
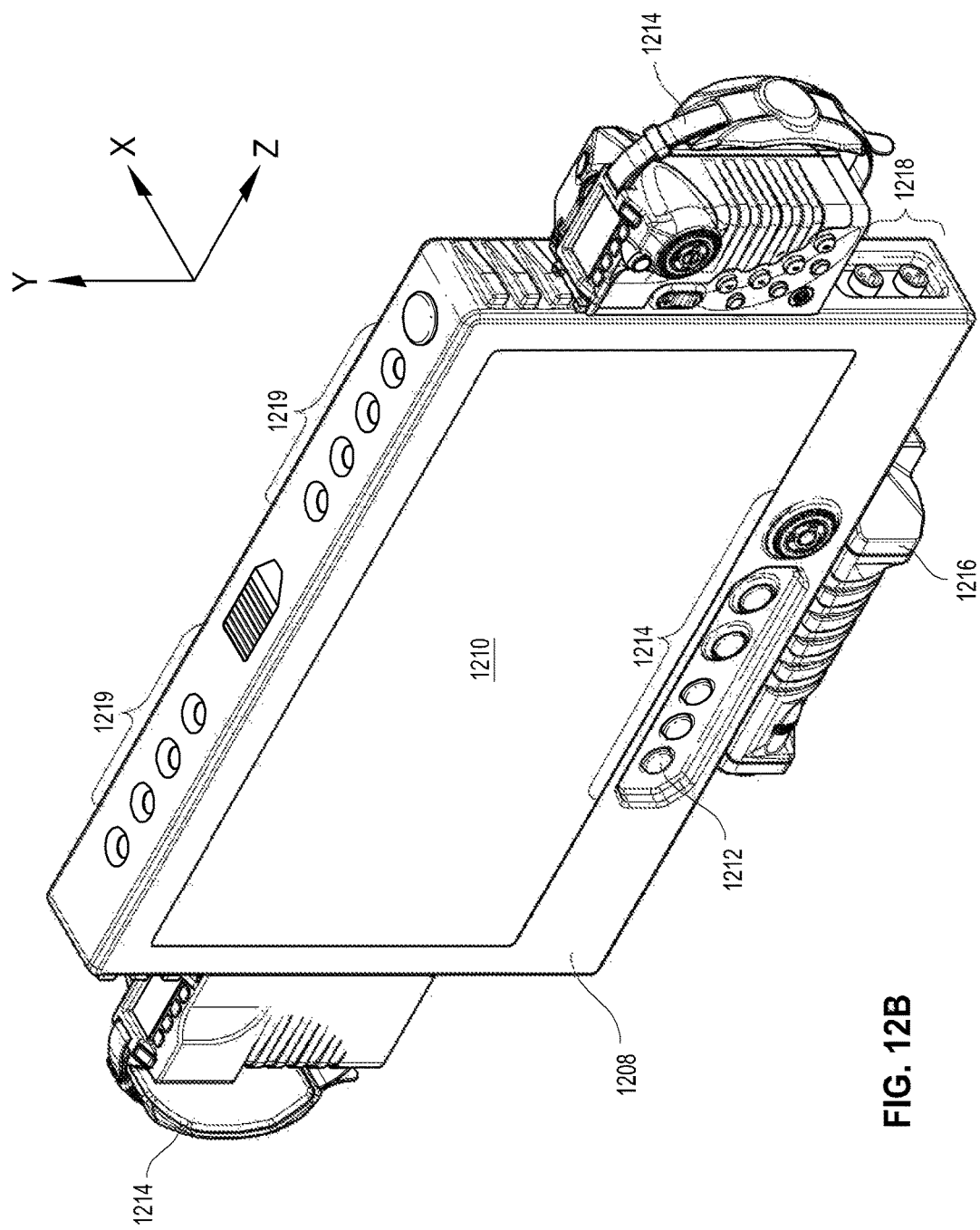

FIGS. 12A and 12B illustrate perspective views of an example dense field imager 1200 including a plurality of imaging elements 1220 arranged in an array. The imaging elements 1220 can include a sensor, electronics, and/or an optical system. The imaging elements 1220 are contained within a body 1202. As such, the dense field imager 1200 can be a substantially integrated, portable unit. A first face 1204 of the body 1202 includes a transparent or substantially transparent surface 1206, while a second face 1208 includes a viewfinder screen 1210.

The imaging elements 1220 are situated within the body 1202 such that their respective optical systems gather and focus light that is incident on and passing through the surface 1206. The surface 1206 can be made of glass or plastic, for example. In one embodiment, the surface is partially opaque, and includes transparent windows that correspond to each of the individual imaging elements 1220. In some cases, the surface 1206 is treated with one or more anti-reflective coatings in order to reduce glare or lens flare. The surface 1206 in some cases is a lens, and is shaped to refract light in a desired fashion. In some instances, one or more additional lenses or other optical elements are situated beneath the surface 1206, between the optical systems of the individual imaging devices and the face 1204.

Depending on the embodiment, individual imaging elements 1220 in the array can be adjacent to one another, or can be spaced by an appropriate amount. Moreover, physical barriers can be included between the individual imaging elements 1220 to reduce cross-talk or other noise between adjacent imaging elements.

The display 1210 can include any type of monitoring device. For example, but without limitation, the display 1210 can include an LCD panel. In some embodiments, instead of or in addition to the integral display 1210, a display is connected to an infinitely adjustable mount configured to allow the display 1210 to be adjusted to any position relative to the body 1202 of the dense field imager 1200 so that a user can view the display 1210 at any angle relative to the body 1202. In some embodiments, a separate display can be connected to the body 1202 through any type of appropriate cabling or other connection, or wirelessly.

The display 1210 may also include a "look-around" feature, in which the display 1210 shows images for playback that have a larger scene area than the those that are being recorded for playback and/or editing. For instance, the dense field imager 1200 may be capable of capturing image data corresponding to a first image scene area but, due to the desired aspect ratio or other formatting parameters, the system only includes image data corresponding to a certain sub-set of the captured image scene area in the recorded video file. In such cases, the system may discard a certain amount of edge or boundary content for recording purposes. However, the display 1210 may depict some or all of the edge or boundary content in addition to the recorded content. Moreover, the display 1210 may include a rectangular box or other indication of what portions of the displayed video are actually being recorded. One advantage of this feature is that camera operators can anticipate when objects are about to enter the recorded scene.

The dense field imager 1200 includes a control interface 1212. The control interface 1212 can include any of a variety of standard user interface features. For instance, the display 1210 may form part of the control interface 1212 and can be a touch screen, with integrated controls in the touch screen. Separate controls 1214 such as one or more knobs, buttons, keypads and the like may also be used. In one embodiment, the dense field imager 1200 includes a separate keyboard or other interface hingeably attached to an edge of the body 1202. The controls 1214 can provide a variety of functions including, for example, toggling the dense field imager 1200 between motion and still modes, entering a record mode, operating one or more of the displays or other components of the dense field imager 1200, and the like.

As shown, one or more handles 1216 can be attached to the body 1202. While the illustrated embodiment includes two handles 1216 attached to the left and right sides of the body 1202, one or more handles 1216 can also be attached to the top and/or bottom sides of the body 1202. The handles 1216 may be releasably attachable to the camera body in some cases. For instance, the handles 1216 can be attached for hand-held use, but removed for studio or other non-hand-held use.

One or more of the handles 1216 can include an interface (not shown) including features for mechanically and/or electrically coupling the handle to a corresponding interface (not shown) on the body 1202. The handles 1216 may be releasably attachable to the body 1202 via a variety of mechanisms including friction-fit, snap-fit, threaded components, and the like.

In some embodiments, one or more of the handles 1216 further includes a variety of controls for operating the dense field imager 1200. The controls may include exposure controls, focus controls, and the like, which may be user-definable and suitable for use in still and/or video applications. The handles 1216 may be particularly suited for hand-held and light-weight tripod use. In certain embodiments, one or more of the handles 1216 includes a rechargeable battery, allowing for lightweight and low-profile remote use without a separate power source. For instance, the battery may be releasably insertable into a corresponding receptacle in the handle 1216. Alternatively, one or more batteries can be integrated into a handle 1216. When the battery reaches discharge, the handle 1216 can be removed from the dense field imager 1200 and replaced with a second handle, containing a second, fully charged battery.

While three handles 1216 are shown in FIGS. 12A and 12B, other numbers and types of handles can be used. In one configuration, a fourth handle is positioned on the top side of the body 1202, providing convenient handling regardless of the orientation of the dense field imager 1200.

The dense field imager 1200 can further include one or more ports 1218 providing output and/or input connectivity to and from external devices. A wide variety of types of ports can be used, including, without limitation, Ethernet, USB, USB2, USB3, IEEE 1394 (including but not limited to FireWire 400, FireWire 800, FireWire S3200, FireWire S800T, i.LINK, DV), SATA, SCSI, monitoring ports capable of outputting high resolution image data (e.g., 1080p, 2 k, or 4 k image data), such as HD-SDI, HDMI, etc.

The dense field imager can further include one or more mounting points 1219 which serve as mounting points for a variety of components. For, instance, the dense field imager 1200 can be compatible with various rails, rods, shoulder mounts, tripod mounts, helicopter mounts, matte boxes, follow focus controls, zoom controls, and other features and other accessories known in the art. And one or more of devices providing these functions can be mountable on one or more brackets or other mounting points on the dense field imager 1200.

Figure 13:
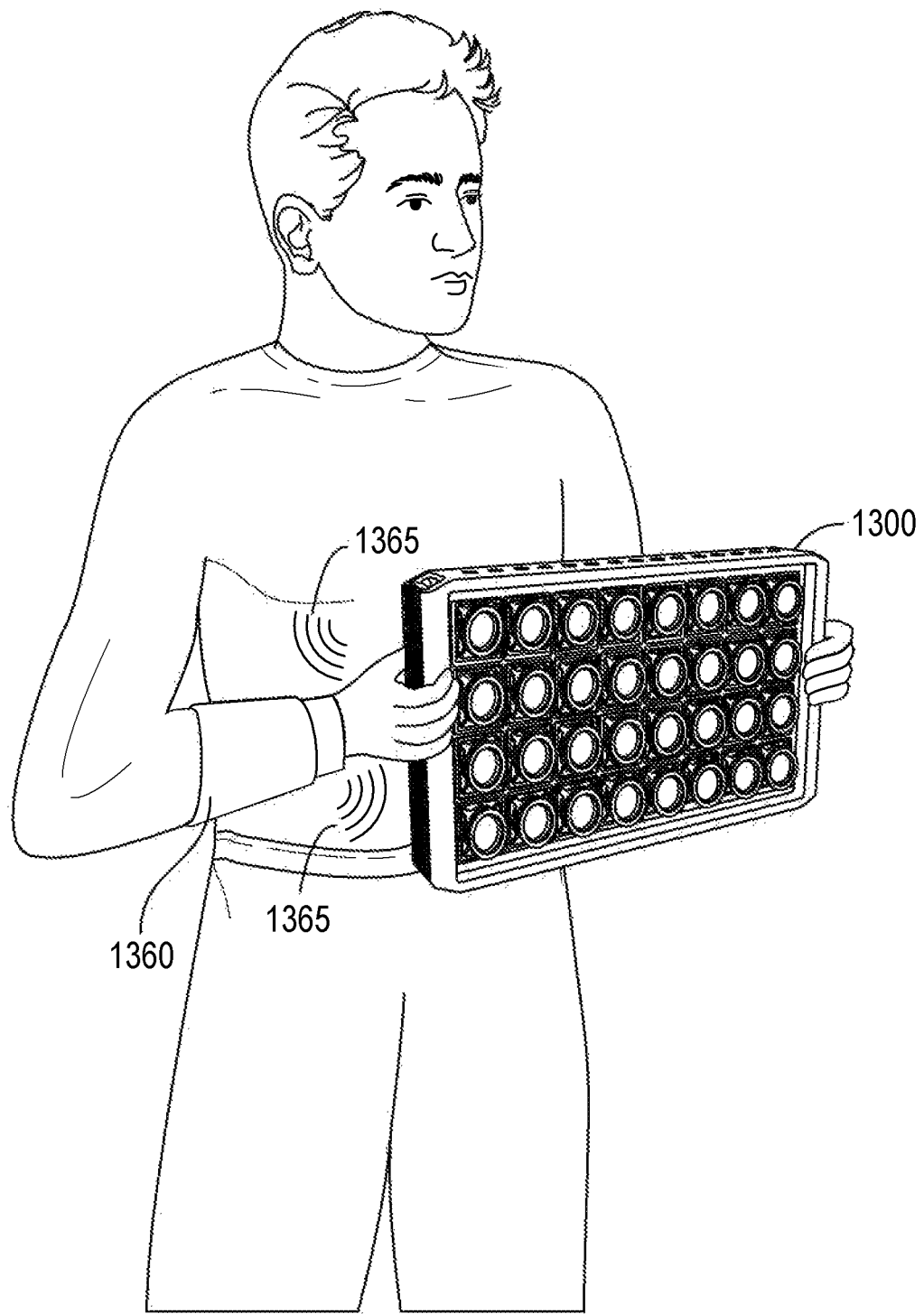
FIG. 13 illustrates an embodiment of a dense field imager that is configured to wirelessly transmit acquired data to an image hub.

In some cases, a remote unit (an example of which is shown in FIG. 13) includes a control interface and is in wireless communication with a wireless interface of the dense field imager 1200, providing operators with the ability to control camera operation remotely. For example, the remote and the camera may include wireless transceivers. In yet other configurations, the wireless interface is configured to communicate data wirelessly. For instance, image data can be communicated to an external device for remote viewing purposes. This can be particularly useful in situations where the viewfinder 1210 is not visible or accessible to the camera operator, such as where the dense field imager 1200 is mounted to a vehicle.

As shown, the dense field imager 1200 has a depth d, width w, and height h, and the form factor is generally configured for straightforward handheld and other portable operation. The multi-imaging element configuration allows for a particularly low-profile design, while still providing the high performance video and/or still capture described herein. For instance, the depth d can be less than about 0.5 inches, less than about 1 inch, less than about 1.5 inches, less than about 2 inches, or less than about 3 inches, depending on the configuration.

While the imaging elements 1220 are arranged in a 3×6 (vertical×horizontal) array in the illustrated embodiment, the arrangement and number of imaging elements 1220 can vary depending on the embodiment. In another embodiment, the imaging elements 1220 are arranged in a 9×18 (vertical× horizontal) array.

The imaging elements 1220 of the illustrated embodiment can be grouped into facets where each facet has imaging elements 1220 arranged in a 2×3 (vertical×horizontal) array, a 3×3 array, a 2×1 array, or a 1×3 array, or any combination of these. In another embodiment, the number of imaging elements 1220 can differ and the facets can be configured accordingly.

The resolutions of the individual sensors can vary. However, the dense field imager 1200 can be configured to produce an output that is not dependent on the input resolution. For example, the dense field imager 1200 can include a plurality of facets, each facet having a plurality of imaging elements 1220. Each facet can be configured to produce light field representations, and the dense field imager 1200 can be configured to combine the light field representations from the plurality of facets to produce a dense field representation. From the dense field representation, viewpoints can be generated at a variety of output resolutions which are independent of the input resolution. The above was described in relationship to spatial resolution, but it also applies for temporal resolution. Accordingly, the dense field imager 1200 can produce an output that can be used to generate viewpoints (e.g., images and/or video) that whose output resolution (e.g., spatial and/or temporal resolution) that is not dependent on the input resolution.

The width w of the body 1202 may also be optimized. For instance, the width w of the box may be no more than about 20 inches, no more than about 18 inches, no more than about 12 inches, or no more than about 14 inches. For instance, in certain embodiments, the camera system provides dense field data and has a width w of no more than about 20 inches, no more than about 18 inches, no more than about 12 inches, or no more than about 14 inches, depending on the desired lens size and sensor spacing. In another embodiment, the dense field imager 1200 provides dense field data and has a width w of no more than about 10 inches, no more than about 8 inches, no more than about 6 inches, or no more than about 4 inches, depending on the desired lens size and sensor spacing.

Moreover, the dense field imager 1200 also provides for a particularly large total imaging surface area in a low-profile package. For instance, the total span of the sensing surface, which can correspond to the sums of longest edges of the individual sensors, can be relatively large in comparison to the depth d of the body 1202 along the optical axis. As an example, where a 9×18 array (vertical by horizontal) of 5 mm×5 mm sensors are used, and the depth d is 25.4 mm (1 inch), the ratio of the total span of the sensing area, along the array horizontally, to the depth d, is about 3.54 (90 mm/25.4 mm). As another example, where a 20×40 (vertical by horizontal) array of 5 mm×5 mm sensors are used, and the depth d is 25.4 mm (1 inch), the ratio of the total span of the sensing area, along the array horizontally, to the depth d is about 7.87 (200 mm/25.4 mm). As yet another example, where a 3×6 array (vertical by horizontal) of 5 mm×5 mm sensors are used, and the depth d is 25.4 mm (1 inch), the ratio of the total span of the sensing area, along the array horizontally, to the depth d, is about 1.8 (30 mm/25.4 mm). These are just a few illustrative examples. Depending on the embodiment, the ratio of the sum of the sensing surface along a particular direction in the sensing plane (e.g., horizontally or vertically across the array of imaging elements 1220), to the depth d of the body 1220, is at least about 0.25, 0.3, 0.5, 0.75, 1, 2, 3, 4, 5, 6, 7, 8, 9, 10, 15, 20, 25, or 50.

The total span of the lens surface can also be relatively large in comparison to the depth d of the dense field imager 1200. For instance, the total span of the lens area can correspond to the sums of the widths (e.g., diameters for circular lenses) of the individual lenses at their widest points. As an example, where a 9×18 array of lenses having a diameter of 15 mm is used, and the depth d is 25.4 mm (1 inch), the ratio of the span of the lens surface along the horizontal direction across the array is 10.62 (270/25.4 mm). As another example, where a 20×30 array of lenses having a diameter of 15 mm is used, and the depth d is 25.4 mm (1 inch), the ratio of the span of the lens surface along the horizontal direction in the array is 17.7 (450/25.4 mm). These are just a couple of examples. Depending on the embodiment, the ratio of the sum of the total lens surface along a particular direction in the sensing plane (e.g., horizontally or vertically across the array of imaging devices), is at least about 1, 5, 10, 11, 12, 13, 14, 15, 16, 17, 18, 19, 20, 25, 30, 40, 50, 60, 70, 80, 90, or 100.

According to some embodiments, the dense field imager 1200 is modularly expandable to increase the number of facets and imaging elements 1220. For instance, the dense field imager 1200 can be extended via attachment of a dense field imaging module that includes one or more facets, each facet having a plurality of imaging elements. In some other embodiments, the dense field imager 1200 may include a slot, bay or other receptacle for insertion of one or more additional dense field imaging modules. For instance, the body 1202 may include a slot on one of its sides for receiving additional dense field imaging modules. The dense field imaging modules may have the same number of facets, imaging elements, and/or a similar form factor as the dense field imager 1200, or can have different numbers of facets, imaging elements, and/or form factors. In this manner, the dense field imager 1200 can be scalable to achieve a particular field of view or other outcome. One or more mounting brackets, snap-fit or friction-fit mechanisms, or other appropriate components can be used to fasten the dense field imaging modules together.

Figure 12C:
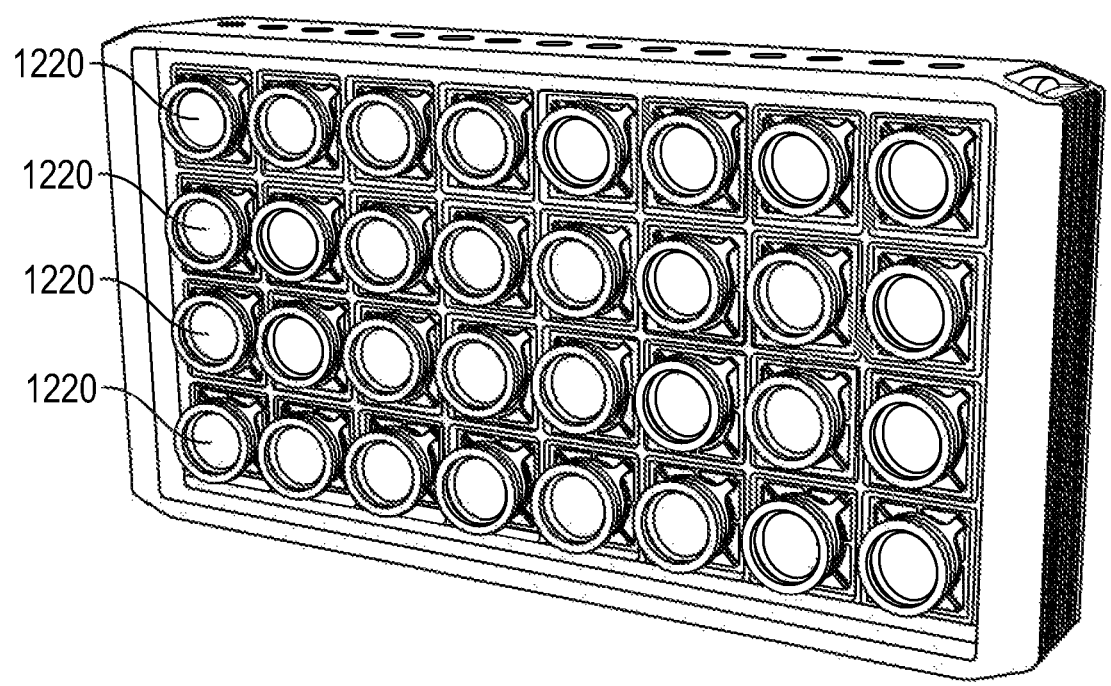
FIG. 12C shows a side perspective view of an embodiment of a dense field imager having a plurality of imaging elements with large, removable lenses.

FIG. 12C shows a side perspective view of an embodiment of the dense field imager 1200 having a plurality of imaging elements 1220 with large, removable lenses. The imaging elements 1220 can be configured to have removable lenses such that they can be exchanged and/or replaced. In addition, different types of lenses can be used on different imaging elements 1220. The lenses can also be changed or modified to include filters to provide desired optical properties. In embodiments such as those illustrated in FIGS. 12C to 12H, the transparent surface 1206 present in the dense field imager illustrated in FIGS. 12A and 12B can be excluded and/or removed. The relatively large lenses can provide an increased light sensitivity, increased zoom ratio, increased aperture, and the like when compared to smaller lenses. In addition, using a larger lens and/or imaging element 1220 in general can increase a size of the image sensor associated with the imaging element 1220, which can result in an increase in resolution for an individual imaging element (e.g., more pixels), and/or an increase in light sensitivity (e.g., larger pixels).

Figure 12D:
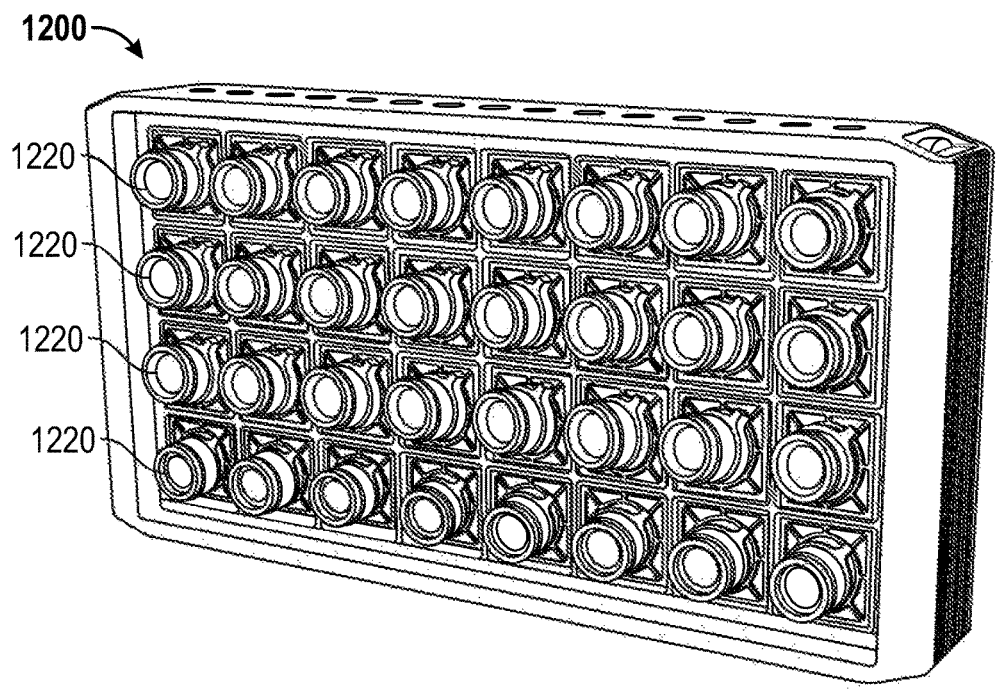
FIG. 12D shows a side perspective view of an embodiment of a dense field imager having a plurality of imaging elements with small, removable lenses.

FIG. 12D shows a side perspective view of an embodiment of the dense field imager 1200 having a plurality of imaging elements 1220 with small, removable lenses. Similar to the embodiment illustrated in FIG. 12C, the small, removable lenses can allow for a variety of lens types to be included in the dense field imager 1200. The relatively small lenses can provide for sharper images, larger depths of field, and the like. In addition, using a smaller lens and/or imaging element 1220 in general can increase the number of imaging elements that can be used in a given space. Moreover, using smaller lenses and/or imaging elements 1220 can correspond to using smaller imaging sensors which can produce images with a higher perceived sharpness.

Figure 12E:
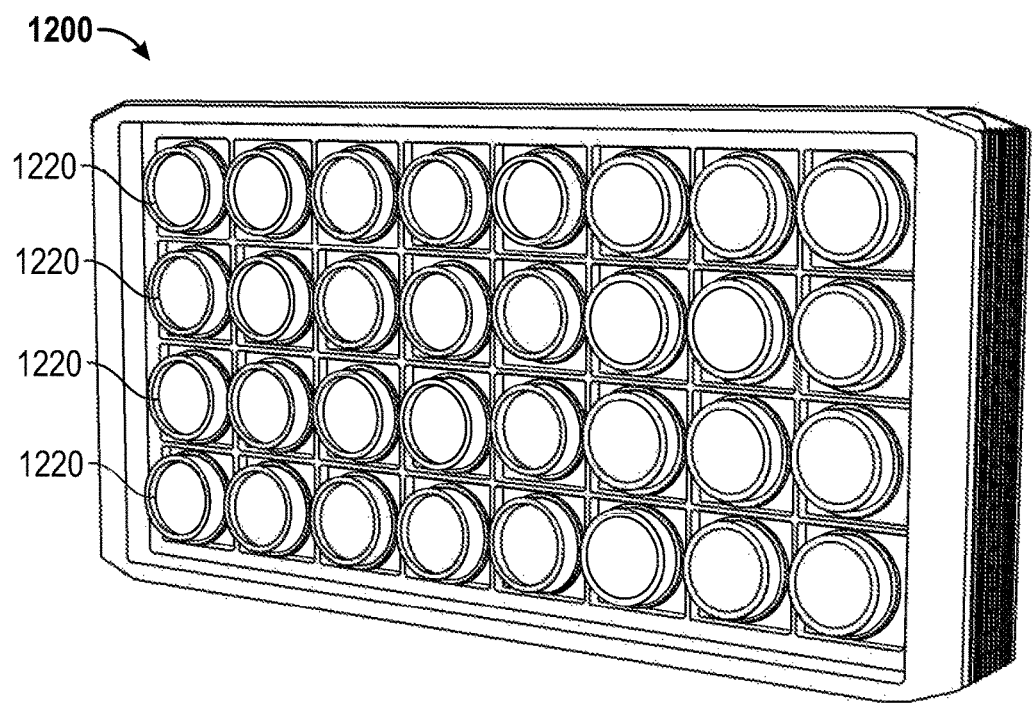
FIG. 12E shows a side perspective view of an embodiment of a dense field imager having a plurality of imaging elements with non-removable, low-profile lenses.

FIG. 12E shows a side perspective view of an embodiment of a dense field imager 1200 having a plurality of imaging elements 1220 with non-removable, low-profile lenses. The non-removable, low-profile lenses can advantageously reduce a size of the dense field imager 1200, making it easier to handle and operate. In addition, by making the lenses non-removable, the dense field imager 1200 can be more resistant to mechanical failures related to the addition and removal of lenses.

Figure 12F:
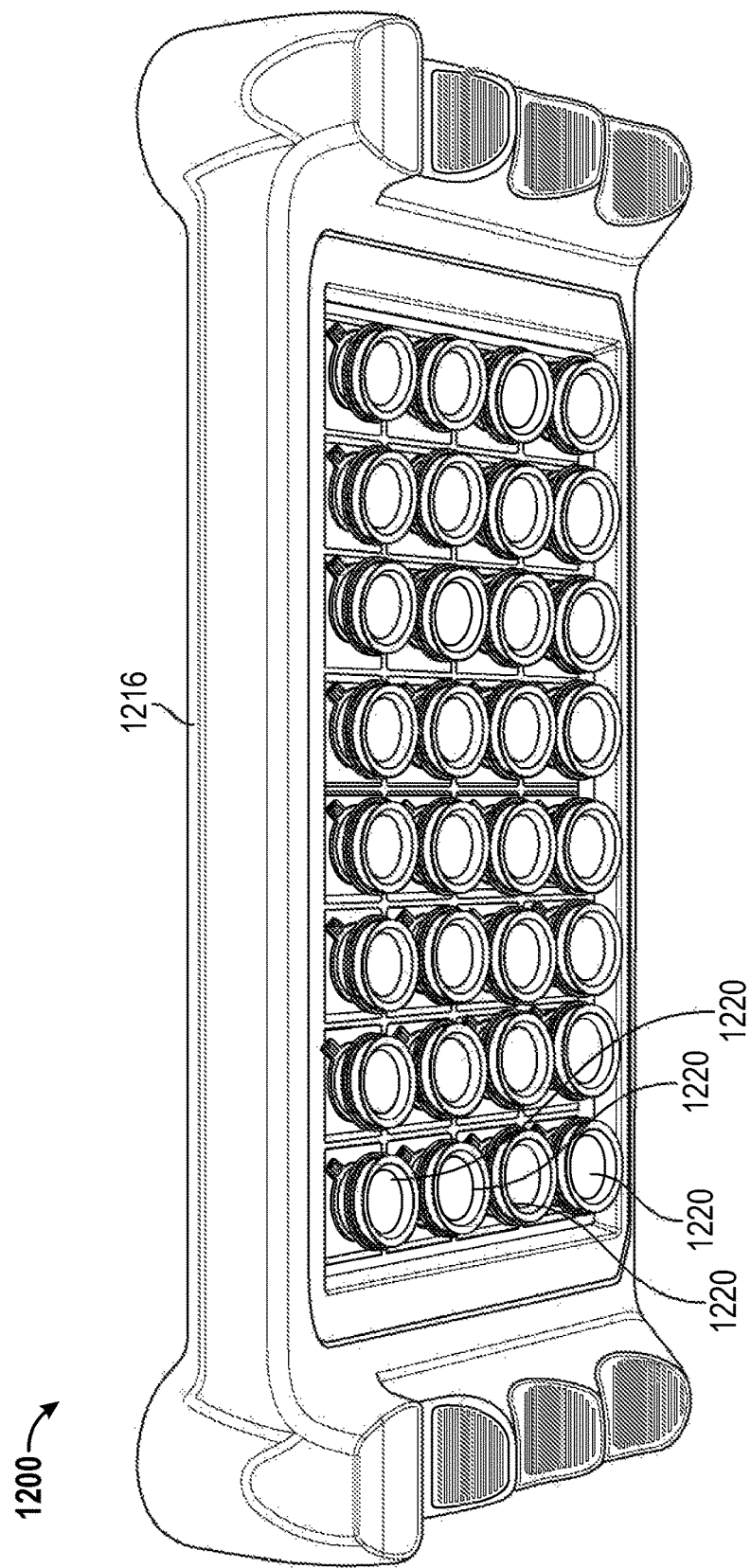
FIGS. 12F-H show top perspective views of a dense field imager with a grip attachment, the dense field imager having a plurality of imaging elements with, respectively, large, removable lenses; small, removable lenses; and non-removable, low-profile lenses.
Figure 12G:
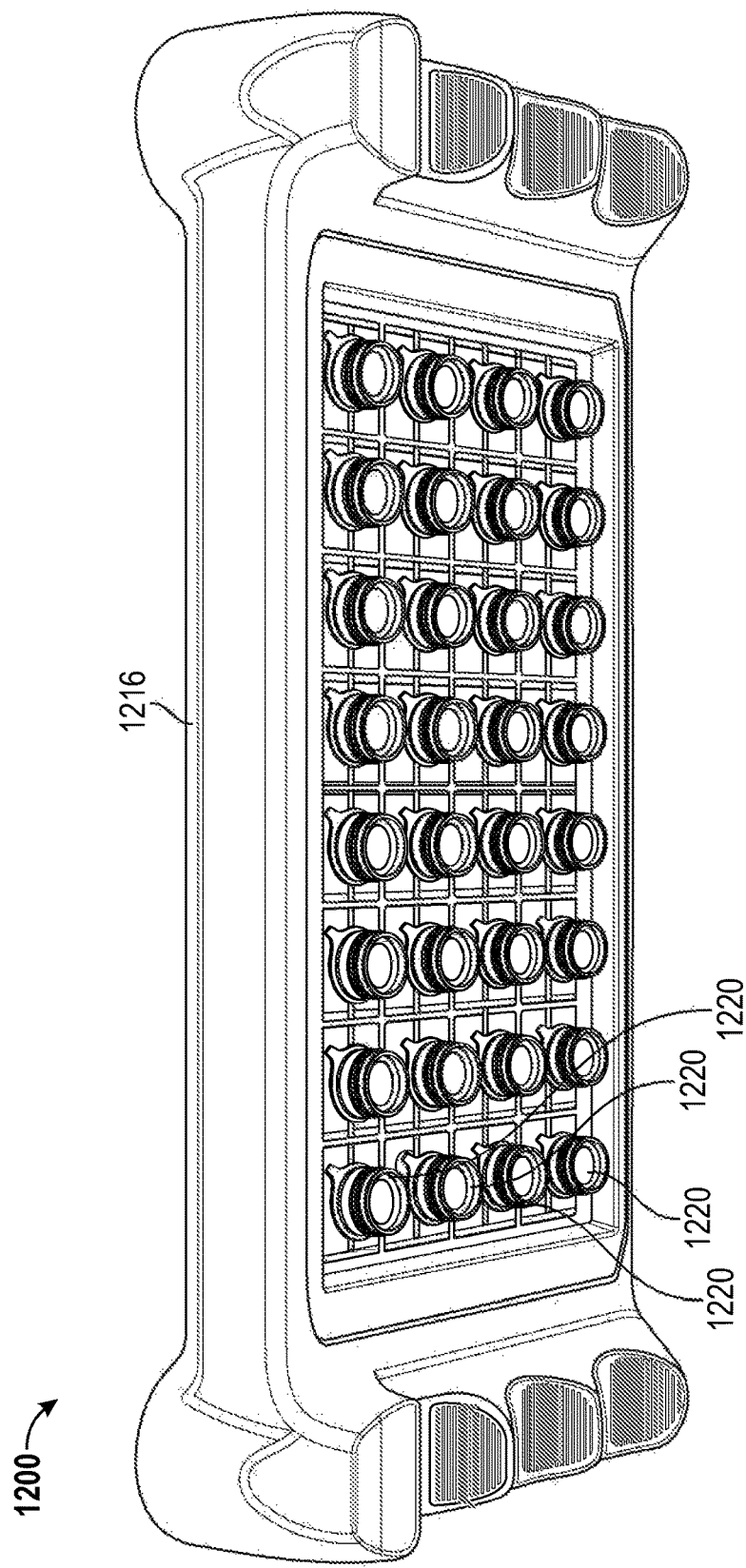
Figure 12H:
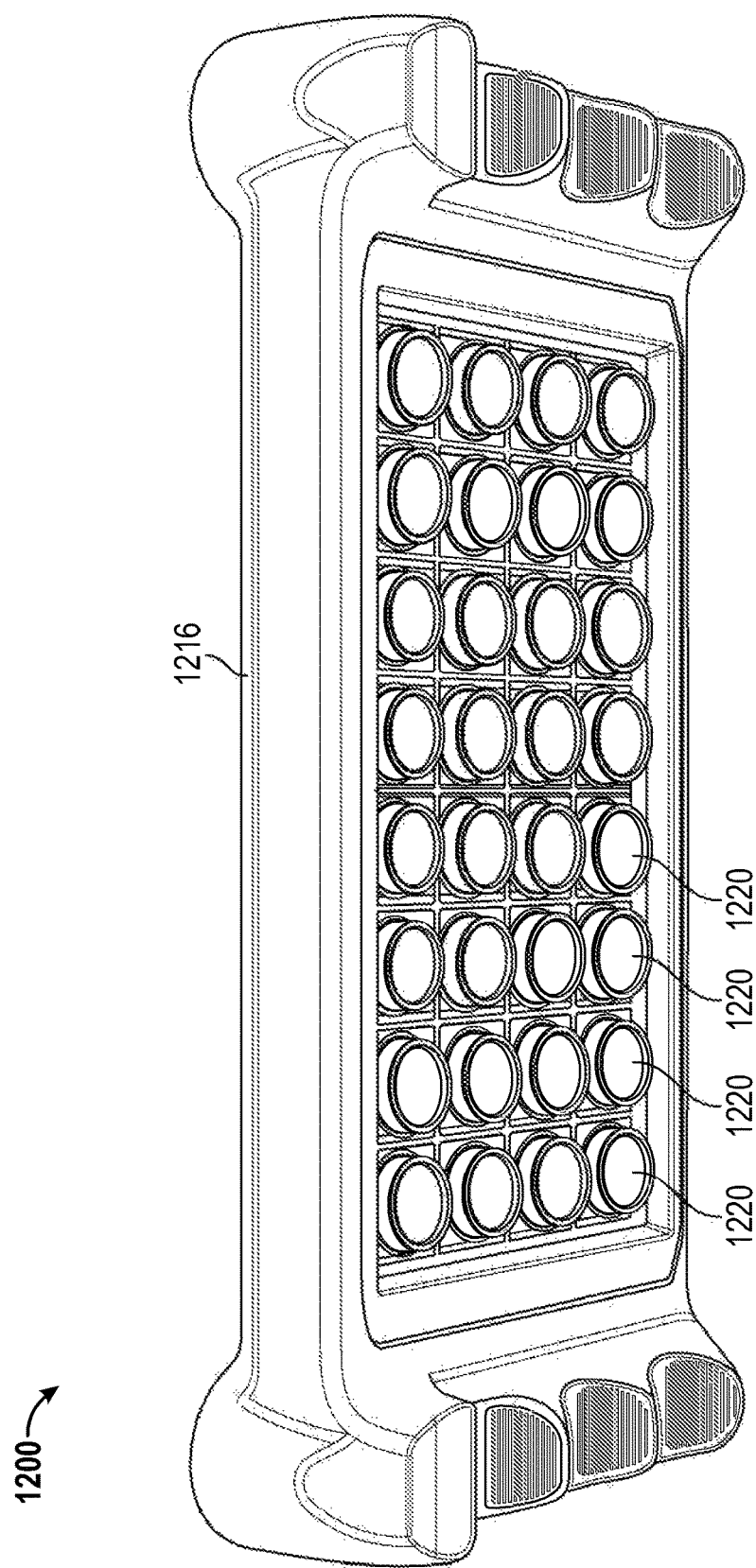

FIGS. 12F-H show top perspective views of the dense field imager 1200 with a grip attachment 1216, the dense field imager 1200 having a plurality of imaging elements 1220 with, respectively, large, removable lenses; small, removable lenses; and non-removable, low-profile lenses. The grip attachment 1216 can be configured to be removable to allow the dense field imager 1200 to be used in a variety of contexts. The grip attachment 1216 can allow for a user to easily operate and handle the dense field imager 1200, whereas removing the grip attachment 1216 may be desirable where the dense field imager will be mounted to a mounting device or where dense field imaging modules are to be attached. In some embodiments, the grip attachment 1216 includes user interface elements that allow the user to operate and configure properties of the dense field imager, such as a zoom, an orientation of imaging elements 1220 and/or facets, an acquisition mode (e.g., switching between image and video mode), an exposure time, and the like.

Figure 12I:
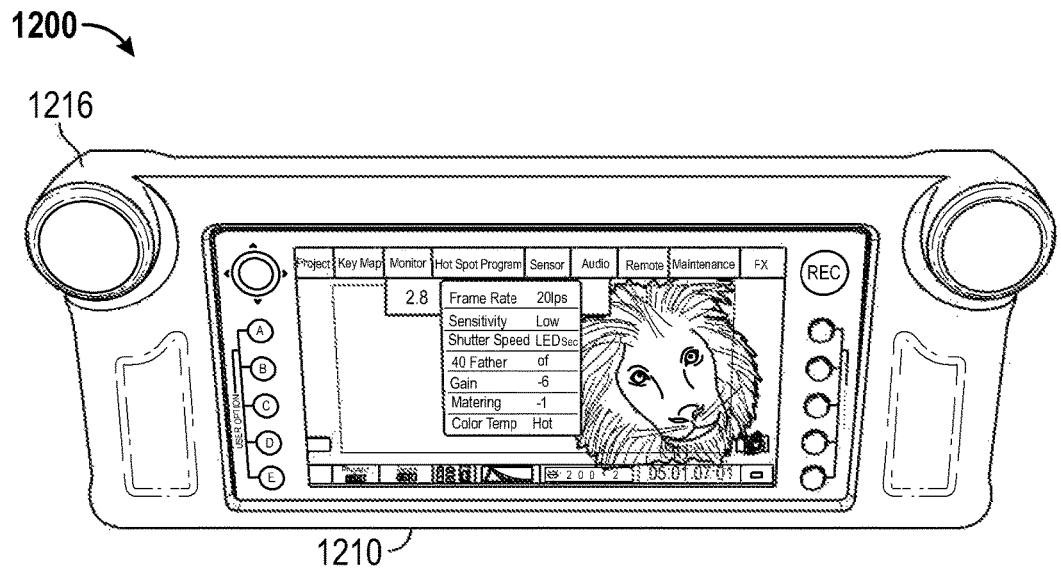
FIGS. 12I and 12J show top perspective views of a dense field imager, respectively with and without a grip attachment, showing the viewfinder screen.
Figure 12J:
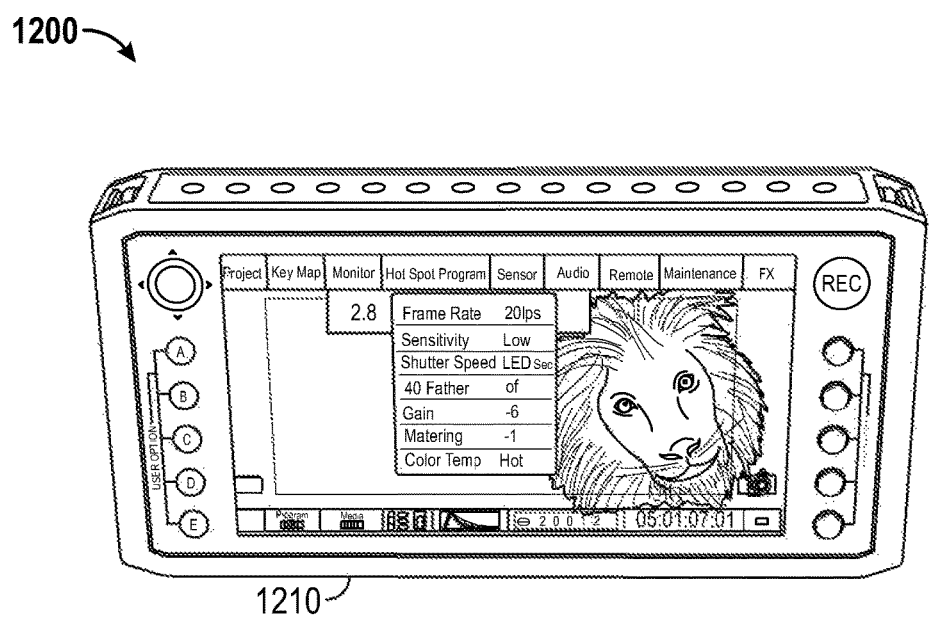

FIGS. 12I and 12J show top perspective views of the dense field imager 1200, respectively with and without a grip attachment 1216, showing the viewfinder screen 1210. As described above with reference to FIG. 12B, the display 1210 can be used to provide visual feedback to a user of the scene being captured. Because the dense field imager 1200 can be used to acquire light field data and output dense field data, the display 1210 can be configured to receive image information from a single imaging element 1220. In some embodiments, the imaging element 1220 providing information to the display 1220 can be automatically selected or it can be selected by a user. In some embodiments, the imaging element 1220 providing image information to the display can be switched according to criteria and/or user selection. In some embodiments, a facet can provide image information to the display 1210 and the display can allow a user to interact with light field data provided by the facet. For example, the user can re-focus a scene, zoom in on a scene, change a depth of field of a scene, adjust a viewpoint, and the like based at least in part on the light field data from a facet. Similar to the imaging element 1220, the facet can providing data to the display can be selected and/or switched automatically or manually. In some embodiments, the user can use the display 1210 to interact with dense field data provided by the dense field imager 1200. In some embodiments, the display 1210 can be used to acquire dense field data, to manipulate dense field data, and/or to configure the dense field imager 1200. The display 1210 can be configured to display status information to the user, such as storage information, wireless connectivity information, radiance or luminance information, distances to objects, and the like.

FIG. 13 illustrates an embodiment of a dense field imager 1300 that is configured to wirelessly transmit acquired data to an image hub 1360. The dense field imager 1300 can be any of the dense field imager embodiments described herein, such as those described with reference to FIGS. 1, 5A, 5B, 8, 9A-C, 10A-F, 11A-F, and/or 12A-J. The image hub 1360 can be any hardware system adapted to communicate wirelessly with the dense field imager 1300 and to store the data received from the dense field imager 1300.

In some embodiments, the image hub 1360 is portable. For example, the image hub 1360 can be configured to be worn by a user (e.g., a camera operator), attached to the clothing of a user, carried inside a bag by a user, moved with the dense field imager 1300, or the like. In some embodiments, the image hub 1360 is configured to have a substantially fixed location and can be located remote from the dense field imager 1300. For example, the image hub 1360 can be an image processing system that is located at a central image processing location that is within a wireless communication distance from the dense field imager. The wireless communication distance can vary depending on the wireless protocol to be used. For example, the wireless communication distance can be less than or equal to about 500 feet, less than or equal to about 100 feet, less than or equal to about 20 feet, less than or equal to about 10 feet, less than or equal to about 5 feet, less than or equal to about 2 feet, less than or equal to about 1 foot, or less than or equal to about 6 inches.

In some embodiments, the image hub 1360 is configured to communicate with the dense field imager 1300 using a wireless protocol capable of transmitting data at a desired data transmission rate. For example, the wireless communication can be accomplished using 802.11 standards (e.g., WiFi and/or WiGig), Bluetooth®, CDMA, GSM, NFC, or the like. In some embodiments, the wireless data transmission rates can be greater than or equal to about 20 Gbps, at least about 500 Mbps and/or less than or equal to about 10 Gbps, at least about 1 Gbps and/or less than or equal to about 5 Gbps, or less than or equal to about 500 Mbps.

In some embodiments, both the dense field imager 1300 and the image hub 1360 include a plurality of transceivers and antennas configured to communicate data in a parallel fashion over a plurality of data communication channels. In this way, the data transmission rates can be increased to accommodate more data such as when the data acquisition rate of the dense field imager 1300 increases. For example, the data acquisition rate of the dense field imager 1300 can increase where an acquisition mode switches from a still image acquisition mode to a video acquisition mode or where the dense field imaging modules are attached to the dense field imager 1300 thereby increasing the amount of data acquired.

The image hub 1360 can be configured to have a storage medium for recording the data received from the dense field imager 1300. The storage medium can be any suitable computer storage such as hard disk drives, solid state drives, or the like. The image hub 1360 can be configured to perform image processing as well as data storage. The image hub 1360 can include any suitable processing systems such as computer processors, FPGAs, DSPs, ASICs, and the like configured to process data received from the dense field imager 1300. For example, the image hub 1360 can be similar to the multi-image processing system 110 described herein with reference to FIG. 1.

Multi-Imaging Device Systems

Figure 14A:
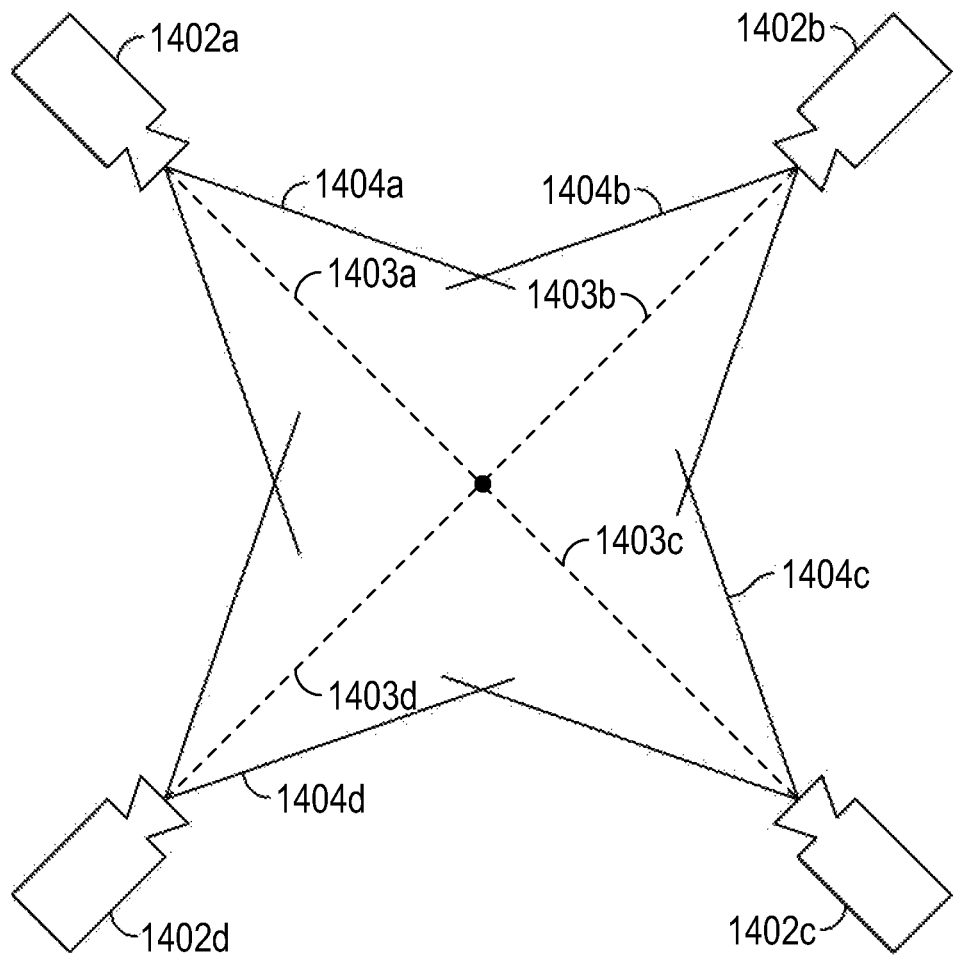
FIGS. 14A and 14B respectively illustrate a top plan view and a side elevational view of a multi-imaging device system.
Figure 14B:
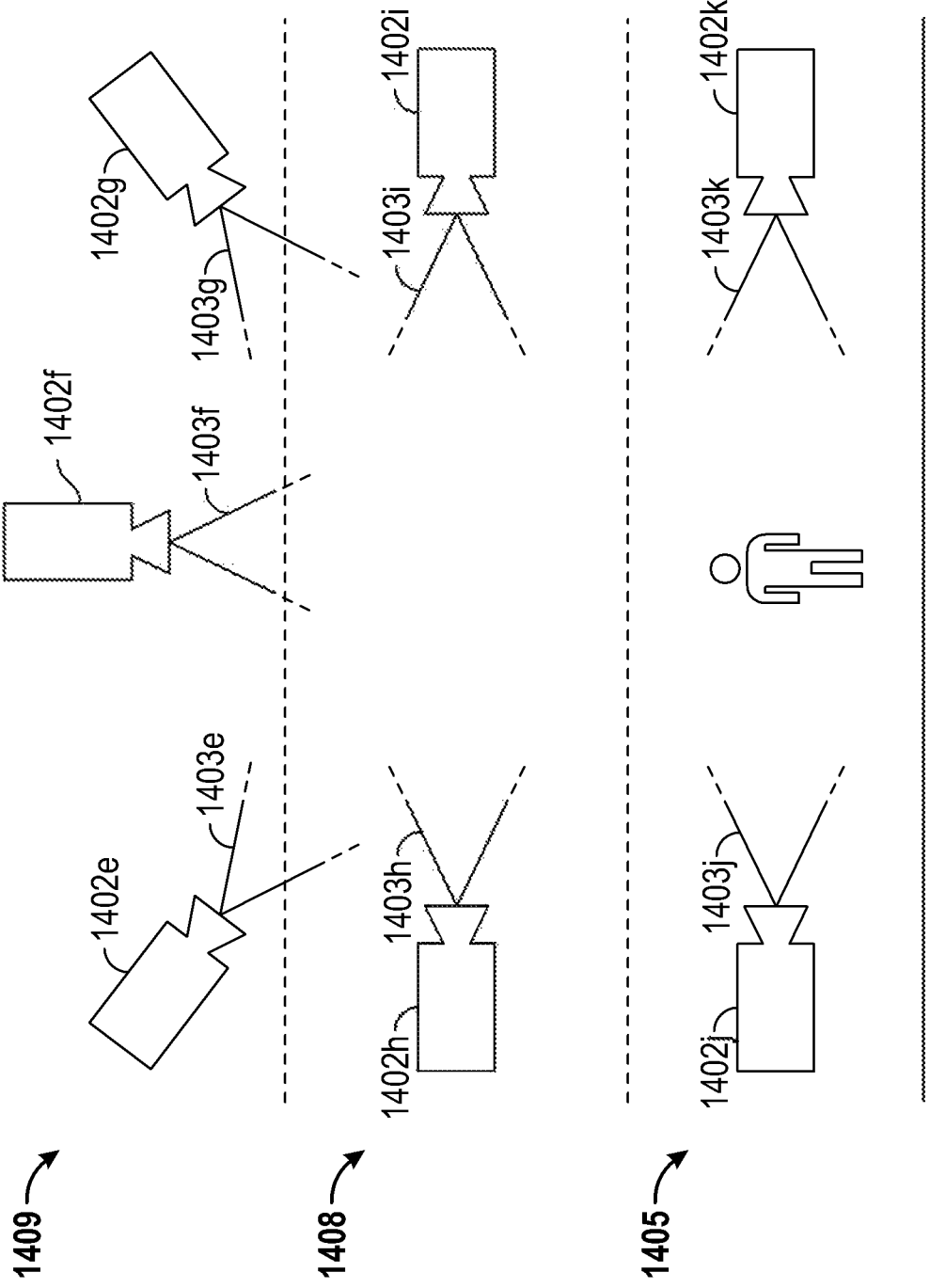

FIG. 14A illustrates a top plan view and FIG. 14B illustrates a side elevational view of a multi-imaging device system 1400. The multi-imaging device system 1400 can include two or three or more cameras 1402 that are physically separate from one another, and, in some embodiments, one or more of the cameras 1402 can be a stand-alone imaging device. For example, the cameras 1402 can include dense field imagers, video cameras, cell phone cameras, DSLR cameras, webcams, or any imaging device configured to capture digital image data. The cameras 1402 can be different from one another and can have different imaging properties, such as, for example and without limitation, resolution, acquisition rate, aperture, focus, sensitivity, color gamut, and the like. The cameras 1402 can be positioned at spaced apart locations and oriented so that a primary optical axis 1403 of each camera is generally directed toward an object of interest or a common viewing theater. Data from the multi-imaging device system 1400 can be transmitted to a processing station where image data is combined. The combined image data can be light field data, dense field data, video data, image data, pixel data, mathematical representations of image data (e.g., representations using fractals or vectors), or any combination of these. The combined image data can be used to generate two dimensional or three dimensional images, in still images or motion. An example of such a processing station is described herein with reference to FIG. 1. In some embodiments, simultaneously captured video from one or more of the cameras 1402 in the system 1400 is combined to create a spatial and/or temporal resolution independent output. For example, each of the cameras 1402 can be configured to acquire video data at an acquisition resolution at an acquisition frame rate where the acquisition resolution and/or frame rate can be different for each camera 1402. The acquired video data can be combined to generate dense field data that can be used to generate high-resolution (e.g., 2 k, 4 k, or higher), high-frame rate (e.g., 30 fps, 60 fps, 120 fps, 240 fps, or higher) video output where the resolution and/or frame rate of the video output exceeds the acquisition resolution and/or frame rate of any individual camera 1402. For some applications, non-simultaneous data is combined to create at least a portion of the output video stream.

As discussed, the optical axes 1403 of the cameras 1402 can be directed towards the common viewing theater. For instance, in certain embodiments, the field of view 1404 of each of the cameras 1402 at least partially overlaps with the field of view 1404 of each of the other cameras 1402. In some configurations, the optical axes 1403 of each of the cameras 1402 intersect at the same point, or substantially the same point, in the viewing theater.

In some embodiments, the cameras 1402 transmit wireless data to one or more receivers, which route data to a processing station. Cameras 1402 can be positioned to surround the viewing theater, and may be attached to support poles, buildings, trees, or other suitable existing or supplied support structure. In certain implementations, at least three, and in some applications at least 10, or at least 50 or more cameras 1402 are provided in the multi-imaging device system 1400 for imaging a viewing theater.

Due to the disparate arrangement of the cameras 1402 about the viewing theater, the cameras 1402 can image the viewing theater from generally any vantage point. In some cases, each of the cameras 1402 is spaced from each of the other cameras 1402 by at least 1, 10, 100 or 1000 feet. According to some arrangements, the viewing theater can be delineated into halves (e.g., with respect to a top plan perspective and/or side elevational perspective), and at least one camera 1402 in the array is positioned in a different half of the viewing theater than at least one other camera 1402 in the array. Or, the viewing theater may delineated into four equally sized segments (e.g., from a top plan perspective and/or side elevational perspective), and at least one camera 1402 in the array is positioned in each of the four segments. In yet further cases, at least one first camera 1402*a* is at least partially facing at least one other camera 1402*c*, such that the other camera 1402*c* at least partly resides in the field of view 1404*a* of the first camera 1402*a*. Depending on the orientation of the cameras 1402, the first camera 1402*a* can also at least partly reside in the field of view 1404*c* of the other camera 1402*c*.

The cameras 1402 can be positioned about the perimeter of the viewing theater or, in some cases, one or more of the cameras 1402 are also positioned within the viewing theater. Moreover, the cameras 1402 can be arranged in some cases in an irregular manner about the viewing theater. In such cases, the system 1400 can use a depth map to adjust for positional variations between the cameras 1402 and the viewing theater or portions thereof. This capability gives camera operators flexibility in placing the cameras 1402 with respect to the viewing theater. This can be particularly beneficial in environments where options for camera placement are constrained, such as where it is desirable to hide the cameras. In other cases, the cameras 1402 or a subset of thereof are arranged in a regular manner with respect to one another, e.g., within the same plane, on a common hemispherical profile, symmetrically, etc.

As shown in FIG. 14B, the cameras 2 can also be positioned in different vertical positions with respect to the viewing theater. For instance, the cameras 1402 may be divided into a first plurality, within a first vertical zone 1405 (e.g., within about 5 or 10 vertical feet) of the local ground level. A second plurality of cameras 1402 may be positioned within a second zone 1408 (e.g., from about 5 or 10 feet of the ground and about 20 or 30 feet of the ground) vertically above the first vertical zone 1405, and a third plurality of cameras may be positioned in a third zone 1409, vertically above the second zone 1408. The vertical separation of cameras may or may not be desired depending upon the nature of the activity under surveillance in the viewing theater.

The orientation of one or more of the cameras 1402 is adjustable according to further aspects. For instance, the cameras 1402 can be outfitted or mounted on a motor-driven tripod or other apparatus that allows for user controlled or automated tilt, pan and/or zoom control. In one implementation, such as where the cameras 1402 are in continuous or substantially continuous communication with the processing station, the processing station can maintain up-to-date orientation information for each of the cameras 1402. In some embodiments, the processing station pings the cameras 1402 periodically for status info, or the cameras 1402 periodically broadcast current orientation. According to one method, cameras 1402 report orientation information upon "wake-up" from a power-down or reduced power mode.

All cameras 1402 in the multi-imaging device 1400 may be stationary. Alternatively, a first plurality of cameras 1402 may be stationary and at least one or a second plurality of cameras 1402 may be moving or attached to a structure which is capable of moving (e.g., a vehicle, robot, personnel, drone or other aircraft, satellite). All cameras 1402 may be carried by a person or support which is moving or capable of moving.

Data from the cameras 1402 can be combined to generate dense field data, light field data, combined image data, or any combination of these or other image representations, as described herein. In some embodiments, combining the data from the cameras 1402 can include determining correspondences between two or more images of approximately the same optical target. Determining the correspondences can include registering the images and can be intensity-based (e.g., comparing intensity patterns in a first image to intensity patterns in a second image) and/or feature-based (e.g., finding features in one image and seeing if the layout of a subset of features is similar to that in a second image). One or more reference points may be identified or introduced into the theater to facilitate correspondence determination. For example, one or more transmitters can be positioned within the theater, for transmitting a signal that can be recorded by the camera and recognized as a correspondence reference. The transmitted signal can be optical, RF and, in some environments, acoustical. Active continuous or intermittent transmitters may be desirable in some applications. Alternatively, passive references (e.g., RFID or other system which responds to interrogation from the camera) may be used. Optical signals may include a continuous or intermittent optical transmitter positioned within the theater (UV, visible or infra red) or an optical signal (e.g., laser) transmitted from one or more cameras into the theater.

In general, where image data from multiple cameras 1402 is combined to create motion video or still images, any of the techniques described herein (or other techniques) for stitching together or otherwise combining the image data can be used. While in some cases, image data from all of the cameras 1402 is combined together, data from a selected subset of the cameras 1402 in the array can also be used. And, the current selected subset of cameras 1402 can adjust dynamically depending on the desired effect. For instance, image data from a first subset of cameras 1402 may be combined to create 2D or 3D image data from a first perspective, for a first period of time, and then, for a second period of time, the system combines image data from a second subset of cameras 1402, achieving a different viewing theater perspective, and so on. As one example, referring to FIG. 14A, the system 1400 may combine image data from the cameras 1402a, 1402b to create video image data from a first perspective and then transition to combining image data from the cameras 1402b, 1402c. The next transition could be to any combination of cameras (e.g., back to the cameras 1402a, 1402b, to the cameras 1402c, 1402d, to the cameras 1402a, 1402b, 1402c, to all the cameras, etc.). Transitioning to a subset of cameras 1402 having at least one camera in common with the current subset is preferable in some cases, as it can provide continuity of perspective. However, in some cases, the next subset does not include any cameras 1402 in common with the current subset.

The mechanism for adjusting the current subset of cameras can vary. For instance, a user interface (e.g., touch screen, joystick, voice command, etc.) can provide operators with real-time control of the desired viewing perspective. In other cases, the system automatically tracks certain image scene objects. As one example, where a person or other object of interest is moving through the image scene, the system 1400 can dynamically adjust the subset of cameras (or otherwise process the combined image data) to provide an obstruction-free view of the person or object.

Moreover, in certain cases, to conserve bandwidth or power, such as in live playback applications, image data for only the selected subset of cameras 1402 is transmitted for processing. Unselected cameras 1402, in some cases, enter a power-saving mode in which they consume less power than the selected subset of cameras 1402.

According to certain aspects, the multi-imaging device system 1400 can also provide multi-vantage point audio capture capability for the viewing theater. For instance, each camera 1402 may be provided with or be coupled to a microphone or other audio input device. In such cases, captured audio information associated with each camera 1402 may be transmitted for processing, along with the image data, for example. Instead of or in addition to providing microphones that are integrated with the cameras 1402, separate microphones can be positioned throughout the viewing theater, or otherwise be situated to record sound information from the viewing theater.

Similar to the image data, audio information from the cameras 1402 can be selectively combined. For instance, the system may automatically utilize image data captured from one or more cameras in a currently selected subset. In other cases, a user may be able to select the audio source(s). In some cases, a user may select audio data from a single camera 1402 or other audio source closest to a particular object or event of interest, while the selected image data is from a combination of multiple cameras 1402. Depending on the circumstances, a particular camera 1402 may be used as an audio source even though it is not currently being utilized in the recorded video file (or for playback).

The multi-camera images from the viewing theater can also be combined to adjust the dynamic range of the output video stream (e.g., by tone mapping or other appropriate mechanisms), or to otherwise control exposure. For instance, lighting conditions may be different for different cameras in array. In one case, highlight detail from one or more cameras 1402 (e.g., with a higher exposure setting or positioned in relatively brighter light conditions) is combined with shadow details from one or more other cameras 1402 (e.g., with a lower exposure setting or positioned in relatively low light conditions). In some cases, lighting conditions for unselected cameras 1402 may be more favorable than lighting conditions for cameras 1402 in the currently selected bank. In these and other circumstances, exposure information from one or more cameras 1402 that are not in the currently selected bank can be used to adjust exposure levels in the output stream. Additional compatible high dynamic range techniques are discussed below and are described in U.S. Patent Application Publication No. 2012/0044381 entitled "HIGH DYNAMIC RANGE VIDEO", which is incorporated by reference herein in its entirety and is included in the attached Appendix.

One or more cameras 1402 in the multi-imaging device system 1400 may be cell phone cameras, smart phone cameras, cameras on tablets, hand-held cameras, or the like. The system 1400 can be configured to receive image data acquired using one or more of these disparate cameras and combine the information to produce video and/or still images from virtual viewpoints or having other characteristics, as described herein. Thus, the multi-imaging device system 1400 can be a dynamic system, with a changing number of cameras 1402 that make up the system 1400. In such embodiments, the image processing system can be part of a website or other publicly- or privately accessible resource that receives image data from users to generate output data. The input data can be used to generate video and/or still images that incorporate information from one or more of the cameras 1402 to produce high-quality viewpoints of an object of interest. For example, multiple people may capture image data of a newsworthy event, yet the images may be partially occluded, acquired from a disadvantageous viewpoint, shaky, low-resolution, blurry, or the like. By combining the acquired image data from multiple viewpoints using multiple cameras 1402, images and/or video may be generated that provide an advantageous, high-quality view of the event of interest. In some embodiments, the acquired image data can be combined and the combined data can be made available for others to use to generate output images and/or video. Software tools can be provided which allow users to generate images and video using the output data which can be light field data and/or dense field data, for example.

One or more cameras 1402 in the multi-imaging device system 1400 may be carried by one or more geosynchronous satellites, which have the advantage of remaining permanently in the same area of the sky, as viewed from a particular location on Earth. This allows permanent surveillance of a desired theater. Thus the multi-imaging device system 1400 can include a geosynchronous component or a geosynchronous network as a portion of the system 1400.

At present, the GeoEye-1 satellite may be the highest resolution commercial imaging system and is able to collect images with a ground resolution of 0.41 meters (16 inches) in the panchromatic or black and white mode. Spatial resolution is defined as the pixel size of an image representing the size of the surface area (i.e. m2) being measured on the ground, determined by the sensors' instantaneous field of view (IFOV). While the satellite is able to collect imagery at 0.41 meters, GeoEye's operating license from the U.S. Government requires re-sampling the imagery to 0.5 meters for all customers not explicitly granted a waiver by the U.S. Government.

The ground based component of the present multi-imaging device system 1400 can add significant depth of data to current Geospatial Intelligence systems. Frequently referred to as GEOINT, Geospatial Intelligence is an intelligence discipline comprising the exploitation and analysis of geospatial data and information to describe, assess, and visually depict physical features (both natural and constructed) and geographically referenced activities on the Earth. Geospatial Intelligence data sources include imagery and mapping data, whether collected by commercial satellite, government satellite, aircraft (such as Unmanned Aerial Vehicles [UAV] or reconnaissance aircraft), or by other means, such as maps and commercial databases, census information, GPS waypoints, utility schematics, or any discrete data that have locations on earth. Integration of data from the optical network described herein can help GEOINT evolve from traditional compilations of geospatial information and imagery, towards an emphasis on knowledge.

Depending upon the needs of a particular theater, cameras 1402 can be hard-wired or in wireless communication with the data processing station. A variety of wireless technologies can be used, as described herein. In some embodiments, the cameras 1402 implement a wireless link capable of transmitting relatively high resolution image data, such as a dual 2.970 Gigabit HD-SDI wireless link that operates in the 60 GHz frequency band. Data processing can occur locally, or towns or continents away. Cameras 1402 can be powered by ground power, battery power, solar power or otherwise depending upon a particular assignment.

Figure 14C:
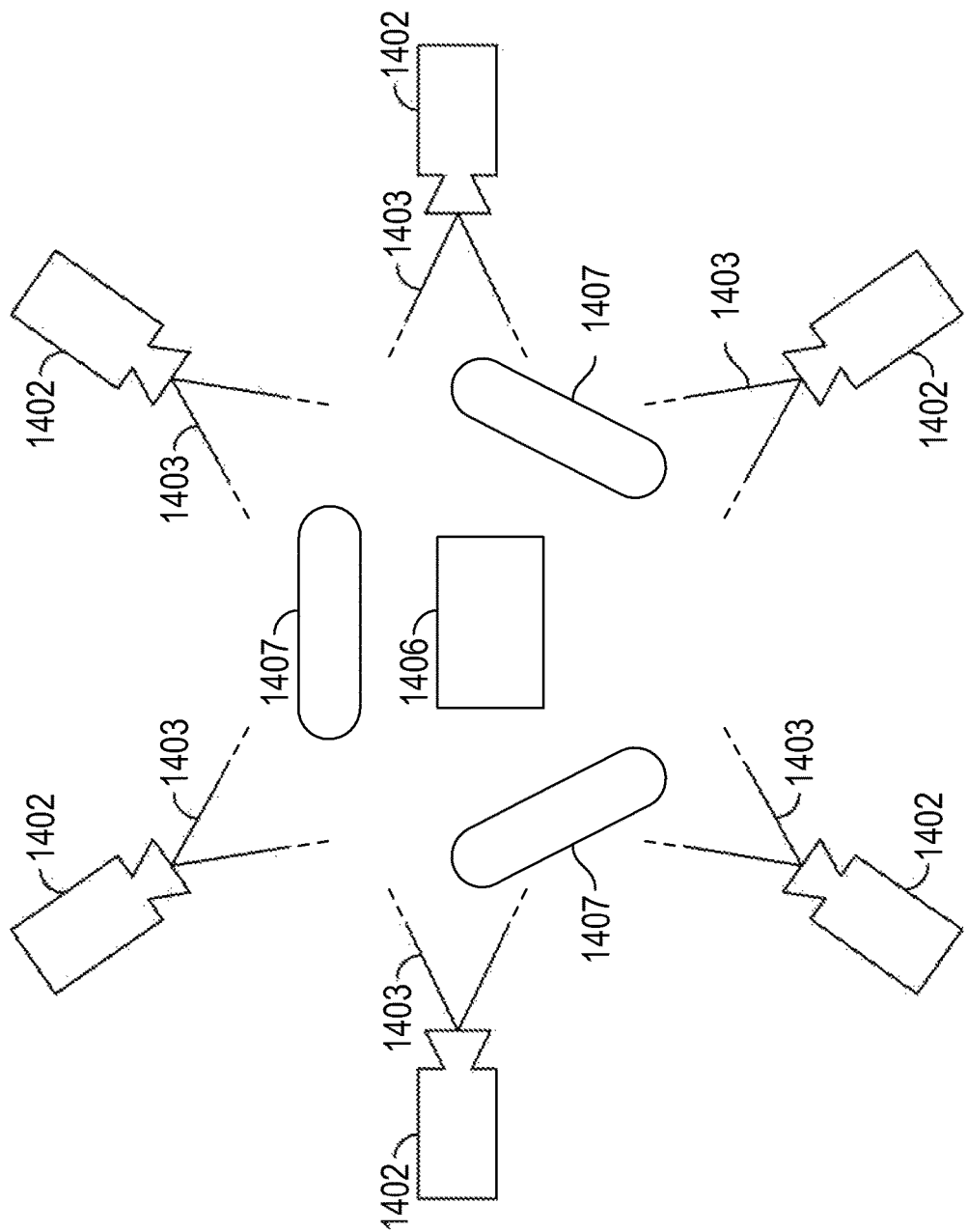
FIG. 14C illustrates a top plan view of an array of cameras recording an object or other portion of interest in a viewing theater.

As discussed, image data from the cameras 1402 can be combined to provide improved video or still images of select image scene regions. FIG. 14C illustrates a top plan view of an array of cameras 1402 recording an object 1406 or other portion of interest in a viewing theater. As shown, one or more obstructing objects 1407 occlude the field of view 1404 of the cameras 1402. The processing station can stitch together or otherwise combine the image data from a plurality (e.g., 2, 3, 4, 5 or all) of the cameras 1402 in the array to reduce or remove the occlusions in the combined video output. While the field of view 1404 of each camera 1402 shown in FIG. 14C is at least partially occluded, in some cases, some of the cameras 1402 have un-obstructed fields of view 1404.

Example Image Processing System

Figure 15:
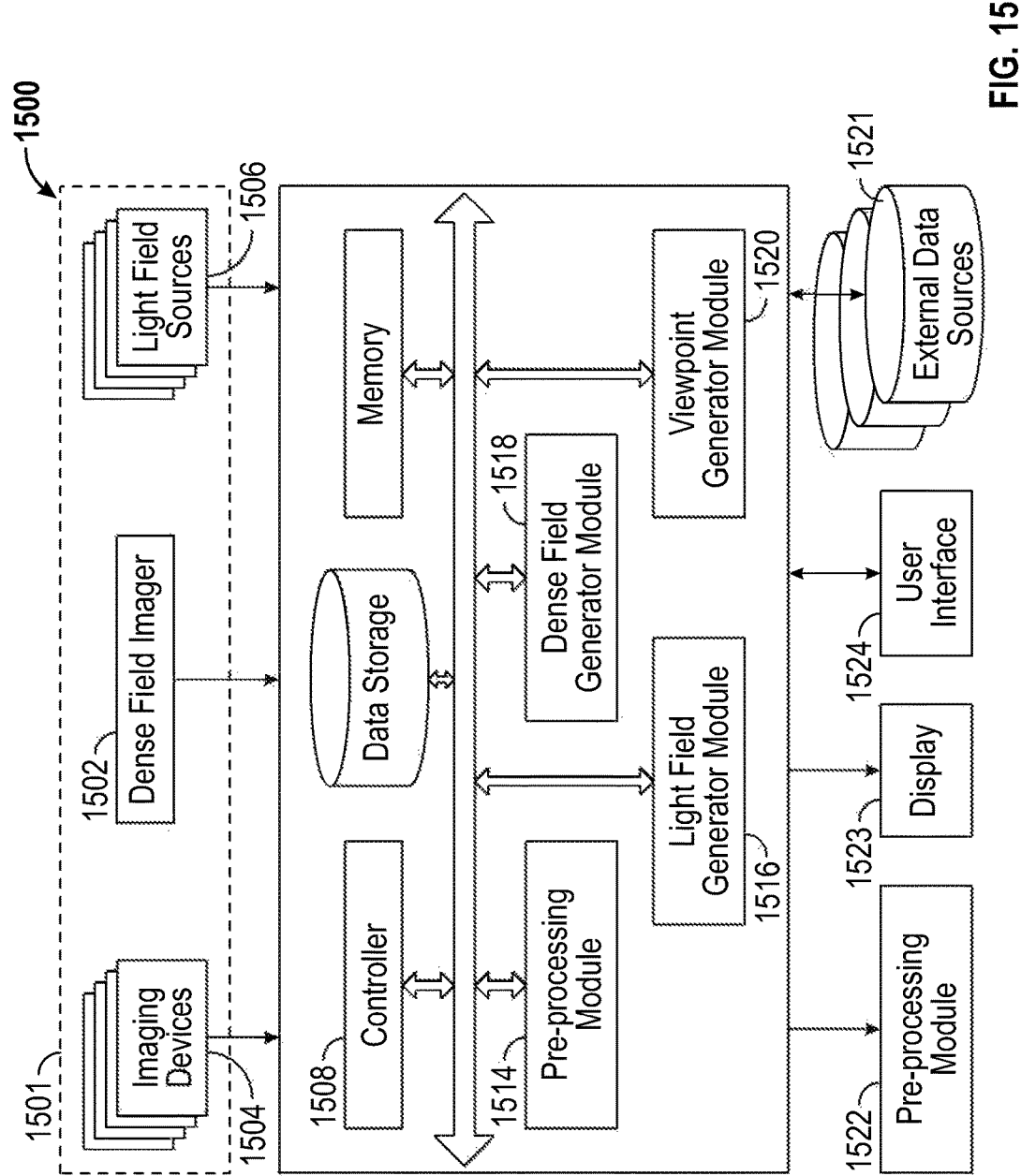
FIG. 15 illustrates a block diagram of an example image processing system for receiving data from a plurality of sources of different types and generating light field data, dense field data, and/or viewpoints from received data.

FIG. 15 illustrates a block diagram of an example image processing system 1500 for receiving data from a plurality of sources of different types and generating light field data, dense field data, and/or viewpoints from received data. The image processing system 1500 can receive image data from image data sources 1501 which can include, for example, a dense field imager 1502, a plurality of imaging devices 1504, a plurality of light field data sources 1506, or any combination of these. The image processing system 1500 includes a controller 1508, memory 1510, data storage 1512, a pre-processing module 1514, a light field generator module 1516, a dense field generator module 1518, and a viewpoint generator module 1520. The various components of the image processing system 1500 can be configured to communicate with one another and/or with external systems through communication bus 1507.

The image data sources 1501 can provide image data to the image processing system 1500. The image data provided to the image processing system 1500 can include pixel data from a plurality of image sensors, light field representations, dense field representations, metadata, calibration information, and other information associated with the images that allow the image processing system to generate light field data, dense field data, viewpoints, and the like. The image data sources 1501 can include a dense field imager 1502, examples of which are described herein with reference to FIGS. 1, 5A, 5B, and 8-13. The image data sources 1501 can include a plurality of imaging devices 1504, as described herein with reference to FIGS. 14A-C. The image data sources 1501 can include a plurality of light field data sources 1506, which can include, for example and without limitation, imaging devices which provide light field data (e.g., plenoptic cameras, light-field cameras, etc.), stored light field data (e.g., computing devices with stored light field data, external storage with light field data, etc.), dense field imagers that output a plurality of light field representations, or any combination of these.

The image processing system 1500, in some embodiments, is configured to receive, store, and/or output raw image data. In other embodiments, the image data is not raw. In some cases, the image processing system 1500 stores data received directly from the plurality of sensors, without substantial modification, substantial processing, or without modification or processing, prior to recording and/or output.

The various modules 1514, 1516, 1518, and 1520 of the image processing system 1500 may execute on the controller 1508 residing in the image processing system 1500 and/or may include custom circuitry. One or more modules may process data that is stored in memory 1510 and/or data storage 1512, or one or more modules may process data as it comes from the image data sources 1501 which can then be stored in memory 1510 and/or data storage 1512.

The image processing system 1500 includes the controller 1508. The controller 1508 can include one or more processors and can be used by any of the components of the image processing system 1500, such as the pre-processing module 1514, the light field generator module 1516, the dense field generator module 1518, the viewpoint generator module 1520, to process information. As used herein, the term "processor" refers broadly to any suitable device, logical block, module, circuit, or combination of elements for executing instructions. The controller 1508 can be any conventional general purpose single- or multi-chip microprocessor such as a Pentium® processor, a MIPS® processor, a Power PC® processor, AMD® processor, ARM® processor, or an ALPHA® processor. In addition, the controller 1508 can be any conventional special purpose microprocessor such as a digital signal processor. The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor, such as controller 1508, can be a conventional microprocessor, but the controller 1508 can also be any conventional processor, controller, microcontroller, or state machine. Controller 1508 can also be implemented as a combination of computing devices, e.g., a combination of a FPGA and a microprocessor, a plurality of microprocessors, one or more microprocessors in conjunction with a DSP core, or any other such configuration.

The image processing system 1500 includes memory 1510. The memory 1510 can be coupled to the other components of the image processing system 1500, such as the controller 1508, data storage 1512, the pre-processing module 1514, the light field generator module 1516, the dense field generator module 1518, and the viewpoint generator 1520. Memory 1510 can refer to electronic circuitry and/or devices that allow information, typically processing instructions and/or data, to be stored for retrieval for use by the image processing system 1500 in a relatively quick manner. Memory 1510 can refer to Random Access Memory (RAM) or various forms of Read Only Memory (ROM), which are directly connected to the one or more processors of the image processing system 1500. Other types of memory can include bubble memory and core memory.

The image processing system 1500 includes data storage 1512. Data storage 1512 can be coupled to the other components of the image processing system 1500, such as the controller 1508, memory 1510, the pre-processing module 1514, the light field generator module 1516, the dense field generator module 1518, and the viewpoint generator 1520. Data storage 1512 can refer to electronic circuitry that allows information, typically computer data, to be stored and retrieved. Data storage 1512 includes computer-readable memory devices and can be in the form of any type of computer-readable medium, such as, for example and without limitation, hard drives, solid-state drives, flash memory, optical discs, or any other type of memory device. In some embodiments, the size of the data storage 1512 can be sufficiently large to store light field data, dense field data, image data, and the like from the various modules 1514, 1516, 1518, and 1520. Data storage 1512 can refer to external devices or systems or internal devices or components which are directly connected to the one or more processors of the image processing system 1500.

In some embodiments, the data storage 1512 can be mounted on an exterior of a camera body (e.g., a dense field imager) or be inserted into a slot or other receptacle in the camera body. Further, in some embodiments, the data storage 1512 can be connected to the other components of the image processing system 1500 through standard or custom communication ports, including, for example, but without limitation, Ethernet, USB, USB2, USB3, IEEE 1394 (including but not limited to FireWire 400, FireWire 800, FireWire S3200, FireWire S800T, i.LINK, DV), SATA and SCSI. Further, in some embodiments, the data storage 1512 can comprise a plurality of hard drives, such as those operating under a RAID protocol. However, any type of storage device can be used.

Data can be stored in data storage 1512 using any variety of data storage methods including, without limitation, data stored in databases, as individual files, as a plurality of data files with configuration (e.g., XML files), in a table, index, map, or other data structure including metadata associated with the image data. For instance, data storage 1512 can include raw image data from the dense field imager 1502 where the raw image data includes pixel data for imaging elements on a plurality of facets. As another example, data storage 1512 can include light field representations from the dense field imager 1502 where each light field representation is provided by a facet in the dense field imager 1502. As another example, data storage 1512 can include a dense field representation resulting from combining light field data and/or raw image data. In yet another example, data storage 1512 can include calibration information for the dense field imager 1502 that provides depth and alignment information for pixels associated with imaging elements on facets. Data storage 1512 can include information that associates particular sets of image data with particular imaging devices from the plurality of imaging devices 1504. Data storage 1512 can include image device alignment information that can be used in generating light field data. In some cases, data storage 1512 further includes exposure balancing information to balance exposure levels between the imaging devices 1504. Data storage 1512 can also include distortion correction information, calibration information, pixel correspondence information, and the like.

In some embodiments, data storage 1512 includes an image data set comprising a tensor derived from a first light field data set representing a first portion of a light field, a second light field data set representing a second portion of a light field, and information relating to a spatial relationship between the first and second portions of the light field. The first and second portions of the light field can be received directly from an imaging device (e.g., a dense field imager, a light-field camera, etc.), the light field data sets can be stored in data storage 1512, or the light field data sets can be received from external data sources 1521. The light field data sets can be functions of spatial coordinates, direction, wavelength, and/or time, and in some embodiments, the light field data sets can be represented using at least four dimensions. The light field data can be derived from pixel data acquired by imaging elements in a dense field imager. An array of imaging elements can make up a facet, and the pixel data acquired by the array of imaging elements of a facet can be combined into light field data. Accordingly, the first light field data can be derived from pixel data of a first facet and the second light field data can be derived from pixel data of a second facet. The first and second facets can be coplanar or non-coplanar and they can have fields of view that substantially overlap or that are substantially adjacent, with a portion of their fields of view overlapping.

The image processing system 1500 includes the pre-processing module 1514 which is configured to receive data from the image data sources 1501 and prepare the data for conversion into light field data, dense field data, viewpoint images, or any combination of these. The pre-processing module 1514 can use one or more computer processors to prepare the data. Preparing the data can include, for example, calibrating the received data based on calibration data associated with the device that acquired the data. Calibration can include associating spatial and/or directional coordinates with pixels in the device acquiring the data. Using this correspondence map, the pre-processing module 1514 can align corresponding portions of acquired images for later combination and/or conversion to light field representations or dense field representations, as described herein. The pre-processing module 1514 can adjust received data based on properties of the sensors acquiring the data, such as, for example, correcting for dynamic range differences, different sensitivities, different sizes, different resolutions, and the like. In some embodiments, the pre-processing module 1514 receives raw image data from a plurality of imaging elements and/or imaging devices and creates separate images from the raw image data. In some embodiments, the separate images are aligned based at least in part on calibration data and/or registration of overlapping images. In some embodiments, the aligned images are compared to a predicted model and deviations from the model are assessed to identify outlier pixels and/or deviations from the model. Based at least in part on these differences, the alignment parameters can be adjusted to improve alignment of pixel data among imaging elements and/or imaging devices.

In some embodiments, the pre-processing module 1514 is configured to combine pixel blocks from image sensors in an array of image sensors to extract improved color information. For image sensor arranged in a Bayer pattern such that a block of pixels are used to generate a single output color (e.g., a 2×2 pixel pattern with a red pixel and a green pixel on top and a green pixel and a blue pixel on bottom), the blocks of pixels from multiple sensors can be combined to provide greater color data based at least in part on angular differences between a source and the pixel block capturing the incident light from the source. Because light color corresponds to a frequency of light and different frequencies of light behave differently through optical components when measured from different angles, an increase of color information can be extracted when comparing pixel blocks on different sensors because they see the object of interest from a different angle. This can improve processes such as edge detection and can reduce or eliminate halos from sharp transitions in a real world image that happens to split a pixel block. This can also lead to better output images, as they may be perceived as more realistic. Thus, by comparing color differences between pixel blocks that view an object from different angles, more accurate color information can be extracted.

The image processing system 1500 includes the light field generator module 1516 which is configured to receive pixel data from a plurality of imaging elements and to derive a light field representation based at least in part on the received pixel data. Facets that include an array of imaging elements can be used to acquire data that is converted into a light field representation. The imaging elements can be coplanar and their optical axes can be primarily aligned along a direction. The light field generator module 1516 can receive this data from the facets of a dense field imager (or after pre-processing with the pre-processing module 1514), for example, and generate a light field representation by determining a radiance of the light in the scene as a function of position and direction. In some embodiments, the light field representation includes time information. In some embodiments, the spatial and directional components of the light field representation are expressed using four dimensions, five dimensions, or more than five dimensions. The light field generator module 1516 can be configured to receive image data from a plurality of imaging devices 1504 and derive at least one light field representation using the received image data. The light field generator module 1516 can also use calibration information, alignment information, and the like to generate a light field representation. The light field generator module 1516 can be configured to receive image data from a variety of image sources and to generate one or more light field representations from the received image data.

The image processing system 1500 includes the dense field generator module 1518 which is configured to receive a plurality of light field representations and to combine them into a dense field representation. The dense field generator module 1518 can use one or more processors to derive an image data set comprising a plurality of light field representations and a tensor describing spatial relationships between the plurality of light field representations. In some embodiments, the derived image data set is represented using five dimensions for the light field (e.g., three spatial dimensions and two directional dimensions) with an additional one, two, three, four, or more than four dimensions for the tensor describing the spatial relationships. In some embodiments, the dense field generator 1518 is configured to receive a plurality of light field representations, each representation expressed in five dimensions, and to derive the spatial relationship tensor on combined light field representations. For example, two light field representations having five dimensions each can be combined into a representation having 10 dimensions. In some embodiments, the spatial relationship tensor can be determined using a representation with less than 5 dimensions, greater than 5 dimensions, greater than 10 dimensions, greater than 20 dimensions, greater than 40 dimensions, greater than 60 dimensions, greater than 80 dimensions, greater than 120 dimensions, greater than 200 dimensions, or greater than 500 dimensions. The dense field generator module 1518 can determine the spatial relationship tensor on the 10-dimensional representation.

Once the spatial relationship tensor is determined, the dimensionality of the combined light field representations can be reduced back down to five or fewer dimensions. The light field representation resulting from the process can be a representation that uses non-Euclidean geometry, or that is in a coordinate system that is not flat, but is curved or has non-planar or non-flat dimensions. The resulting spatial relationship tensor can include one dimension, two dimensions, three dimensions, or more than three dimensions. The resulting spatial relationship tensor can describe mappings or transformations of light field representations from the non-Euclidean geometry or the geometry of the combined light field representation into a Euclidean geometry or a traditional geometry, allowing the viewpoint generator module 1520 to extract viewable images from the combined light field representation. Thus, the 10-dimensional combined light field representation can be reduced to fewer dimensions when represented as a dense field representation.

This process can be implemented on more than two light field representations. This process can be used to combine light field data while maintaining the dimensionality of the light field representations, which can mean that combining a plurality of light field representations results in an intermediate light field representation having a number of dimensions that is equal to the sum of the dimensions of the input light field representations. For example, if four 5-D light field representations were combined, the intermediate light field representation would have 20 dimensions. Combining the input light field representations using this process can be accomplished wherein, during the combining process, a maximum total number of dimensions used is less than 5 dimensions, greater than or equal to 5 dimensions, greater than or equal to 8 dimensions, greater than or equal to 10 dimensions, greater than or equal to 20 dimensions, greater than or equal to 40 dimensions, greater than or equal to 60 dimensions, or greater than or equal to 80 dimensions. The process can be used to derive a data set that reduces the number of dimensions of the intermediate representation to one that has the same dimensionality as any of the input light field representations. In addition to the combined light field representation, the spatial relationship tensor can have an additional one, two, three, or more than three dimensions for the spatial relationship tensor. As a result, a plurality of multi-dimensional light field representations can be combined to form a dense field representation having the same dimensionality as the input light field representations with one or more additional dimensions to describe the spatial relationships of the input light field representations.

The image processing system 1500 includes the viewpoint generator module 1520 which is configured to produce images and/or video using received image data, light field representations, and/or dense field representations. The viewpoint generator module 1520 can extract viewable images and/or video from a dense field representation using the spatial relationship tensor and the associated light field data. The spatial relationship tensor can be used to define extraction parameters so that a viewable image can be extracted from the combined light field representations. In a traditional light field representation, a 2D image can be extracted from the representation by effectively intersecting a plane at a desired location to determine radiance at each point on the plane, thus producing an image. Based at least in part on the non-Euclidean and/or non-linear nature of the combined light field representations, this process differs from the traditional process as the required geometry of intersection is not necessarily a plane. The spatial relationship tensor is used to define the correct operation to perform on the combined light field representation to extract the radiance at the desired points. The spatial relationship tensor can be used to extract 2D images, 3D images, stereoscopic images, images from multiple viewpoints, video, holograms, and the like from the combined light field representations. Described in another way, the dense field representation includes combined light field representations along with a spatial relationship tensor which can be used by the viewpoint generator module 1520 to extract viewable images. Thus, the image data set generated by the dense field generator module 1518 contains the radiance information for points within the scene as well as the parameters used to extract viewable images from the image data set. In some embodiments, the viewpoint generator module 1520 can generate images using super-resolution techniques, thereby generating an output image with an increased resolution over any of the input images. In some embodiments, the viewpoint generator module 1520 can generate viewpoints that effectively see around and/or through occlusions by combining data from multiple viewpoints. In some embodiments, the viewpoint generator module 1520 can generate stereoscopic images and can vary an inter-ocular distance. The viewpoint generator module 1520 can be configured to change a point of view or a viewing angle of an output image, change a depth of field, change a focus depth, and to increase a dynamic range of an output image compared to individual images received from the image data sources 1501.

The image processing system 1500 as described can provide very powerful creative flexibility after image acquisition (e.g., in post-processing). Thus, a post-processing system 1522 can be configured to receive image data, light field data, and/or dense field data from the image processing system 1500. In some embodiments, the post-processing system 1522 is separate from the image processing system 1500, and in some embodiments, the post-processing system 1522 is a part of the image processing system 1500. The creative flexibility provided by the post-processing system 1522 is based at least in part on the ability to manipulate light field data and/or dense field data to accomplish a number of post-processing tasks including, for example and without limitation, re-focusing, changing a depth of focus, relighting based on depth, changing a viewpoint, changing an inter-ocular distance for stereoscopic images, and the like. As one example, the user can re-focus in generally any desired manner using the post-processing system 1522. It can therefore be useful to provide some context regarding the intent of the cinematographer with regard to focus and other parameters when they shot the video. In this regard, metadata associated with a video file can be used to store certain cinematographic settings defined by the cinematographer or other camera operator during the shoot (e.g., focus region or quality, depth-of-field, 3D convergence, inter-ocular distance, white balance, etc.). The metadata can then be used by the post-processing system 1522 to access the user-defined settings. For instance, when the file is opened for playback, the post-processing system 1522 or other playback component may open the file according to the stored metadata, with the initial focus quality or depth-of-field defined by the cinematographer, for example. The metadata can be stored in data storage 1512, for example. The post-processing system 1522 can be configured to allow dynamic editing of a video, reducing a need for detailed plans for capturing the video. For example, the post-processing module can change a focus, zoom in or out, change a viewing angle, and the like to mimic similar effects traditionally performed by camera operators. Thus, the post-processing system 1522, using the dense field data, can change a focus of the creative process from acquiring the video in a particular way to editing the acquired video to achieve a desired effect. In some embodiments, the post-processing system 1522 can be provided as a tool to a community of users. Raw dense field data can then be provided to the community which could allow users to generate new and unique videos based off the originally acquired video. For example, a movie can be shot and a particular version of the movie can be generated for viewing by the general public. The raw data for the movie could be provided to the community of users to allow them to modify aspects of the movie to generate a personalized version of scenes from the movie. A different character can be followed through a scene, a focus of the scene can change, a viewing angle can change, or any combination of these to alter the users' experience. In some embodiments, the post-processing system 1522 can allow for dynamic focusing and tracking of objects within a scene. For example, at sports event in a stadium, the ball and the players can be tracked dynamically so that each can be the focus of the output video stream. This can allow for dynamically changing the focus depending on circumstances to, for example, show what a critical player was doing at a particular point during the event. In some embodiments, the post-processing system 1522 can enable a user to generate viewpoints from a large number of virtual cameras. This can reduce or eliminate the importance of placement of actual cameras and/or the importance of camera operators.

The image processing system 1500 may also be configured to compress image data for storage in data storage 1512. For instance, image data corresponding to each imaging device in the array 1502 may be compressed separately, and the compressed image data may be associated with the corresponding imaging device in data storage 1512. Image data compression and associated techniques are discussed in further detail below. In certain embodiments, the dense field imager 1502 stores "compressed raw" image data.

The image processing system 1500 can include a laptop, workstation, or other appropriate computing device configured to execute the various modules 1514, 1516, 1518, and 1520, which can include software modules or programs. The image processing system 1500 is in communication with the image data sources 1501 through any suitable connection (e.g., via Ethernet, USB, Wi-Fi, Bluetooth, WiGig, or some other appropriate connection).

The post-processing system 1522 can ingest image data and metadata from the image processing system 1500. The post-processing system 1522 can then use the metadata to make creative adjustments to a variety of cinematographic parameters. Such parameters can include focus point or focus quality, depth of field, inter-ocular distance, 3D convergence, and the like. Adjustment of particular aspects will be discussed in greater detail below. The image processing system 1500 and/or the post-processing system 1522 may additionally provide a graphical user interface 1524 on a display 1523 coupled to the image processing system 1500, for example.

Because the image data includes image data from a plurality of imaging elements and/or facets in the dense field imager 1502, or from each imaging device in the array 1504, or from a plurality of light field sources 1506 or external data sources 1521, as well as corresponding metadata, video files can include a tremendous amount of image data. Thus, the image processing system 1500 and/or the post-processing system 1522 can additionally compress the received image data and/or metadata. In some cases, the image data and/or metadata is compressed according to a compression ratio of from between about 2:1 and about 30:1. In certain embodiments, the image data and/or metadata is compressed according to a compression ratio of from between about 2.5:1 and about 10:1. In one embodiment, the compression ratio is about 3:1. In other cases, the compression ratio can be at least about 2:1, at least about 4:1, at least about 8:1, at least about 16:1, at least about 20:1, at least about 25:1, or at least about 30:1.

In other embodiments, the image processing system 1500 can be configured to perform post-processing tasks. In some embodiments, the dense field imager 1502 can be configured to perform any or all of the functions described with respect to the image processing system 1500 and/or the post-processing system 1522.

As described above, in certain embodiments, the imaging devices 1504 are separate from one another. The array of separate imaging devices 1504 can be oriented to capture a viewing theater, as described herein with reference to FIGS. 14A-C. The image processing system 1500 can be configured to process data from the imaging devices 1504. Each of the imaging devices 1504 may be a single-lens/single-sensor camera, or can have multiple lenses and/or sensors. For instance, each of the imaging devices 1504 could be one of the integrated multi-array imaging devices described herein. In any case, the imaging devices 1504 can include memory and an image processing module similar to the corresponding components described with respect to the dense field imager 1502 having the integrated array of imaging elements arranged in facets, examples of which are shown in FIGS. 1A-B, 5A-B, and 8-13.

Image Acquisition

Figure 16:
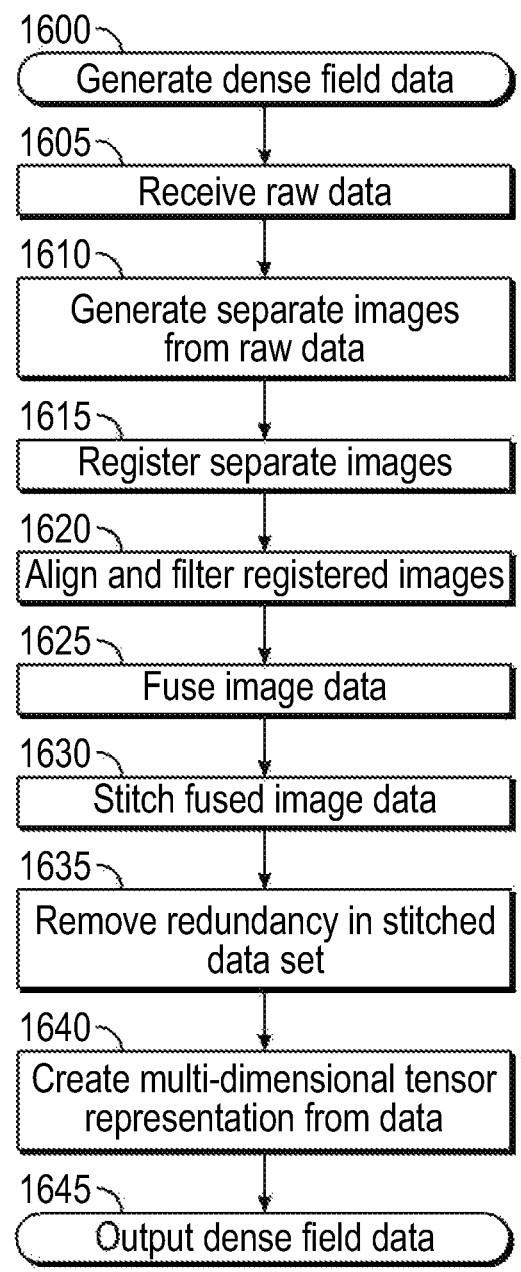
FIG. 16 illustrates a flow chart of an example method for acquiring image data with a dense field imager or an array of imaging devices having overlapping fields of view wherein a plurality of light field representations are generated using two or more imaging elements or imaging devices.

FIG. 16 illustrates a flow chart of an example method 1600 for acquiring image data with a dense field imager or an array of imaging devices having overlapping fields of view wherein a plurality of light field representations are generated using two or more coplanar imaging elements or imaging devices. Using the acquisition method 1600, viewable images are extractable wherein the spatial and/or temporal resolution of the extracted images and/or video is substantially independent of the spatial and/or temporal resolution of the input image data. Thus, using a plurality of imaging devices or imaging elements that acquire image data at individual acquisition resolutions and an acquisition frame rates, video data can be extracted that has a resolution that is greater than any of the acquisition resolutions and a frame rate that is greater than any of the acquisition frame rates. The method 1600 receives raw image data and generates dense field data through a process that includes pre-processing image data, combining image data, and generating spatial relationship information about the combined image data. For ease of description, the method 1600 will be described as being performed by an image acquisition system. However, any step or combination of steps in the method can be performed by the image processing system 1500 or a dense field imager. Furthermore, the image acquisition system, the image processing system 1500, and the dense field imager can perform any individual step or combination of steps in conjunction with the other steps being performed on other systems. Thus, the description that follows is not to be interpreted as limiting the performance of the acquisition method to a single system or to a system that is separate from the dense field imager or the image processing system.

In block 1605, the image acquisition system receives raw image data from a plurality of imaging elements and/or imaging devices. The raw image data can be received directly from the imaging elements, or it can be received from a camera or dense field imager. Receiving raw image data can include receiving an array of digitized values corresponding to quantities of light incident on a pixel of an image sensor. The raw image data can include digitized data corresponding to color bands. For example, raw image data can include an array of digital values arranged according to a known color pattern, e.g., a Bayer pattern. In some embodiments, monochromatic sensors can be used such that two, three, four, or more arrays of digitized values are received where each array corresponds to digitized values for a particular wavelength band. For example, a first array can correspond to a red sensor, a second array can correspond to a green sensor, a third array can correspond to a blue sensor, and a fourth array can correspond to a panchromatic or white sensor. The image acquisition system can combine color information for groups of pixels into a representative color at a location in the sensor. For example, to determine luminance, the image acquisition system can de-Bayer the raw image data. As another example, using monochromatic sensors can allow the image acquisition system to filter out crosstalk between color pixels, thus improving the luminance determination. The image acquisition system can apply any calibration information to the received raw data. For example, baseline values can be corrected for (e.g., "dark" current or noise), response characteristics can be corrected for (e.g., differing sensitivities), and the like.

In block 1610, the image acquisition system generates separate images from the received raw data. The image acquisition system can group calibrated raw image data into 2D bitmaps. When the raw data is provided by a dense field imager as described herein, the separate images from imaging elements on a particular facet will be substantially similar as they are pointed in generally the same direction and cover a similar portion of the scene being imaged. Separate images from other facets may be substantially similar (e.g., where the facets are coplanar), they may substantially overlap with images from adjacent facet (e.g., where the optical axes of the facets converge), or they may be substantially adjacent with images from adjacent facet (e.g., where the optical axes of the facets diverge).

In block 1615, the image acquisition system registers the separate images. Registering the separate images can be important for later mapping pixel data to real world coordinates. One of the goals of registering the separate images, especially for images from the same facet, is to determine relationships between pixels in the facet. When the image acquisition system registers the images, it can create a matrix of correspondence vectors. The correspondence vectors can be mappings from one pixel to corresponding pixels in other sensors on the facet. For example, for a first pixel on a first image sensor within a facet, a correspondence vector can be created that maps the first pixel to a corresponding pixel on the other sensors on the facet. The correspondence vectors can be created for pixels that acquire image data that is also acquired in other sensors. Thus, for "edge" pixels, or pixels that acquire image data that is not acquired by other sensors, there are no correspondence vectors. The correspondence vectors can be represented as a magnitude and an angle that maps a first pixel to a location of a corresponding pixel. For instance, for a facet with N imaging elements, each pixel in a sensor can have about N−1 correspondence vectors associated therewith, corresponding to vectors from the pixel's position to a position of a corresponding pixel in another imaging element in the facet. Registration can be performed using intensity-based and/or feature-based techniques.

In block 1620, the image acquisition system compares the registered images to predicted results and aligns the registered images. Comparing the registered images to predicted results can include modeling behavior of the imaging element, such as the optics, and filtering out expected signal from noise. This procedure can improve registration as it improves signals which in turn can improve registration based at least in part on being able to more closely match real values of pixels when performing intensity-based registration, for example. In some embodiments, the optics on the facets or other imaging devices makes them epipolar. To account for this, the image acquisition system can determine a curvature associated with the system and identify deviations from the expected for each pixel. Outlier pixels can be removed from the image data. The output of this step is a conformed set of correspondence vectors, where the conformation vectors represent corrections to the correspondence vectors based on models.

The image acquisition system can align the registered images to assign weights to angular data associated with light field representations. Based at least in part on the registered images, pixel data can be associated with real world coordinates. By combining the separate images and comparing the real world coordinates, angular luminance information can be extracted for positions within the imaged scene. By comparing the luminance of different pixels, weights can be assigned to the conformed correspondence vectors according to warping, where the angle corresponds to the inverse of the warping. In some embodiments, it may be advantageous to de-Bayer on a pixel by pixel basis as four times the angular information is available by treating each filtered pixel as a separate pixel value rather than combining all filtered pixels within a block to determine a luminance. From the weighted conformed correspondence vectors, five dimensional light field data can be generated. In some embodiments, the five dimensions can be reduced to four dimensions through a choice of parameterization, as described herein.

In block 1625, the image acquisition system fuses the registered and aligned images. Fusing the registered and aligned images can include combining light field data on a facet-by-facet basis. The image acquisition system can take the light field data for a given facet along with the weighted conformed correspondence vectors to generate a five-dimensional tensor field. The five-dimensional tensor field includes information about all the light field representations generated for each facet. In some embodiments, data can be combined in an additive manner where light field data is aligned. In some embodiments, data is averaged over position and/or direction to fuse the light field data. In some embodiments, the image acquisition system can generate a single multi-dimensional data structure representing the image data for all the tiles in the dense field imager. The number of dimensions can correspond to the dimensionality of the input light field representations. For example, if five dimensions are used for the light field representations generated in block 1620, then the fused tensor will have five dimensions as well as it is a combination of the light field representations of the facets.

In block 1630, the image acquisition system stitches the fused images. Stitching can include projecting the fused tensor into a universal imaging space where the universal imaging space can be a space where all light field rays are parallel. The image acquisition system can then determine corresponding patches from one facet to adjacent facets. The image acquisition can then blend the patches to generate a single light field representation across the universal imaging space. The image acquisition system can extract depth information and flow field information from the fused tensor to enable stitching of the light field representations from adjacent facets.

In block 1635, the image acquisition system removes redundant data from the combined image data. After fusing and stitching the light field representations, the image acquisition system can identify and remove light rays that provide redundant information. As an example, after fusion and stitching, the combined light field representation can include millions of rays that provide substantially similar information. The image acquisition system can sample these rays to reduce the number of rays such that sufficient information is maintained to extract viewable images at targeted or desired resolutions and quality. The image acquisition system can be configured to determine which rays deliver substantially the same information and to collapse these rays into a single light ray. In some embodiments, this process can remove one or more dimensions from the combined light field representation.

In block 1640, the image acquisition system projects the combined image data into a multi-dimensional tensor representation. The image acquisition system can reduce the dimensionality of the combined light field representation by projecting it into a space having a target or desired number of dimensions. For example, the combined light field representation can be projected into a geometry or space where five dimensions are used to represent the light field data. As a result of this projection, an additional spatial relationship tensor is created which maps the resulting multi-dimensional light field representation from a first geometry which can be non-Euclidean, non-linear, curved, or otherwise irregular, into a Euclidean or linear geometry. The spatial relationship tensor can be one dimension, two dimensions, three dimensions, four dimensions, or more than four dimensions. The spatial relationship tensor can be used to extract viewable images from the multi-dimensional light field representation. A dense field data set or dense field representation can comprise the combination of the multi-dimensional light field representation with the spatial relationship tensor. Thus, dense field data can be a multi-dimensional tensor representation. This multi-dimensional tensor representation can then be stored on any suitable computer-readable memory device block 1645, as described elsewhere herein.

Calibration

Figure 17:
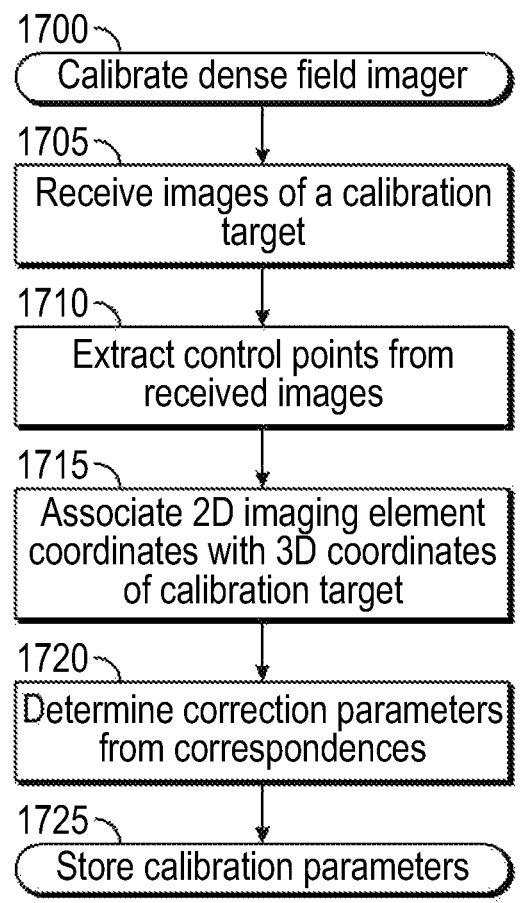
FIG. 17 illustrates a flow chart of an example calibration method for determining corrective factors for imaging elements on a dense field imager or an array of imaging devices.

FIG. 17 illustrates a flow chart of an example calibration method 1700 for determining corrective factors for imaging elements on a dense field imager or an array of imaging devices. The method generally uses a images of a well-known object to determine correspondences between pixels of different imaging elements or imaging devices. To extract position and direction information when generating light field data and/or dense field data, calibration information determine using the method 1700 can be used to correlate 2D pixel coordinates to 3D image scene coordinates. The calibration method 1700 can be used to derive calibration information for pixels within an imaging element and/or within an imaging device, which calibration information can be used during image processing to generate quality light field representations and dense field representations. For ease of description, the method 1700 will be described as being performed by a calibration system. The calibration system can be a part of a dense field imager, an array of imaging devices, an image processing system, a module on a computing device, or it can be distributed across a plurality of these and other systems and/or devices. One or more steps in this method can be performed by any one or any combination of elements or modules in the devices and systems described herein.

Figure 18A:
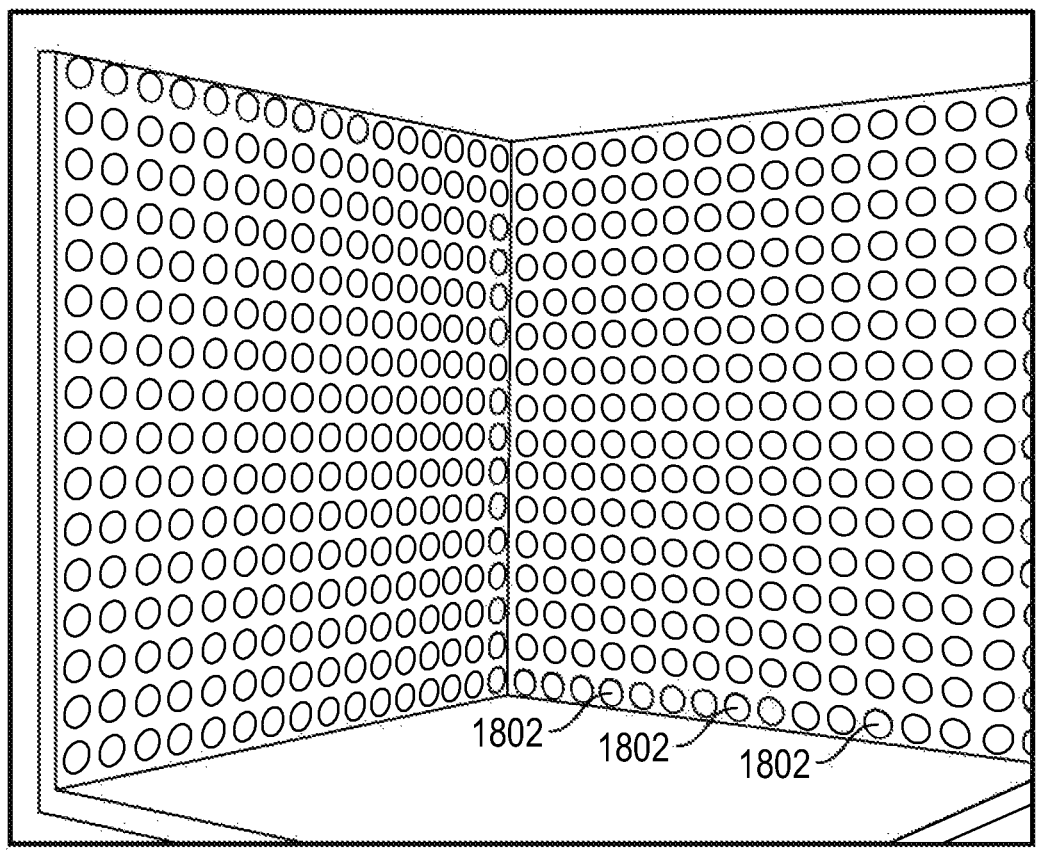
FIG. 18A illustrates an example object that can be used to in the calibration method illustrated in FIG. 17.

In block 1705, the calibration receives images of a well-known object in space acquired with a dense field imager. It is to be understood, that although much of the description is presented as being performed with images acquired with the dense field imager, any array of imaging elements and/or imaging devices may be used. The well-known object in space can be a calibration target. An example calibration target 1800 is illustrated in FIG. 18A. The example calibration target 1800 is an internal corner of a cube with a plurality of circular control points 1802 placed at known locations on the calibration target 1800. The calibration target 1800 can be any suitable target that provides a plurality of control points at known locations. Some calibration targets can include an interior of a sphere, ellipsoid, or polyhedron, or control points placed at known locations without conforming to a regular shape. In some embodiments, the control points can be placed randomly if the locations are known or can be determined. Images of the calibration target 1800 can be acquired with the dense field imager, wherein the images include a plurality of images taken with the imaging elements of the dense field imager. In some embodiments, all of the imaging elements acquire images of the calibration target 1800. In some embodiments, less than all of the imaging elements acquire images of the calibration target 1800 and methods are used to interpolate calibration constants for imaging elements that did not acquire an image of the calibration target 1800.

In block 1710, the calibration system extracts circular control points 1802 from the received images. The calibration system can use sub-pixel image processing to extract this information. In some embodiments, the control points 1802 are visually distinguishable from the calibration target by being a different color, a different brightness, having a different texture or pattern, or a different spectral signature when an image is acquired. The calibration system can be configured to identify the control points based at least in part on the different characteristics of the control points 1802 on the calibration target 1800. In some embodiments, the calibration system begins with a predicted location for the calibration targets 1802 and iteratively corrects the predicted location until it finds an actual location of a control point 1802. The difference between the predicted location and the actual location within the image can then be used, at least in part, to derive calibration information. In some embodiments, the calibration system is configured to extract position information for the control points 1802 based at least in part on the properties of the control points 1802. For example, the control points 1802 can include a bar code, QR code, or other visual indication that can be extracted by an image processing system where the visual indication provides either absolute or relative position information. Extracting control points 1802 can include identifying pixels that include information about a control point and creating a table or other data structure that maps pixels to control points.

In block 1715, the calibration system associates a resulting set of 2D coordinates for each imaging element with a corresponding set of 3D coordinates derived from the physical dimensions of the calibration target. The calibration system can be configured to map a correspondence between a centroid of a control point to a centroid of the pixels that acquired image data of the control point. Based at least in part on the correspondences and the known locations of the pixels and control points, the calibration system generates a map between a pixel location and a corresponding location in 3D space in a scene being imaged.

In block 1720, the calibration system determines internal and external geometrical camera parameters from the set of 2D-to-3D correspondences. The internal geometrical camera parameters can include distortion coefficients for pixels within an imaging element and the external geometrical camera parameters can include relative orientation information for every imaging element in the dense field imager.

Figure 18B:
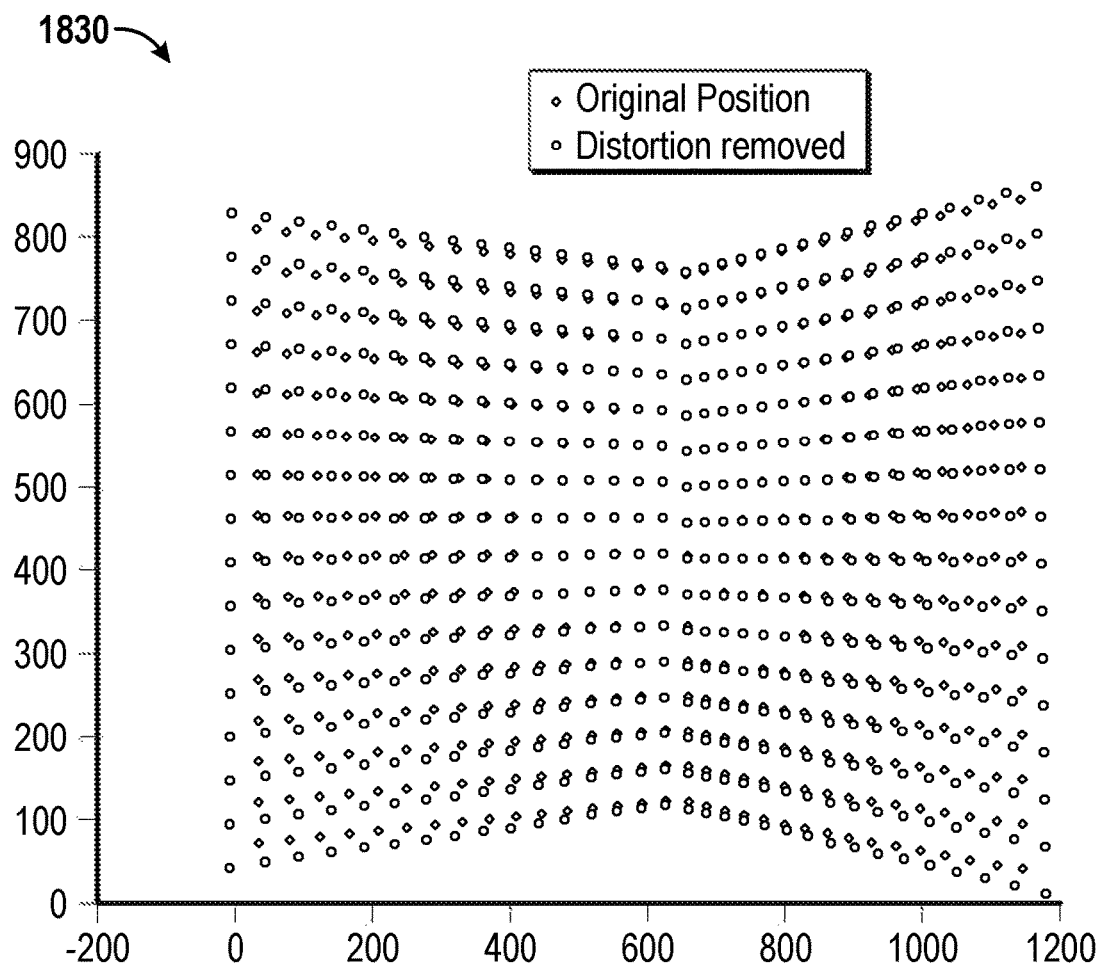
FIG. 18B illustrates an example plot showing results of corrected and non-corrected pixel data.

Due in part to the imaging elements acquiring images of the calibration target from a variety of angles, there is a distortion in the images of the calibration target 1800 that can be corrected using the correspondence maps. Using internal camera parameters determined using the method 1700 or other similar method, images can be geometrically corrected and undistorted. For example, FIG. 18B illustrates an example plot 1830 showing results of corrected and non-corrected pixel data. The original positions of the control points without distortion removed show misalignment artifacts introduced by optics and other effects. Near the center of the image, where the control points are relatively straight-ahead of the imaging elements, there is little difference between the determined control point positions with and without distortion corrections made. However, the control points at the edges of the images, the control points with the most extreme angles within the images, have distorted positions. By applying the internal camera parameter calibration values to remove distortions, the actual positions of the control points can be recovered, as is shown by the plot 1830.

Figure 18C:
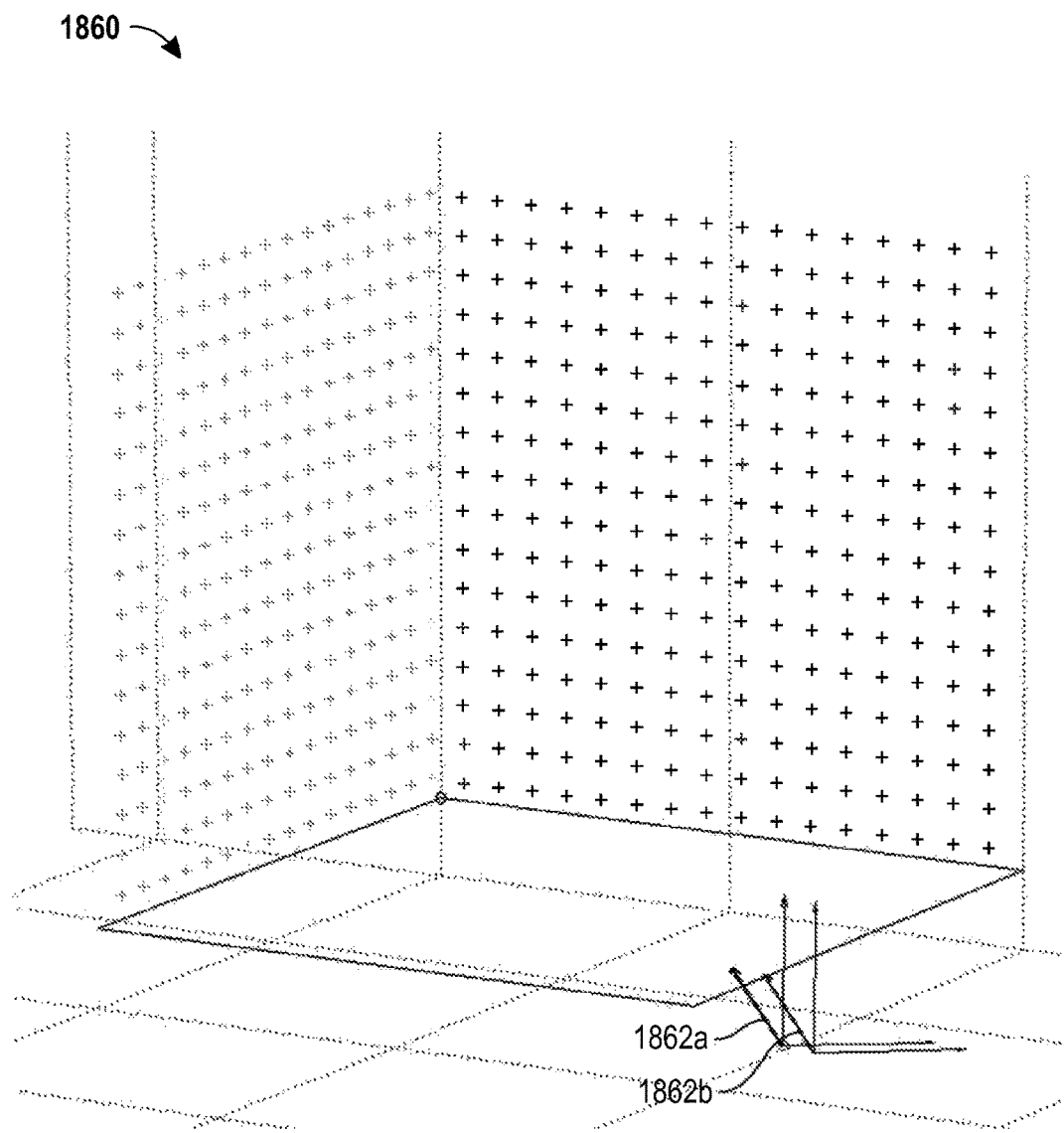
FIG. 18C illustrates an example plot of relative imaging element orientation.

Imaging elements can have optical axes that are not parallel with one another and the correspondences can be used to determine relative orientations of imaging elements. With the generated external camera parameters, the position for every imaging element in the array relative to the calibration target can be calculated. For example, FIG. 18C illustrates a plot 1860 of relative imaging element orientation determined from the external camera parameters. The relative orientation of two imaging elements is indicated by the axes labeled 1862*a* and 1862*b*. The relative orientation indicates the direction of the optical axes of the two imaging elements (the arrow pointing toward the calibration target) with additional axes defining the horizontal and vertical for the respective imaging elements.

Figure 18D:
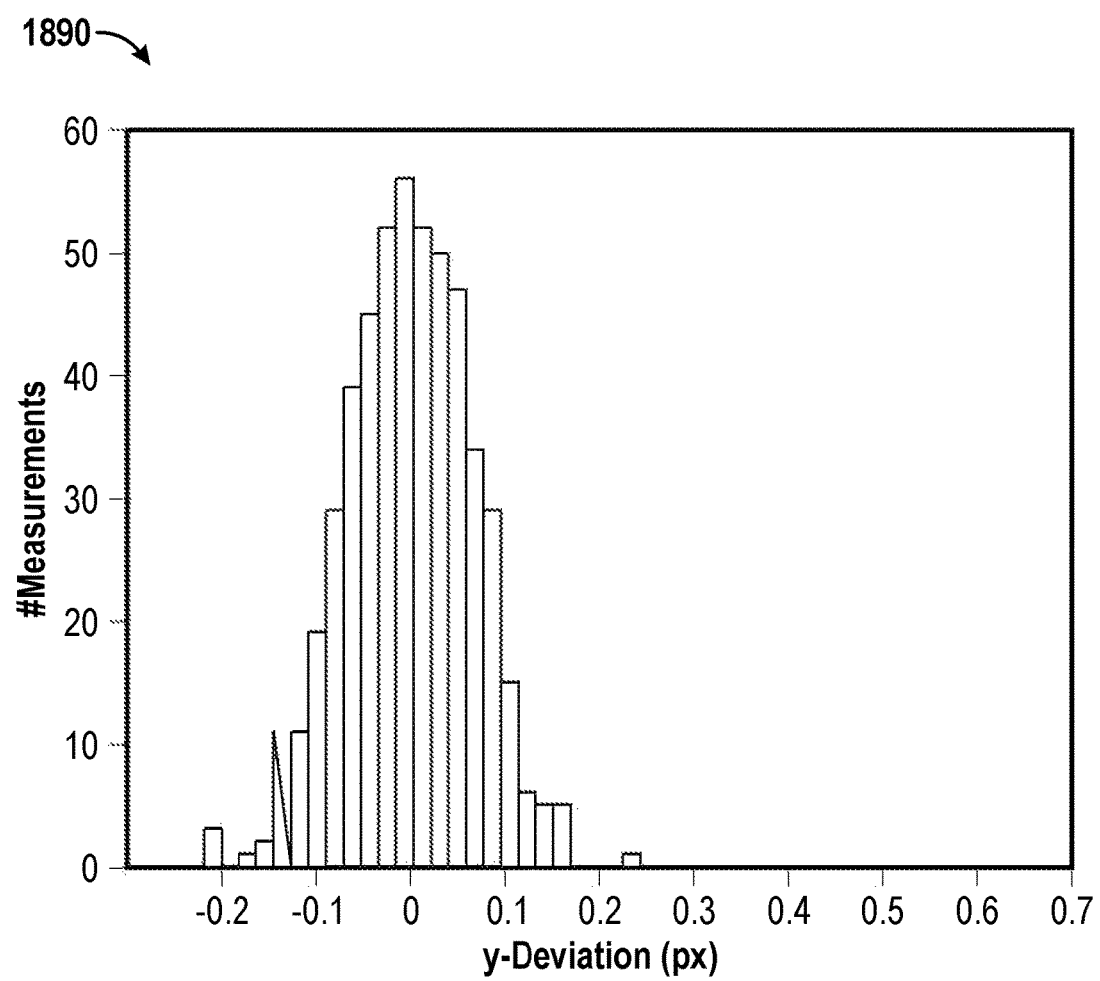
FIG. 18D illustrates a plot of a result of calibrating imaging elements on a dense field imager.

One measure for a quality of calibration is a vertical misalignment of corresponding control point locations in a set of two imaging elements after calibration corrections are applied. After applying the calibration method 1700 on a dense field imager, the plot 1890 illustrated in FIG. 18D is achieved. The plot 1890 demonstrates that the vertical misalignment, on average, is approximately zero with a spread in the distribution of less than about 0.1 pixels.

In block 1725, the calibration system can store the resulting calibration parameters in data storage, such as the data storage 1512 described with reference to FIG. 15. The calibration parameters can be retrieved and utilized by a dense field imager, an array of imaging devices, an image processing system, a computing device, or any combination of these to produce light field data, dense field data, image data, or the like.

Light Field Stitching

Figure 19:
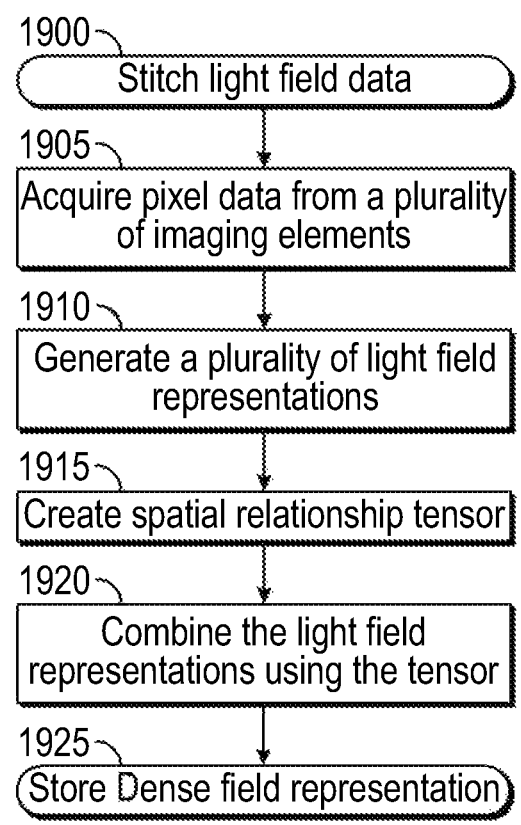
FIG. 19 illustrates a flow chart of an example method 1900 for stitching light field representations.

FIG. 19 illustrates a flow chart of an example method 1900 for stitching light field representations. Stitching light field representations can include combining light field representations from one or more light field data sources. The light field data sources can include stored light field data, an array of plenoptic or light-field cameras, an array of imaging devices, a dense field imager, or any combination of these. Stitching light field representations can be used to expand a field of view covered by light field data. For example, a first light field representation can cover a first field of view and a second light field representation can cover a second field of view, the second field of view overlapping with the first field of view. The method 1900 can be used to combine the first and second light field representations to produce a dense field representation that includes a combined light field representation and a spatial relationship tensor such that the combined field of view of the resulting dense field representation covers the first and second fields of view. For ease of description, the method 1900 will be described as being performed by the image processing system, but any suitable device or combination of devices or systems can be used to perform the method. For example, a dense field imager can be configured to stitch light field representations. Any one or any combination of the following steps of the method 1900 can be performed by one or more components of the image processing system, the dense field imager, a computing device, and the like.

In block 1905, the image processing system acquires pixel data from a plurality of imaging elements. In some embodiments, the pixel data can be acquired directly from the imaging elements on a facet of a dense field imager. In some embodiments, the pixel data is acquired and stored and then retrieved by the image processing system. The pixel data can include metadata or other configuration or calibration parameters that facilitate and/or improve processing of the pixel data. Alignment or registration information of the pixel data can be included that maps the 2D pixel data to 3D image scene data. In this way, pixel data can be mapped to spatial and directional coordinates which can facilitate further processing.

In block 1910, the image processing system generates a plurality of light field representations. Generating a plurality of light field representations can include grouping planar imaging elements to create a light field representation. In some embodiments, the planar imaging elements also have substantially parallel optical axes. The plurality of light field representations can be generated based at least in part on geometrical considerations. For example, a first light field representation can be generated using pixel data acquired from imaging elements aligned generally in a first plane and a second light field representation can be generated using pixel data acquired from imaging elements aligned generally in a second plane, the second plane non-coplanar with the first plane. In some embodiments, the plurality of light field representations are generated based at least in part on logical groupings. For example, a first set of imaging elements can be coupled to a first acquisition and/or processing electronics, such as in a facet of a dense field imager. A second set of imaging elements can be coupled to a second acquisition and/or processing electronics. The first set of imaging elements and the second set of imaging elements can be used to generate first and second light field representations, respectively. The first and second sets of imaging elements can be coplanar or the first set can be non-coplanar with the second set. In some embodiments, the fields of view of the generated light field representations overlap. Generating a light field representation can include using a plurality of images to define a data set that describes radiance as a function of position and direction. In some embodiments, the generated light field representations can be functions of time and/or wavelength. In some embodiments, the five dimensions representing space and direction can be reduced to four dimensions using a parameterized space, such as using a light slab, light spheres, a plane and angle, and the like.

In block 1915, the image processing system creates a spatial relationship tensor that defines spatial relationships among the light field representations. To combine light field representations, the image processing system can join the light field representations into a representation of a higher dimensional order to accommodate the dimensionality of each of the component light field representations. For example, if the image processing system were to join two 5D light field representations, the image processing system could create a 10D representation accommodating the two 5D representations. The image processing system can then process the combined light field representation to identify spatial relationships between the light field representations. As a result of this determination, a spatial relationship tensor can be created that effectively maps light field representations in relation to one another. The spatial relationship tensor can be used, for example, to generate viewpoints from a resulting combined light field representation. For example, for a single light field representation a 2D bitmap can be generated by bisecting the light field representation with a flat plane. The spatial relationship tensor for this scenario would be used to identify the flat plane to use to extract the desired image. Similarly, for combined light field representations, the geometry may not be flat or Euclidean and the spatial relationship tensor can be used to identify the correct "shape" (analogous to a plane to generate a 2D bitmap from a single light field representation) to use to bisect the combined light field data to extract a desired viewpoint.

In some embodiments, stitching light field representations comprises projecting light field representations into a universal imaging space where all rays are parallel. Light field data acquired with adjacent imaging devices or facets can then be joined by finding corresponding patches between the light representations and blending the light field representations at those corresponding patches. Finding the corresponding patches can, at least in part, provide information for determining the spatial relationship tensor as the correspondences are related to the spatial relationships between the light representations.

In block 1920, the image processing system uses the spatial relationship tensor to combine the light field representations to create a dense field representation. Once the spatial relationship tensor is determined, the combined light field representation can be projected into a reduced-dimension tensor, e.g., a 5D tensor. The combination of the 5D tensor representing the combined light field representations and the spatial relationship tensor can comprise the dense field representation. With this information, a viewpoint generator can generate viewpoints and a post-processing system or module can achieve light field-type effects. The light representations have been effectively joined to create a dense field representation over the combined field of view.

Figure 20A:
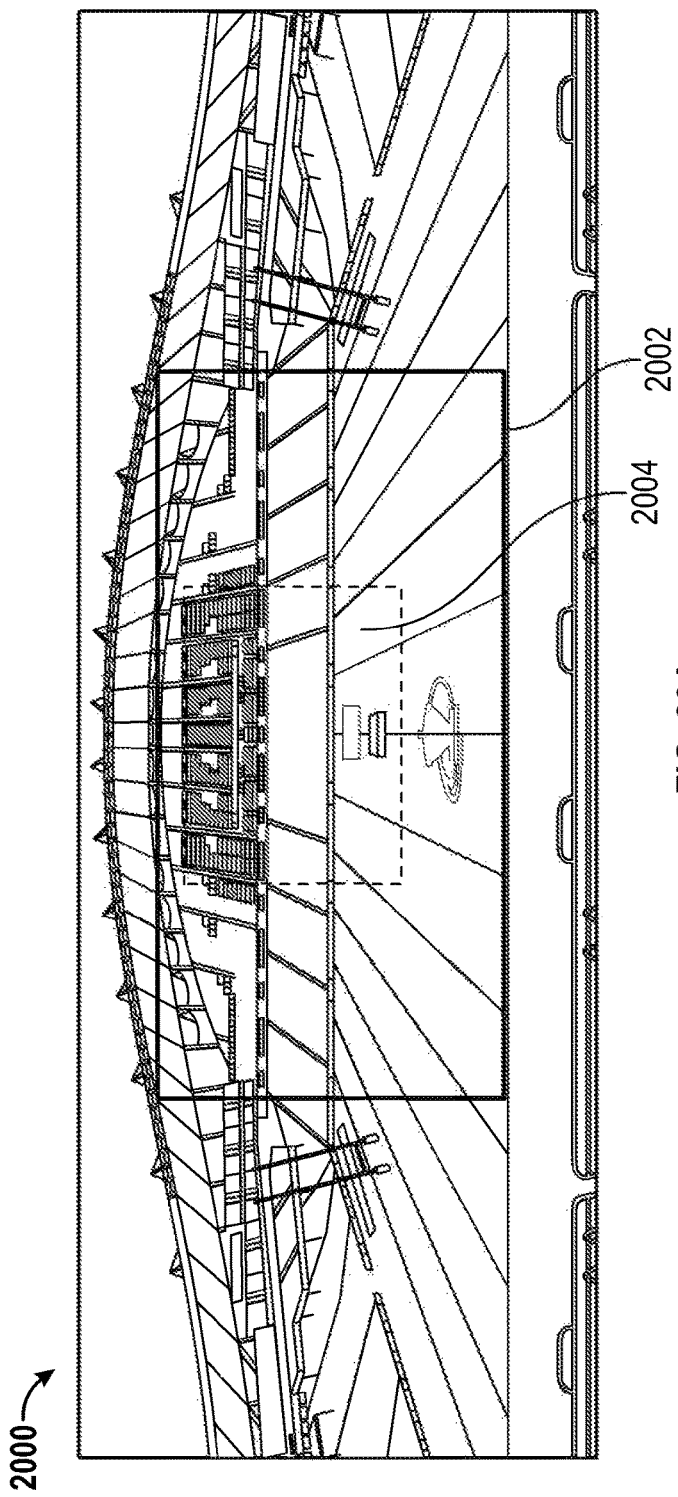
FIGS. 20A and 20B represent a scene to be captured by a plurality of devices configured to generate light field representations and a field of view of one of the plurality of devices.
Figure 20B:
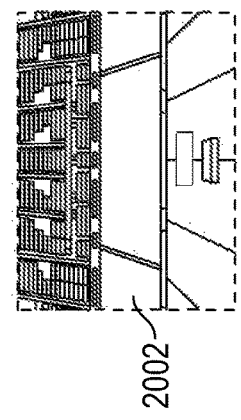

An example of where this method may be applied is shown in FIGS. 20A and 20B. FIG. 20A illustrates a scene to be imaged 2000. A region of interest 2002 is indicated with a rectangle and a field of view 2004 of a device providing light field data is indicated with a second, dashed rectangle. The field of view 2004 of the light field device is shown in FIG. 20B. To cover the region of interest 2002, then, a plurality of light field representations can be joined. The method 1900 can be used to join the light field representations by intersecting the light rays of the light field representations to be joined. Intersecting the light rays comprises matching vectors in 4 or more dimensions. By finding the intersection of the vectors, information can be determined that maps the light field representations into a single light field representation in a coherent geometry from which any cross section will result in a valid bitmap across the cumulative field of view. In some embodiments, the cross section is not a plane and is determined using the spatial relationship tensor.

In block 1925, the image processing system stores the dense field representation. In some embodiments, the dense field representation can be stored in data storage 1512 which is described with reference to FIG. 15. In some embodiments, the dense field representation can include the output combined light field representation, the spatial relationship tensor, the acquired pixel data, the generated light field representations, metadata, or any combination of these.

In some embodiments, combining the light field representations includes stitching together light field representations having substantially non-overlapping fields of view to create a dense field image set having a substantially wider field of view than the individual light field representations. The combined lateral field of view of the dense field image set can be greater than or equal to about 145 degrees in some embodiments.

In some embodiments, the method 1900 of stitching light field representations is independent of where imaging elements and/or imaging devices are positioned relative to one another. This can be accomplished by intersecting the light rays of the input light field representations as that process will remove dependence, at least in part, on sensor position. In some embodiments, relationships between any number of light field representations that share a sufficient field of view should be combinable into a single tensor lattice (e.g., a combined light field tensor in combination with a spatial relationship tensor) from which images can be created.

Depth Mapping and Focus and Depth of Field Control

A dense field imager and/or multiple imaging devices can be used to provide depth mapping. Close objects will shift more in position between imaging devices than objects that are far away. A depth map can be created using a determination of how much an object shifts between images. In one embodiment, some imaging devices are used to create a depth map, while other imaging devices are used to capture images with different focus settings. Depending on the embodiment, the depth mapping techniques described herein may be used with any of the systems described herein having an array of physically separate cameras (e.g., with respect to FIGS. 14A-C or FIG. 15) or, alternatively, to any of the camera systems having an integrated array of imaging elements (e.g., with respect to FIGS. 1A-B, 5A-B, and 8-13).

For example, some of the imaging devices could use different focal distances, and the depth map would provide information about which imaging devices would best represent an object in focus. As another example, some of the imaging devices could use different apertures and the depth map could be used to select the desired depth of field for different portions of the resulting image. In yet another embodiment, the depth map could be used to artificially create or adjust focus, bokeh and/or depth of field during post-processing.

Where the imaging devices have a relatively wide depth of field (e.g., at or near infinity), the native images captured from the imaging devices may be substantially in-focus, across the entire depth of the image scene. In such cases, the depth map can be used to create artificial bokeh, simulating out-of-focus quality in desired image regions. For instance, the depth map can be used to simulate a user-selected region of focus or depth-of-field by blurring image regions outside of the selected region of focus or depth of field.

In one embodiment, the user selects a focus region while shooting. The user may select a region of focus using the viewfinder touch screen, cursor, voice command, or other appropriate input mechanism, and the camera system stores this desired focus region in metadata associated with the video file. The system may also add bokeh to the image that is displayed on the viewfinder in response to the user selection.

As discussed, in post-processing, the focus or depth of field set by the cinematographer during shooting may be initially presented to the user. But, depending on the desired creative effect, and regardless of the cinematographer's settings, the user can adjust the focus or depth of field as desired, providing substantial creative flexibility.

The depth map can also be used to control the 3-D effect of an image. The depth map may be shown in substantially real time. Industries such as, for example, robotics, biometrics, security, surveillance and autonomous vehicles can advantageously utilize depth information.

The depth map can be created by the post-processing module. In another embodiment, the image processing module creates the depth map.

Moreover, while the transition from in-focus to blurry regions in traditional cameras may have a certain characteristic response depending on the aperture of the lens, the synthetic blurring effect achievable using the multi-imaging device cameras described herein can be tailored to achieve generally any desired blurring effect. For instance, the transition from in-focus to blurry regions, can be linear, logarithmic, exponential, step-function, or a combination thereof.

The multi-imaging device techniques can also be used to provide interactive focus and depth of field during playback. For instance, the user in some cases can select a first point of focus and/or depth of field to view an initial segment of a video clip, and then change the point of focus or depth of field as desired, during viewing. As one example, during instant replay of a catch in a football game, the video operator may be able to adjust the depth of field depending on the movement of the football or of the receiver. Where the imaging processing system on the camera generates the combined video image data on camera, the user may use the touch screen interface and/or controls on the camera to pause playback, modify the focus or depth of field, and then resume playback, as desired.

In these and other ways, certain embodiments described herein can capture full light field effect image data and/or provide similar advantages to light-field and plenoptic cameras, such as the ability to adjust focus and/or depth of field in post-processing.

Three Dimensional Video with an Imaging Device Array

Images taken from two different perspectives can be combined in a variety of ways to create an illusion of depth. In one example, glasses containing liquid crystal may block or pass light in synchronization with an alternating display of images, so that the left eye sees a different image than the right eye. In another example, glasses containing linearly polarized lenses or circularly polarized lenses may block or pass light corresponding to the polarized projection of two different images. Other examples that use glasses include, for example, Infitec (interference filter technology), Infi-color 3D, complementary color anaglyphs, ColorCode 3D, Chromadepth. Other examples, which do not require glasses, are referred to as autostereoscopy.

A stereoscopic image typically uses two or more pictures taken from different perspectives. For example, imaging devices 200*a* and 200*b* in FIG. 7A, or any different subset of one or more cameras 1402 in any of the FIGS. 14A-C, provide pictures from one pair of different perspectives. Imaging devices 200*a* and 200*c* provide pictures from another pair of different perspectives. The illusion of depth changes with the distance between the imaging devices, so different pairs of imaging devices provide different perceptions of depth. While the exemplary illustration in FIG. 7A provides three imaging devices, it is to be understood that multiple imaging devices could be used, providing the director with multiple perspective options.

The perceived depth of objects in an image is affected by the distance and/or relative angle between perspectives. Multiple images with varying distances between the images, or inter-ocular distance, can be acquired to provide options for post processing. Moreover, multiple images with varying angles (e.g., 3D convergence values) between the images, can be acquired to provide options for post processing. As mentioned above, an initial inter-ocular distance and/or 3D convergence values can be set by the cinematographer during the shoot, and the post-processing software can load this pre-set value as a default when the video file is loaded for playback or editing. The user can then adopt the default inter-ocular distance or adjust the distance in post as desired.

In some cases, a first set of at least one sensor is displaced from a second set of at least one sensor by a distance within the range of from about 1 inch to about 18 inches, often within the range of from about 1.5 inches to 6 inches within the same single hand held device, to capture stereoscopic or full light field effect image data. In other cases, separate cameras located at spaced apart locations in a viewing theater are used.

For cases where there is a need to accurately represent motion, it is preferred that the multiple images are captured at the same time.

High Resolution Video with an Imaging Device Array

As discussed, an image processing system can combine or stitch together the image data from the individual imaging devices. And as mentioned, with respect to FIG. 7A and FIGS. 19 and 20A, for example, the stitching can result in an effective resolution of the combined image that is significantly higher than the individual sensors.

Another technique that can be used to improve resolution involves generating multiple sequential image samples at slightly offset spatial positions and/or different incident angles. For example, a mechanically actuatable optical element can be positioned before an array of imaging devices, such as in the array of imaging elements illustrated in any of FIGS. 8-13.

The optical element can be configured to wobble or otherwise move to direct light rays onto the array at slightly different spatial positions and/or at incident angles. The optical element can include a transparent planar member, and can be formed of glass, plastic, or some other appropriate optically transmissive material. The optical element can include a refractive lens in some cases. In some embodiments, a mechanical actuator at each corner of the optical element can be included, although any appropriate mechanism can be used. Movement of the optical element can result in a corresponding angular variation in the light exiting the optical element. The effect of this variation is that, depending on the current position of the optical element, the light rays are directed towards slightly different portions of the array and at different angles of incidence.

In some embodiments, the optical element is actuated to direct the light rays in a repeating pattern, which can vary, depending on the embodiment. For instance, a square pattern can be used, in which the optical element directs the rays one or more pixels (or a fraction of a pixel) right, then down, then left, and then up return to the original position. Or the light rays can be moved in a circular pattern. The imaging devices can be configured to sample the image at different points along the pattern trajectory.

When the optical element is transitioned through the pattern rapidly, each individual pixel in the imaging devices captures a corresponding point in an image scene in relatively rapid succession, but at slightly offset spatial positions and differing incident angles. The resulting sequentially captured images can then be combined to create higher resolution image frames. For instance, the image processing system can combine the successively captured images to create high resolution video frames.

Because the samples are captured sequentially, there can be some amount of motion in the image scene that occurs between successive samples. This can result in blur in the combined image. In some embodiments, the camera includes a control that allows the user to adjusting the sampling rate to achieve a desired level of blur. In other cases, such as where any amount of blur is undesirable or where lower resolutions are acceptable, movement of the optical element can be disabled. For instance, the camera can include a button, switch, touch screen control or other appropriate mechanism to disable movement of the optical element. In yet other configurations, the optical element is not included.

The camera system can be configured to output video at a variety of resolution levels, and the output resolution levels can be independent of the input resolution levels. For instance, any of the imaging systems described herein can generate image data having "5 k" (e.g., 5120×2700), Quad HD (e.g., 3840×2160 pixels), "4.5 k" resolution (e.g., 4,520×2540), "4 k" (e.g., 4,096×2,540 pixels), "2 k" (e.g., 2048×1152 pixels) or other resolutions. As used herein, in the terms expressed in the format of xk (such as 2 k and 4 k noted above), the "x" quantity refers to the approximate horizontal resolution. As such, "4 k" resolution corresponds to about 4000 or more horizontal pixels and "2 k" corresponds to about 2000 or more pixels. The dense field imager, for example, can acquire data that a viewpoint generator can use to output video image data having resolutions of at least 2 k, at least 4 k, at least 4.5 k, at least Quad HD, at least 5 k, at least 6 k, at least 10 k, or at least 18 k, at least 20 k, or greater.

In certain embodiments, the imaging systems described herein can also achieve relatively high zoom ratios. For instance, in one embodiment, the dense field imager can produce output data that can achieve a zoom ration of 100:1. In various embodiments, at least about 10:1, at least about 25:1, at least about 50:1 and at least about 100:1 zoom ratios are possible. In addition, the imaging elements of the dense field imager can sample image data at relatively high frame rates. For instance, in one embodiment, the imaging elements can capture image data at a frame rate of at least 500 frames per second. In various embodiments, the imaging elements can capture image data at a frame rate of at least 150 frames per second, at least 200 frames per second, at least 300 frames per second, at least 400 frames per second, or at least 500 frames per second, and at a resolution of at least 2 k. In other embodiments, the camera 502 system can capture image data at a frame rate of at least 150 frames per second, at least 200 frames per second, at least 300 frames per second, at least 400 frames per second, or at least 500 frames per second, and at a resolution of at least 4 k.

High Dynamic Range Video Using an Imaging Device Array

The imaging devices described herein, for example, could be configured to capture images using different exposure times. The images could then be combined to create a high-dynamic range image. Motion may affect the quality of images captured using different exposure times.

The imaging devices could also be configured to apply different gains to the signals coming from the sensors. This is comparable to adjusting the ISO setting on traditional cameras. Increasing the gain allows measurement in low-light situations, with the trade-off of increased noise in the measurement. The image could then be reconstructed using low-gain imaging devices for areas of the image that have sufficient light, and high-gain imaging devices for areas of the image that need a boost in the signal.

A combination of different exposure times and different gain settings for the various imaging devices could also be used. Additional compatible high dynamic range techniques are discussed below and are described in U.S. Patent Application Publication No. 2012/0044381 entitled "HIGH DYNAMIC RANGE VIDEO", which is incorporated by reference herein in its entirety and is included in the attached Appendix.

High-Speed Videography

Figure 21:
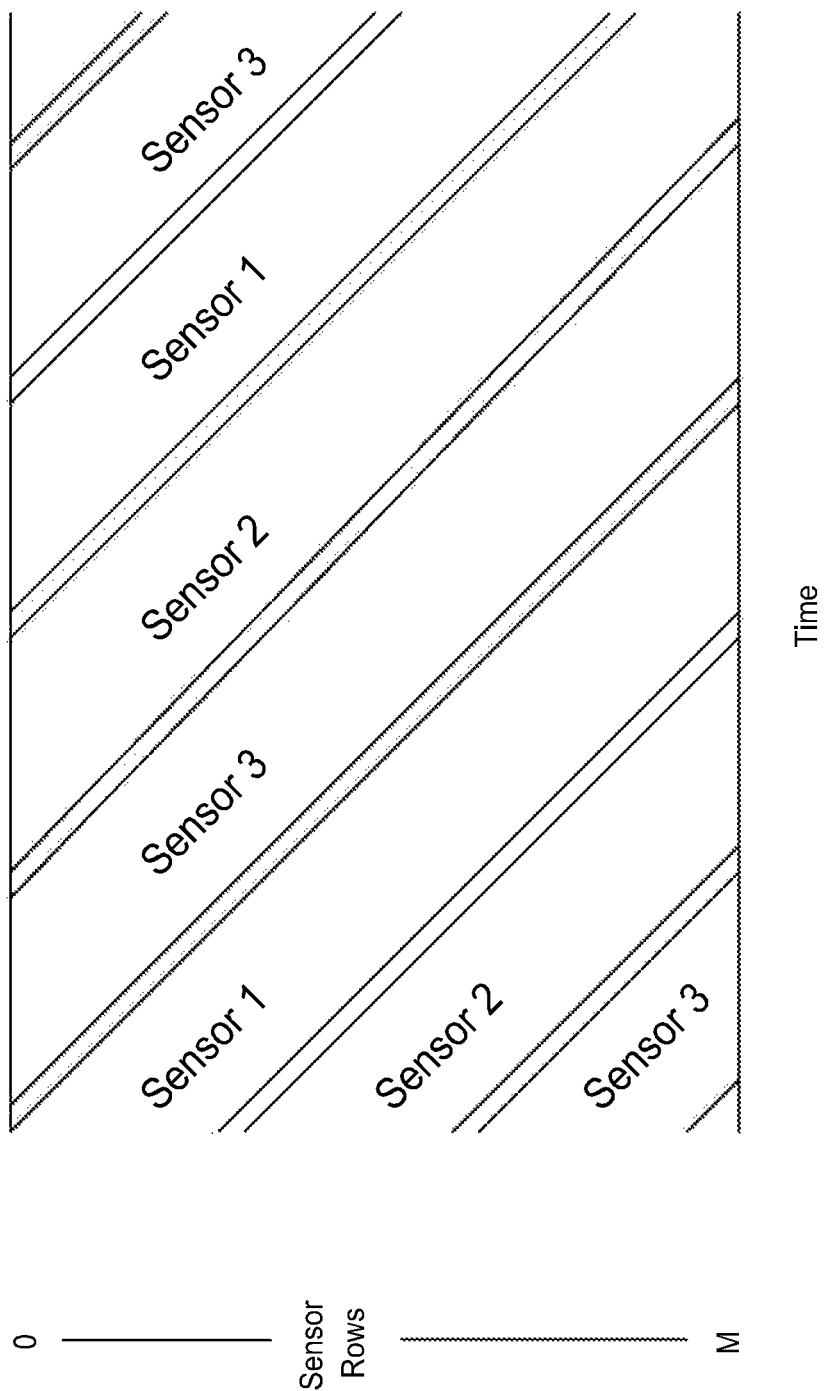
FIG. 21 illustrates a timing diagram for capturing images using multiple imaging devices.

FIG. 21 illustrates a timing diagram for capturing images using multiple imaging devices. The timing of the image captures may be arranged to increase the frame capture rate for video. For example, where a single imaging device might be capable of capturing 60 image frames per second, three imaging devices could be used to capture 180 image frames per second. In order to reduce the effects of "rolling shutter," each frame could comprise rows obtained from multiple imaging devices. For example, the first third of the frame might come from a first imaging device, the second third of the frame might come from the second imaging device, and the last third of the frame might come from the third imaging device. As illustrated in the timing diagram shown in FIG. 21, the first third of the rows of a first sensor, the second third of the rows of a second sensor, and the last third of the rows of a third sensor are captured at approximately the same time. While three sensors were used for illustration purposes, it is to be understood that other numbers of sensors may be used.

Other Image Processing Operations

The image processing systems described herein, such as the imaging processing system 102 of FIG. 1A, the image processing system 1500 of FIG. 15, or the dense field imagers of FIGS. 8-13 can perform a variety of other operations on the image data. For example, the image processing system may optionally compress the data from the imaging devices, perform pre-compression data-preparation (e.g., pre-emphasis and/or entropy reduction), format the compressed data, and the like. Examples of such techniques are described in greater detail in U.S. Pat. No. 7,830,967 entitled "VIDEO CAMERA" (the '967 patent), which is incorporated by reference herein in its entirety. In some instances, the image processing system processes the image data to tune the image streams to perceptual space. Additional compatible techniques include green data modification and pre-emphasis processes shown and described throughout the '967 patent (e.g., with respect to FIGS. 8-11 and columns 11-13). In general, certain embodiments described herein are compatible with and/or are components of embodiments described in the '967 patent. Thus, some or all of the features described herein can be used or otherwise combined with various features described in the '967 patent, including features described in the '967 patent which are not explicitly discussed herein. The '967 patent is included in the attached Appendix.

Viewpoint Generation

Figure 22:
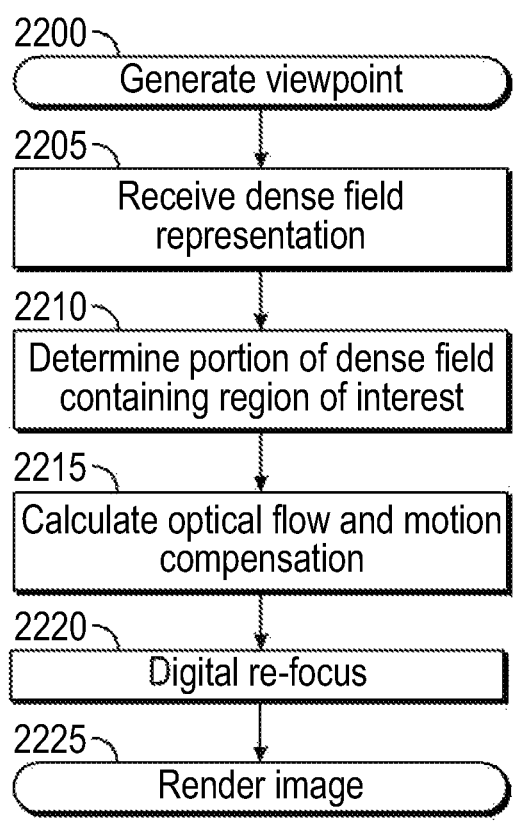
FIG. 22 illustrates a flow chart of an example method for generating a viewpoint using dense field data.

FIG. 22 illustrates a flow chart of an example method 2200 for generating a viewpoint using dense field data. The method 2200 can be used to extract viewable images and/or video in a variety of formats and resolutions. The dense field data allows for the spatial and/or temporal output resolution to generally be independent of the input spatial and temporal resolutions. For ease of description, the method 2200 will be described as being performed by the viewpoint generator, but it is to be understood that any suitable image processing system, post-processing system, dense field imager, computing device, or the like can be used to perform any of the following steps and any combination of devices can be used to perform the method 2200.

In block 2205, the viewpoint generator receives a dense field representation. The dense field representation can be provided by, for example, an array of imaging devices, a dense field imager, an image processing system, data storage devices, a computing device, or any combination of these. The dense field representation can include light field data from a plurality of devices that cover a combined field of view. Light field data can be combined, as described herein with reference to FIG. 19, to generate dense field data. The dense field data can include light field information and spatial relationship information. The spatial relationship information can be used to selectively bisect a portion of the combined light field representation to extract a viewable image. The dense field data can provide post-processing capabilities similar to light field data, such as re-focusing capabilities, the ability to generate a variety of viewing angles, change inter-ocular distance for 3D images, and the like.

In block 2210, the viewpoint generator determines a portion of the dense field representation that contains the region of interest. Because the dense field data can cover a relatively large field of view (e.g., potentially 360 degrees in azimuth and 180 degrees in elevation), the viewpoint generator determines a region of interest within the scene data. The viewpoint generator then uses the spatial relationship matrix to determine a size and shape of an object to use to bisect the combined light field data to extract a viewable image of the region of interest. In some embodiments, determining the portion of the dense field data that contains the region of interest includes extracting one or more images from the dense field data and refining the bisection object to find the desired view of the region of interest.

In block 2215, the viewpoint generator calculates an optical flow and/or motion compensation related to the region of interest. The optical flow can include image artifacts related to positional and/or motion effects of the imaging elements used to acquire the image data and/or the objects being captured. The optical flow can be used to correct for aberrations that could potentially adversely affect an output image or video. Motion compensation can account for differing positions of objects when taken at different points in time. In some embodiments, the viewpoint generator can interpolate and produce images at viewpoints and/or times where no image data was actually acquired. For instance, image data from imaging elements positioned at a variety of viewpoints can be combined to create a virtual viewpoint. As another example, image data taken at different points in time can be used to generate a view of the region of interest at a time when no data was actually acquired.

In block 2220, the viewpoint generator digitally re-focuses on the region of interest. The viewpoint generator can manipulate the dense field data to produce an image that is digitally focused on an object of interest. The viewpoint generator can change a focus depth and/or a depth of focus. In this way, different objects can be in or out of focus and a greater or smaller percentage of the generated viewpoint can be focused.

In block 2225, the viewpoint generator renders an image or video of the region of interest. Using the optical flow, motion compensation, region of interest, and focus information derived in the preceding steps, the viewpoint generator can extract viewable images or video from the dense field generator. The output resolution can be independent of the resolution of the imaging devices used to acquire the image data.

In this way, the viewpoint generator can be configured to synthesize images from any dense field data set (e.g., data acquired using multiple sensors, multiple cameras, array of cameras, etc.). The viewpoint generator can be configured to generate pixel data, to data for blocks of pixels, shapes data, and finally images. The viewpoint generator can provide a single integrated view from disparate sources. For example, data from disparate imaging devices can be combined into a dense field data set and the viewpoint generator can extract a single, integrated view of a scene from the disparate imaging devices. In some embodiments, the viewpoint generator can be configured to extract data at a variety of dimensions such as, for example, 1D pixels, 2D bitmaps, 3D temporal image sequences, 4D stereoscopic sequences, 5D light field representations (for holograms), etc. In some embodiments, the viewpoint generator can be configured to produce automated compositions based on input criteria. For example, the viewpoint generator can be configured to focus on an object of interest when a particular object is within a defined space. In some embodiments, the viewpoint generator can be coupled to a networked input source that receives information from multiple users over a social network to provide dynamic viewpoints according to user requests.

Manufacture of Imaging Elements

In some embodiments, one or more liquid lens cells may be used with a small sensor in an imaging device. The imaging device may then be attached to an adjustable frame.

Some optics may be implemented in the dielectric stack of the integrated circuit using refractive microlenses or diffractive gratings patterned in the metal layers.

Making the sensor and optics small provides for mass-production of the imaging elements.

In some embodiments, the image sensors manufactured as described herein can comprise monochromatic sensors. A monochromatic sensor can be configured to be sensitive to a targeted bandwidth of light, such as red light, blue light, green light, yellow light, and or white light (or a panchromatic sensor). The monochromatic sensors can be manufactured on a wafer-scale using wafer-scale optics as described herein. Color filters or dyes can be applied to any suitable stage and/or any suitable layer. For example, the lens elements can be coated with a filter or the lens elements can include a dye which substantially filters light outside of a targeted portion of the electromagnetic spectrum.

In some embodiments, the monochromatic sensors do not include any filters and are configured to be used in conjunction with a lens plate that includes monochromatic filters. When the lens plate and the sensors are used in conjunction, monochromatic sensors are effectively created. In some embodiments, the lens plate is removable and allows for different color filter schemes to be used to achieve a desired result. In some embodiments, a wafer is configured to contain at least four image sensors and a lens plate is configured to transmit a particular wavelength band to an associated image sensor. For example, the lens plate can make a first sensor a red sensor, transmitting red light while substantially blocking all other wavelengths, the lens plate can make a second sensor a blue sensor, a third sensor a green sensor, and a fourth sensor a white sensor. Control of the individual sensors can be arranged through control electronics. In some embodiments, by making the image sensors monochromatic, cross-talk is reduced and image quality increases, as described herein.

In some embodiments, any of the imaging systems described herein, including the dense field imagers, can include a camera array that is fabricated on a semiconductor chip. For example, U.S. Patent Publication 2011/0080487 entitled "Capturing and Processing of Images Using Monolithic Camera Array with Heterogeneous Imagers," the entirety of which is incorporated by reference herein and is included in the attached Appendix, describes the use of an array of imagers where each imager in the array comprises a plurality of light sensing elements and a lens stack fabricated on a semiconductor chip. The camera array may include two or more types of heterogeneous imagers, each imager including two or more sensor elements or pixels. Each one of the imagers may have different imaging characteristics. Alternatively, there may be two or more different types of imagers where the same type of imager shares the same imaging characteristics.

In some embodiments, each imager has its own filter and/or optical element (e.g., lens). Specifically, each of the imagers or a group of imagers may be associated with spectral color filters to receive certain wavelengths of light. Example filters include a traditional filter used in the Bayer pattern (R, G, B or their complements C, M, Y), an IR-cut filter, a near-IR filter, a polarizing filter, and a custom filter to suit the needs of hyper-spectral imaging. Some imagers may have no filter to allow reception of both the entire visible spectra and near-IR, which increases the imager's signal-to-noise ratio. The number of distinct filters may be as large as the number of imagers in the camera array. Further, each of the imagers or a group of imagers may receive light through lenses having different optical characteristics (e.g., focal lengths) or apertures of different sizes.

In some embodiments, the imagers in the camera array are spatially separated from each other by a separation distance. By increasing the spatial separation, the parallax between the images captured by the imagers may be increased. The increased parallax is advantageous where more accurate distance information is important. Separation between two imagers may also be increased to approximate the separation of a pair of human eyes. By approximating the separation of human eyes, a realistic stereoscopic 3D image may be provided to present the resulting image on an appropriate 3D display device.

In some embodiments, multiple camera arrays are provided at different locations on a device to overcome space constraints. One camera array may be designed to fit within a restricted space while another camera array may be placed in another restricted space of the device. For example, if a total of 20 imagers are required but the available space allows only a camera array of 1×10 imagers to be provided on either side of a device, two camera arrays each including 10 imagers may be placed on available space at both sides of the device. Each camera array may be fabricated on a substrate and be secured to a motherboard or other parts of a device. In addition, such imagers do not have to be homogenous in size, and may have different x- and y-dimensions. The images collected from multiple camera arrays may be processed to generate images of desired resolution and performance.

In some embodiments, the imaging system can include a wafer level optics. The wafer level optics can include a plurality of lens elements, where each lens element covers one of the sensors in the array. For example, the imaging system can be an array of pixels overlaid with color filters and microlenses. The microlenses that sit on top of the color filters are used to focus light on the active area of each underlying pixel. The microlenses can be thought of as sampling the continuous light field in object space sampled by the main lens. Whereas the main lens samples the scene radiance light field, the micro-lenses sample the sensor irradiance light field.

The main lens associated with each imager maps the points in the object space to points in the image space such at that the mapping is bijective (onto-to-one and onto). Each microlens samples a finite extent of the sensor irradiance light field. The sensor irradiance light field is continuous and is the result of a bijective mapping from the object space. Thus, the microlens sampling of a finite extent of the sensor irradiance light field is also a sampling of a corresponding finite extent of the scene radiance light field in object space.

In some embodiments, the imaging systems and dense field imagers described herein can include monochromatic imaging elements. The monochromatic imaging elements can include color filters that are off the sensor, e.g., on the lens. The color filters can be modular, so that different filter plates can be switched and used with the same sensor array. The filter plates can be added at the point of manufacture, or by the consumer. Thus, the imaging system can include a plurality of imaging elements that are assembled in a uniform fashion, e.g., sensors that are sensitive to a broad spectrum of light, and the imaging system can be customized by implementing a combination of filter arrays. This type of configuration can reduce manufacturing costs and/or increase utility of the imaging system.

Example Embodiments

The following is a numbered list of example embodiments that are within the scope of this disclosure. The example embodiments that are listed should in no way be interpreted as limiting the scope of the embodiments. Various features of the example embodiments that are listed can be removed, added, or combined to form additional embodiments, which are part of this disclosure:

Imaging Block and Dense Field Imager

1. An imaging block, comprising:
   a support; at least a first imaging element and a second imaging element carried by the support, each imaging element comprising a sensor and a lens;
   a mechanical connector for mechanically connecting the imaging block into an array of imaging blocks; and
   an electrical connector for electrically connecting the imaging block into an array of imaging blocks.

2. An imaging block as in embodiment 1, wherein at least the first imaging element comprises a monochromatic filter, wherein the sensor of the first imaging element detects substantially monochromatic light passing through the monochromatic filter.

3. An imaging block as in embodiment 1, wherein the support comprises a wafer substrate.

4. An imaging block as in embodiment 3, wherein the wafer substrate comprises a semi conductor material.

5. An imaging block as in embodiment 4, wherein the sensors are formed on the substrate.

6. An imaging block as in embodiment 3, wherein the lenses are wafer-level lenses.

7. An imaging array, comprising an array support, and at least two imaging blocks of any of embodiments 1 through 6 carried by the array support, the at least two imaging blocks comprising a first imaging block and a second imaging block.

8. An imaging array as in embodiment 7, wherein at least one of the sensors in the first imaging block is non-coplanar with at least one of the sensors in the second imaging block.

9. An imaging array as in embodiment 7, wherein each of the sensors in the first imaging block are coplanar, each of the sensors in the second imaging block are coplanar, and each of the sensors in the first imaging block are non-coplanar with each of the sensors in the second imaging block.

10. An imaging array as in embodiment 7, wherein each imaging element has a primary optical axis, and the primary optical axis of at least one of the imaging elements in the first imaging block is substantially non-parallel with the primary optical axis of at least one of the imaging elements in the second imaging block.

11. An imaging array as in embodiment 7, wherein each imaging element has a primary optical axis, the primary optical axes of the imaging elements in the first imaging block are substantially parallel, the primary optical axes of the imaging elements in the second imaging block are substantially parallel, and the primary optical axes of the imaging elements in the first imaging block are substantially non-parallel with the primary optical axes of the imaging elements in the second imaging block.

12. An imaging array as in embodiment 7, wherein a primary optical axis of at least one imaging element of the first imaging block is angularly adjustable with respect to a primary optical axis of at least one imaging element of the second imaging block.

13. An imaging array as in embodiment 12, wherein the imaging array comprises a user-actuatable control for achieving the angular adjustment.

14. An imaging array as in embodiment 7, further comprising:
   an image processing system configured to:
      using image data captured by the first imaging block, generate a first image data set representative of a first portion of a light field; and
      using image data captured by second imaging block, generate a second image data set representative of a second portion of the light field; and
      derive a third image data set from the first and second image data sets.

15. An imaging array as in embodiment 14, wherein the image processing system is carried by the array support.

16. An imaging array as in embodiment 14, wherein the image processing system is physically separate from the array support and receives the first and second image data sets wirelessly.

17. An imaging array as in embodiment 14, wherein the image processing system derives the third image data set at least partly by creating a spatial relationship tensor that includes spatial relationship information between elements of the first and second image data sets and using the spatial relationship tensor to derive the third image data set.

18. An imaging array as in embodiment 17, wherein the image processing system derives the third image data set at least partly by using the spatial relationship tensor to combine together the first and second portions of the light field.

19. An imaging block as in embodiment 1, further comprising one or more processors carried by the support and configured to generate a light field representation based on pixel data acquired from the sensors.

20. An imaging block as in embodiment 1, wherein one or more of the lenses are removably replaceable with lenses having different optical characteristics.

21. An imaging block as in embodiment 1, wherein each imaging element has a primary optical axis, and most of the primary optical axes are substantially parallel.

22. An imaging block as in embodiment 1, wherein each imaging element has a primary optical axis, and at least two of the primary optical axes diverge in a direction leading away from the sensor.

23. An imaging block as in embodiment 1, wherein each imaging element has a primary optical axis, and at least two of the primary optical axes converge in a direction leading away from the sensor.

24. An imaging block as in embodiment 1, wherein each imaging element has a primary optical axis, and at least a first primary optical axis is angularly adjustable with respect to at least a second primary optical axis.

25. An imaging block as in embodiment 1, comprising at least 8 imaging elements.

26. An imaging block as in embodiment 25, wherein the imaging elements are arranged in two rows of 4.

27. An imaging block as in embodiment 1, comprising at least 16 imaging elements.

28. An imaging block as in embodiment 27, wherein the imaging elements are arranged in a 4×4 grid.

29. An imaging block as in embodiment 1, wherein at least one sensor is no larger than about 5 mm×5 mm.

30. An imaging block as in embodiment 1, further comprising an FPGA chip carried by the support.

31. An imaging array as in embodiment 1, wherein at least some of the sensors have one or more of different sizes, different resolutions, or different sensitivities.

32. An imaging array comprising an array support, and at least two imaging blocks of any of claims 19 through 31 carried by the array support.

Method of Compiling an Image Data Set

1. A method of compiling an image data set, comprising:
   obtaining a first image data set representative of a first portion of a light field;
   obtaining a second image data set representative of a second portion of the light field;
   with one or more processors, deriving a third image data set that is based on at least the first image data set, the second image data set, and information relating to a spatial relationship between the first and second portions of the light fields; and storing the third image data set in one or more memory devices.

2. A method as in embodiment 1, wherein the first image data set is derived from pixel data acquired by a first group of at least two imaging elements and the second image data set is derived from pixel data acquired by a second group of at least two imaging elements, each imaging element comprising a sensor and a lens.

3. A method as in embodiment 1, further comprising processing the first image data set and the second image data set to determine the spatial relationship between the first portion of the light field and the second portion of the light field.

4. A method as in embodiment 1, wherein said deriving comprises accessing a spatial relationship tensor representing the spatial relationship information to perform a geometric transform on the first image data set and second image data set.

5. A method as in embodiment 2, wherein the at least two imaging elements in the first group are coplanar, the at least two imaging elements in the second group are coplanar, and the at least two imaging elements in the first group are non-coplanar with respect to the at least two imaging elements in the second group.

6. A method as in embodiment 1, wherein the first and second image data sets additionally represent the first portion and the second portion of the light field as a function of time.

7. A method as in embodiment 1, wherein the third image data set comprises light field information represented as a function of time.

8. A method as in embodiment 1, wherein the first portion of the light field and the second portion of the light field comprise regions of the light field which at least partially overlap, and wherein the third data set comprises light field information derived from data in both of the first and second data sets that corresponds to the region of the light field lying within the overlap.

9. A method as in embodiment 1, wherein the first portion of the light field and the second portion of the light field comprise regions of the light field which only partially overlap, and wherein the third data set comprises light field information derived from:
   data in the first image data set that corresponds to a first portion of a scene; and
   data in the second image data set that corresponds to a second portion of the scene that does not overlap with the first portion.

10. A method as in embodiment 1, wherein the third image data set comprises at least 4D light field information.

11. A method as in embodiment 1, wherein said deriving the third image data set comprises deriving the third image data set while maintaining the dimensionality of functions that represent the first and second portions of the light field.

12. A method as in embodiment 1, wherein the first and second image data sets respectively represent the first and second portions of the light field as functions having at least four input parameters.

13. A method as in embodiment 1, wherein the first and second image data sets respectively represent the first and second portions of the light field as functions having at least five input parameters.

14. A method as in embodiment 1, wherein the first and second image data sets respectively represent the first and second portions of the light field as functions that represent luminance as a function of a position in space and a pointing direction.

15. A method of embodiment 1, wherein viewable images are extractable from the third image data set.

16. A method as in embodiment 15, wherein the viewable images comprise 2D images.

17. A method as in embodiment 15, wherein the viewable images comprise 3D images.

18. A method as in embodiment 1, wherein viewable motion video is extractable from the third image data set.

19. A method as in embodiment 1, further comprising accessing a fourth image data set representative of a third portion of the light field, wherein said deriving comprises deriving the third image data set based on at least the first image data set, the second image data set, the fourth image data set, and spatial relationships between the first, second, and third portions of the light field.

Stored Image Data Set

1. A memory device containing a dense field image data set, comprising:
   a storage medium; and
   a dense field image data set stored in the storage medium and derived by relating a first image data set representative of a first portion of a light field to a second image data set representative of a second portion of the light field, using information relating to a spatial relationship between the first and second light fields.

2. A computer-readable memory device as in embodiment 1, wherein the image data set comprises light field information represented as a function of time.

3. A computer-readable memory device as in embodiment 1, wherein the image data set comprises at least 4D light field information.

4. A computer-readable memory device as in embodiment 1, wherein the first image data set was derived from pixel data acquired by a first imaging block comprising a support and at least two imaging elements carried by the support, and the second image data set was derived from pixel data acquired by a second imaging block comprising a support and at least two imaging elements carried by the support, each imaging element comprising a sensor and a lens.

5. A machine comprising the computer-readable memory device of embodiment 1 and one or more processors, the one or more processors configured to derive the dense field image data set.

6. A machine comprising the computer-readable memory device of embodiment 1 and one or more processors, the one or more processors configured to extract viewable images from the dense field image data set.

7. A computer-readable memory device as in embodiment 6, wherein the viewable images comprise 2D images.

8. A computer-readable memory device as in embodiment 6, wherein the viewable images comprise 3D images.

9. A computer-readable memory device as in embodiment 6, wherein the viewable images comprise motion video.

Stitching Light Fields to Create Dense Field Image Set with an Enhanced Field of View 1. A method of creating a dense field image set, the method comprising:
   acquiring pixel data from a plurality of imaging elements, each imaging element comprising a sensor and a lens;
   generating a plurality of light field representations, each of the light field representations generated using pixel data from at least two of the imaging elements;
   creating a spatial relationship tensor representative of spatial relationships among the light field representations; and
   utilizing the spatial relationship tensor, combining the light field representations to create a dense field image set.

2. A method as in embodiment 1, wherein said combining the light field representations comprises stitching together light field representations having at least partially non-overlapping fields of view to create a dense field image set having a significantly wider field of view than the individual light field representations.

3. A method as in embodiment 2, wherein the lateral field of view of the dense field image set is greater than or equal to about 145 degrees.

4. A method as in embodiment 1, wherein the imaging elements are arranged on a common support.

5. A method as in embodiment 1, wherein at least some of the imaging elements are not coplanar.

6. A method as in embodiment 1, wherein each light field representation is generated using pixel data from an imaging block comprising at least two imaging elements.

7. A method as in embodiment 6, wherein at least some of the imaging blocks are not coplanar.

8. A method as in embodiment 1, wherein at least one of the imaging elements comprises a monochromatic filter, and wherein light passing through the monochromatic filter is detected by the sensor of the at least one imaging element.

9. A method as in embodiment 1, wherein at least half of the imaging elements comprise monochromatic filters.

10. A method as in embodiment 1, wherein substantially all of the imaging elements comprise monochromatic filters.

Dense Field Imager Creating Light Fields from Multiple Tiles Using Pixel Correspondence Information 1. An imaging system, comprising:
   a plurality of imaging blocks each comprising at least two imaging elements, each of the imaging elements comprising an image sensor and a lens;
   a dense field image processor module configured to:
      for each imaging block of at least two of the plurality of imaging blocks:
         generate pixel correspondence information for the imaging block, the pixel correspondence information representative of spatial relationships between pixels in each imaging element of the imaging block and corresponding pixels in other imaging elements of the imaging block;
         utilizing the correspondence information, generate a light field representation using pixel data acquired by the respective imaging block.

2. An imaging system as in embodiment 1, wherein the dense field image processor module is further configured to:
   create a spatial relationship tensor representative of spatial relationships among the light field representations; and
   utilizing the spatial relationship tensor, combine the light field representations to create a dense field image set.

3. An imaging system as in embodiment 1, wherein the imaging blocks are arranged on a common support.

4. An imaging system as in embodiment 1, wherein the imaging blocks are formed in a wafer.

5. An imaging system as in embodiment 2, wherein the imaging elements of each imaging block are coplanar with respect to one another.

6. An imaging system as in embodiment 2, wherein at least some of the imaging blocks are not coplanar with respect to other ones of the imaging blocks.

7. An imaging system as in embodiment 1, wherein at least some of the imaging blocks are arranged on physically separate supports.

Dense Filed Imager Capable of Stitching Light Fields

1. A dense field imaging system, comprising:
   a plurality of imaging blocks, each of the imaging blocks comprising at least two sensor/lens pairs, wherein at least some of the imaging blocks are substantially non-coplanar with each other and have at least partially non-overlapping fields of view;
   a dense field image processor module configured to:
      for each imaging block, generate a light field representation using pixel data acquired by the sensor/lens pairs;
      generate a spatial relationship tensor representative of spatial relationships between the light field representations; and using the spatial relationship tensor, combine the light field representations to create a dense field imaging set having a substantially wider field of view than the individual light field representations.

2. A dense field imager as in embodiment 1, wherein each of the imaging blocks comprises a wafer substrate on which the sensors are formed.

3. A dense field imager as in embodiment 1, further comprising a control configured to adjust the angular relationship between sensor/lens pairs.

Dense Field Imaging System with Monochromatic Sensors

1. A dense field imaging system, the dense field imaging system comprising:
  a plurality of imaging blocks arranged on a support, each of the imaging blocks comprising at least two imaging elements, each of the imaging elements comprising a sensor and lens, wherein at least some of the imaging elements comprise monochromatic filters; and
  a dense field image processor module configured to:
    for each imaging block, generate a light field representation using pixel data acquired by the imaging elements of the imaging block; and
    combine the light field representations to create a dense field image set.

2. A dense field imaging system as in embodiment 1, wherein most of the sensors are monochromatic.

3. A dense field imaging system as in embodiment 1, wherein each of the sensors is monochromatic.

4. A dense field imaging system as in embodiment 1, wherein each of the imaging blocks includes a support comprising a wafer substrate, and wherein the sensors are formed on the wafer substrate.

5. A dense field imaging system as in embodiment 4, wherein the lenses comprise wafer level lenses.

Terminology/Additional Embodiments

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, etc. described herein. A wide variety of variation is possible. Components, elements, and/or steps can be altered, added, removed, or rearranged. While certain embodiments have been explicitly described, other embodiments will become apparent to those of ordinary skill in the art based on this disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Depending on the embodiment, certain acts, events, or functions of any of the methods described herein can be performed in a different sequence, can be added, merged, or left out altogether (e.g., not all described acts or events are necessary for the practice of the method). Moreover, in certain embodiments, acts or events can be performed concurrently, e.g., through multi-threaded processing, interrupt processing, or multiple processors or processor cores, rather than sequentially. In some embodiments, the algorithms disclosed herein can be implemented as routines stored in a memory device. Additionally, a processor can be configured to execute the routines. In some embodiments, custom circuitry may be used.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary storage medium is coupled to a processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. An imaging array, comprising:
   first and second imaging blocks each comprising:
   a support; and
   at least three imaging elements carried by the support, each imaging element of the at least three imaging elements comprising a lens and an image sensor comprising a plurality of pixels;
   wherein the first and second imaging blocks are mounted with respect to one another such that one or more of the support of the first imaging block and the support of second imaging block are movable to adjust an orientation of the first and second imaging blocks relative to one another; and
   wherein the image sensor of at least one of the at least three imaging elements of the first imaging block is non-coplanar with the image sensor of at least one of the at least three imaging elements of the second imaging block.

2. An imaging array as in claim 1, wherein at least one of the imaging elements of the first imaging block comprises a monochromatic filter and detects substantially monochromatic light passing through the monochromatic filter.

3. An imaging array as in claim 1, wherein the support of the first imaging block comprises a wafer substrate and the support of the second imaging block comprises a wafer substrate.

4. An imaging array as in claim 3, wherein the wafer substrate of the support of the first imaging block comprises a semiconductor material and the wafer substrate of the support of the second imaging block comprises a semiconductor material.

5. An imaging array as in claim 4, wherein the image sensors of the at least three imaging elements of the first imaging block are formed on the wafer substrate of the support of the first imaging block and the image sensors of the at least three imaging elements of the second imaging block are formed on the wafer substrate of the support of the second imaging block.

6. An imaging array as in claim 3, wherein the lenses of the at least three imaging elements of the first imaging block are wafer-level lenses and the lenses of the at least three imaging elements of the second imaging block are wafer-level lenses.

7. An imaging array as in claim 1, wherein each imaging element of the at least three imaging elements of the first and second imaging blocks has a primary optical axis, and the primary optical axis of at least one of the imaging elements in the first imaging block is substantially non-parallel with the primary optical axis of at least one of the imaging elements in the second imaging block.

8. An imaging array as in claim 1, wherein each imaging element of the at least three imaging elements of the first and second imaging blocks has a primary optical axis, the primary optical axes of the imaging elements in the first imaging block are substantially parallel with one another, the primary optical axes of the imaging elements in the second imaging block are substantially parallel with one another, and the primary optical axes of the imaging elements in the first imaging block are substantially non-parallel with the primary optical axes of the imaging elements in the second imaging block.

9. An imaging array as in claim 1, wherein a primary optical axis of at least one imaging element of the first imaging block is angularly adjustable with respect to a primary optical axis of at least one imaging element of the second imaging block.

10. An imaging array as in claim 1, further comprising an image processing system configured to:
    receive first image data image data generated by the first imaging block;
    receive second image data generated by the second imaging block; and
    derive third image data from the first and second image data.

11. An imaging array as in claim 10, wherein the first imaging block comprises one or more processors carried by the support of the first imaging block configured to generate the first image data, and the second imaging block comprises one or more processors carried by the support of the second imaging block configured to generate the second image data.

12. An imaging array as in claim 1, further comprising one or more processors configured to generate a light field representation based on pixel data acquired from the image sensors of the first and second imaging blocks.

13. An imaging array as in claim 1, wherein one or more of the lenses of the at least three imaging elements of the first imaging block are removably replaceable with lenses having different optical characteristics.

14. An imaging array as in claim 1, wherein at least one of the at least three imaging elements of the first imaging block comprises a fixed optical power and at least another imaging element of the at least three imaging elements of the first imaging block comprises a variable optical power.

15. An imaging array as in claim 1, wherein at least one of the at least three imaging elements of the first imaging block is configured to capture light of a first wavelength and at least another imaging element of the at least three imaging elements of the first imaging block is configured to capture light of a different wavelength than the first wavelength.

16. An imaging block as in claim 1, wherein the first and second imaging blocks each comprise at least 16 imaging elements.

17. An imaging array as in claim 1, wherein the at least three imaging elements of each of the first imaging block and the second imaging block are arranged in at least one of a rectangular grid, a hexagonal grid, and concentric circles.

* * * * *